US012237575B2

(12) United States Patent
Yetisir et al.

(10) Patent No.: US 12,237,575 B2
(45) Date of Patent: Feb. 25, 2025

(54) ANTENNA APPARATUS HAVING RADOME SPACING

(71) Applicant: Space Exploration Technologies Corp., Hawthorne, CA (US)

(72) Inventors: Ersin Yetisir, Redmond, WA (US); Trevor Cameron, Redmond, WA (US); David Milroy, Kirkland, WA (US); Duncan E. Adams, Redmond, WA (US)

(73) Assignee: Space Explortion Technologies Corp., Hawthorne, CA (US)

( * ) Notice: Subject to any disclaimer, the term of this patent is extended or adjusted under 35 U.S.C. 154(b) by 0 days.

(21) Appl. No.: 16/892,237

(22) Filed: Jun. 3, 2020

(65) Prior Publication Data

US 2020/0381814 A1 Dec. 3, 2020

Related U.S. Application Data

(60) Provisional application No. 62/856,730, filed on Jun. 3, 2019.

(51) Int. Cl.
*H01Q 1/42* (2006.01)
*H01Q 1/02* (2006.01)
(Continued)

(52) U.S. Cl.
CPC ............... *H01Q 1/428* (2013.01); *H01Q 1/02* (2013.01); *H01Q 1/1207* (2013.01);
(Continued)

(58) Field of Classification Search
CPC .................. H01Q 1/42; H01Q 1/2283; H01Q 1/422–428; H01Q 23/00; H01Q 15/144; H01Q 21/00; H01Q 21/10; H01Q 21/065
See application file for complete search history.

(56) References Cited

U.S. PATENT DOCUMENTS 4,851,855 A * 7/1989 Tsukamoto ........ H01Q 21/0081 343/846
4,937,585 A 6/1990 Shoemaker
(Continued)

FOREIGN PATENT DOCUMENTS

CN 106558761 A 4/2017
CN 109474324 A 3/2019
(Continued)

OTHER PUBLICATIONS

International Search Report and Written Opinion mailed Nov. 30, 2020, issued in International Patent Application No. PCT/US2020/036015, filed Jun. 3, 2020, 19 pages.
(Continued)

*Primary Examiner* — Seokjin Kim
(74) *Attorney, Agent, or Firm* — Polsinelli PC

(57) ABSTRACT

In one embodiment of the present disclosure, a housing for an antenna system having a plurality of antenna elements defining an antenna aperture includes a chassis portion, and a radome portion configured for coupling to the chassis portion to define an inner chassis chamber, the radome portion having a planar top surface, wherein the radome portion is configured to have equal spacing between the planar top surface and a top surface of each of the plurality of antenna elements defining the antenna aperture.

15 Claims, 45 Drawing Sheets

(51) Int. Cl.

| | |
|---|---|
| ***H01Q 1/12*** | (2006.01) |
| ***H01Q 1/22*** | (2006.01) |
| ***H01Q 1/38*** | (2006.01) |
| ***H01Q 9/04*** | (2006.01) |
| ***H01Q 15/14*** | (2006.01) |
| ***H01Q 21/00*** | (2006.01) |
| ***H01Q 21/06*** | (2006.01) |
| ***H01Q 21/10*** | (2006.01) |
| ***H01Q 23/00*** | (2006.01) |

(52) U.S. Cl.

CPC ......... *H01Q 1/1228* (2013.01); *H01Q 1/2283* (2013.01); *H01Q 1/38* (2013.01); *H01Q 1/42* (2013.01); *H01Q 1/422* (2013.01); *H01Q 9/0407* (2013.01); *H01Q 9/0414* (2013.01); *H01Q 15/144* (2013.01); *H01Q 21/00* (2013.01); *H01Q 21/065* (2013.01); *H01Q 21/10* (2013.01); *H01Q 23/00* (2013.01); *H01Q 1/2291* (2013.01)

(56) References Cited

U.S. PATENT DOCUMENTS 5,216,435 A 6/1993 Hirata et al.
5,270,721 A * 12/1993 Tsukamoto ........ H01Q 21/0075 343/700 MS
5,382,959 A 1/1995 Pett et al.
5,796,367 A 8/1998 Andersson
5,844,529 A 12/1998 Bell et al.
5,952,983 A 9/1999 Dearnley et al.
6,107,976 A 8/2000 Purinton
6,285,323 B1 * 9/2001 Frank ................. H01Q 21/0006 343/795
6,624,787 B2 * 9/2003 Puzella ................ H01Q 21/065 343/778
6,759,995 B1 7/2004 Speece
9,116,222 B1 * 8/2015 Ellsworth ................ H01Q 1/02
10,658,758 B2 * 5/2020 Hafenrichter ........ H01Q 21/061
10,694,637 B1 6/2020 Wolf
11,075,456 B1 7/2021 Hennig et al.
2002/0169578 A1 11/2002 Yang
2004/0150561 A1 8/2004 Tillery et al.
2008/0001841 A1 1/2008 Albernding et al.
2009/0096603 A1 4/2009 Langsweirdt et al.
2009/0231186 A1 9/2009 Barak et al.
2009/0284436 A1 11/2009 McCarthy et al.
2010/0177012 A1 7/2010 Morrow
2010/0225563 A1 * 9/2010 Lin ........................ H01Q 15/24 343/909
2011/0171901 A1 7/2011 Wyler
2011/0221626 A1 9/2011 Hill
2014/0118196 A1 5/2014 Koskiniemi
2014/0227985 A1 8/2014 Sanford
2015/0015453 A1 * 1/2015 Puzella ................ H05K 1/0206 333/1.1
2015/0250022 A1 9/2015 Kim et al.
2016/0079672 A1 3/2016 Cerreno
2017/0093026 A1 3/2017 Anderson et al.
2017/0105315 A1 4/2017 Huang
2017/0187100 A1 * 6/2017 Fotheringham ...... H01Q 19/067
2017/0229768 A1 8/2017 Gerneth et al.
2017/0373387 A1 12/2017 Ohlsson et al.
2018/0083365 A1 3/2018 Hinman et al.
2018/0090851 A1 3/2018 Feldman et al.
2018/0090852 A1 3/2018 Dufilie et al.
2018/0213176 A1 7/2018 Kang et al.
2018/0358710 A1 * 12/2018 Toyao ................ H01Q 15/0013
2018/0366820 A1 12/2018 Emerick et al.
2019/0036225 A1 1/2019 Kosaka
2019/0181946 A1 6/2019 Wendling
2019/0296428 A1 9/2019 Hashimoto
2020/0137888 A1 4/2020 Liu et al.
2020/0321694 A1 10/2020 Harrer
2020/0365999 A1 11/2020 Edenfield et al.
2021/0044008 A1 2/2021 Mathieu
2021/0057796 A1 2/2021 Xu et al.
2021/0293919 A1 9/2021 Schulte
2021/0359400 A1 11/2021 Park et al.

FOREIGN PATENT DOCUMENTS

EP 2 159 878 A1 3/2010
EP 3367124 A1 8/2018
EP 3734322 A1 4/2020
EP 3712640 A1 9/2020
EP 2922307 B1 12/2020
GB 2458663 A * 9/2009 ............. H01Q 1/422
WO 00/62371 A2 10/2000
WO 2006019290 A1 2/2006
WO WO-2009037716 A2 * 3/2009 ......... H01Q 21/0075
WO 2017076750 A1 5/2017

OTHER PUBLICATIONS

International Search Report and Written Opinion, dated Sep. 29, 2020, for PCT/US2020/036003 (10 pages).

* cited by examiner

.0014 Inches Copper Rim

No Copper on Rim

ANTENNA APPARATUS HAVING RADOME SPACING

CROSS-REFERENCE TO RELATED APPLICATION

This application claims the benefit of U.S. Provisional Application No. 62/856,730, filed Jun. 3, 2019, the disclosure of which is expressly incorporated by reference herein in its entirety.

FIELD

The present disclosure pertains to antenna apparatuses for satellite communication systems.

BACKGROUND

Satellite communication systems generally involve Earth-based antennas in communication with a constellation of satellites in orbit. Earth-based antennas are, of consequence, exposed to weather and other environmental conditions. Therefore, described herein are antenna apparatuses and their housing assemblies designed with sufficient durability to protect internal antenna components while enabling radio frequency communications with a satellite communication system, such as a constellation of satellites.

SUMMARY

In accordance with one embodiment of the present disclosure, a housing for an antenna system having a plurality of antenna elements defining an antenna aperture is provided. The housing includes: a chassis portion; and a radome portion configured for coupling to the chassis portion to define an inner chassis chamber, the radome portion having a planar top surface, wherein the radome portion is configured to have equal spacing between the planar top surface and a top surface of each of the plurality of antenna elements defining the antenna aperture.

In accordance with another embodiment of the present disclosure, a housing for an antenna system having a plurality of antenna elements defining an antenna aperture is provided. The housing includes: a chassis portion; and a radome portion configured for interfacing with the chassis portion to define an inner chassis chamber, the radome portion having a planar top surface, wherein the radome portion is configured to have equal spacing between the planar top surface and a top surface of each of the plurality of antenna elements defining the antenna aperture, wherein the radome portion includes a radome spacer made from conductive material including a plurality of apertures defined by cell walls, wherein the each cell aligns with an antenna element from the plurality of antenna elements defining the antenna aperture.

In accordance with another embodiment of the present disclosure, a radome portion for an antenna system having a plurality of antenna elements defining an antenna aperture is provided. The radome portion includes: a radome have a top planar surface and a bottom surface; and a radome spacer between the bottom surface of the radome and the plurality of antenna elements defining the antenna aperature, the radome spacer configured to define equal spacing between the planar top surface of the radome portion and a top surface of each of the plurality of antenna elements defining the antenna aperture, wherein the radome spacer is made from a thermally conductive material including a plurality of apertures defined by cell walls, wherein the each cell aligns with an antenna element from the plurality of antenna elements.

In any of the embodiments described herein, the radome portion may include at least a first layer and a second layer.

In any of the embodiments described herein, the first layer may be a protective layer.

In any of the embodiments described herein, the first layer may be made from a fiber-reinforced laminate material.

In any of the embodiments described herein, the fibers may be selected from the group consisting of fiberglass or Kevlar fibers.

In any of the embodiments described herein, the first layer may have a thickness selected from the group consisting of less than 1.5 mm, less than 0.76 mm, less than 0.51 mm, and less than 0.25 mm.

In any of the embodiments described herein, the first layer may include a hydrophobic outer surface.

In any of the embodiments described herein, the second layer may be a radome spacing layer.

In any of the embodiments described herein, the second layer may be made from a polymethacrylimide foam.

In any of the embodiments described herein, the second layer may have a thickness selected from the group consisting of greater than 2.5 mm, greater than 3.0 mm less than 4.5 mm, or in the range of 3.0 mm to 4.5 mm.

In any of the embodiments described herein, the second layer may include a plurality of apertures defined by cell walls, wherein the each cell aligns with an antenna element from the plurality of antenna elements defining the antenna array.

In any of the embodiments described herein, the second layer may be made from plastic.

In any of the embodiments described herein, the second layer may be made from a thermally conductive material.

In any of the embodiments described herein, the spacing layer may have a dielectric constant of less than 3.0.

In any of the embodiments described herein, the radome spacing layer may have a thermal conductivity value of greater than 0.35 W/m-K.

In any of the embodiments described herein, the first layer and the second layer may be joined by adhesive.

DETAILED DESCRIPTION

Figure 1:
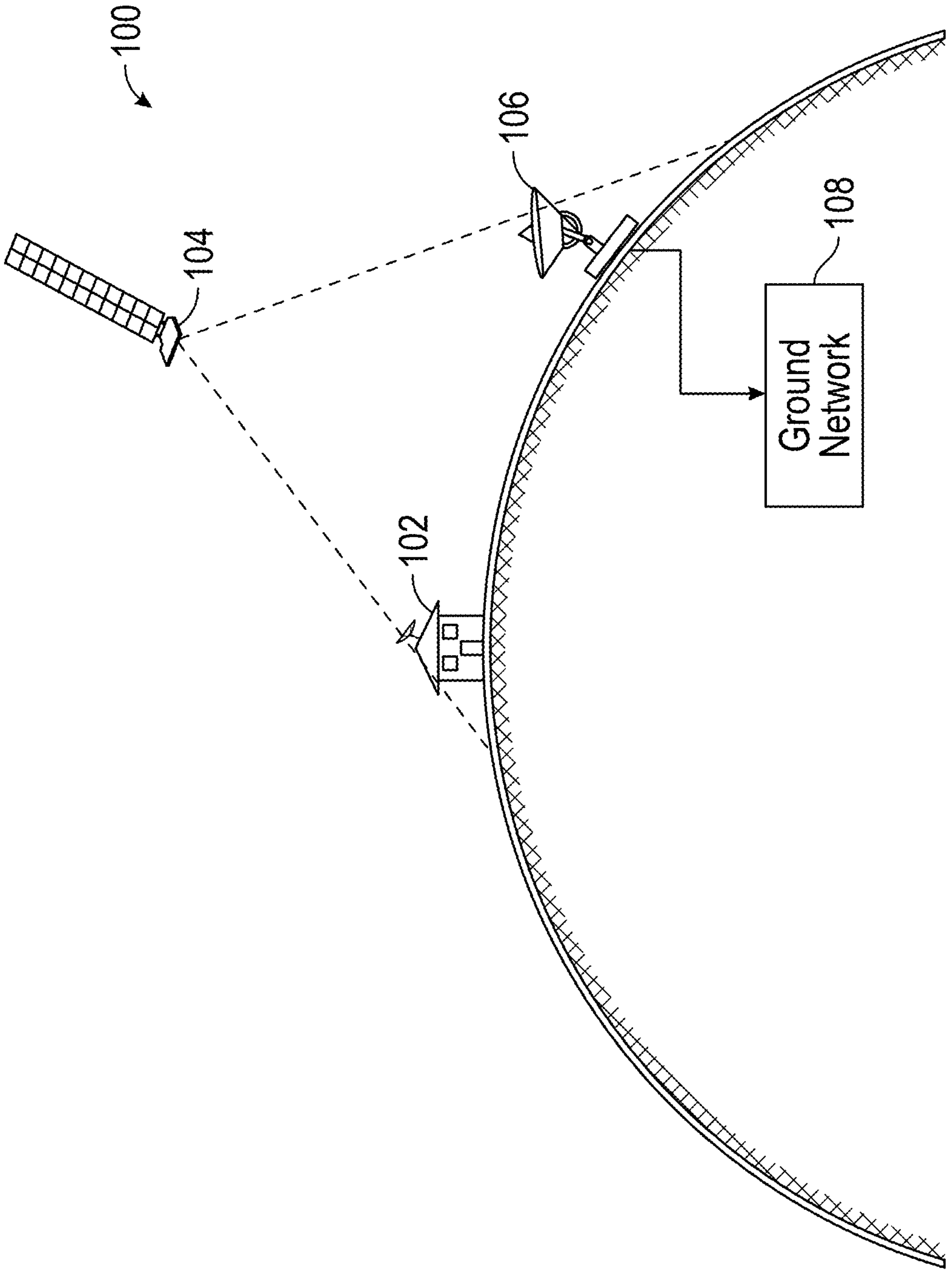
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as “top”, “bottom”, “upper”, “lower”, “vertical”, “horizontal”, “lateral”, in the present disclosure is meant to provide orientation for the reader with reference to the drawings and is not intended to be the required orientation of the components or to impart orientation limitations into the claims.

Embodiments of the present disclosure are directed to antenna apparatuses including antenna systems designed for sending and/or receiving radio frequency signals to and/or from a satellite or a constellation of satellites.

The antenna systems of the present disclosure may be employed in communication systems providing high-bandwidth, low-latency network communication via a constellation of satellites. Such constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth’s surface such as house or other a building, tower, a vehicle, or another location where it is desired to obtain communication access via a network of satellites. An Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a geographical stationary or substantially stationary object, such as a platform or a balloon.

A communication path may be established between the endpoint terminal 102 and a satellite 104. In the illustrated embodiment, the first satellite 104, in turn, establishes a communication path with a gateway terminal 106. In another embodiment, the satellite 104 may establish a communication path with another satellite prior to communication with a gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between a constellation of satellites.

Figure 2A:
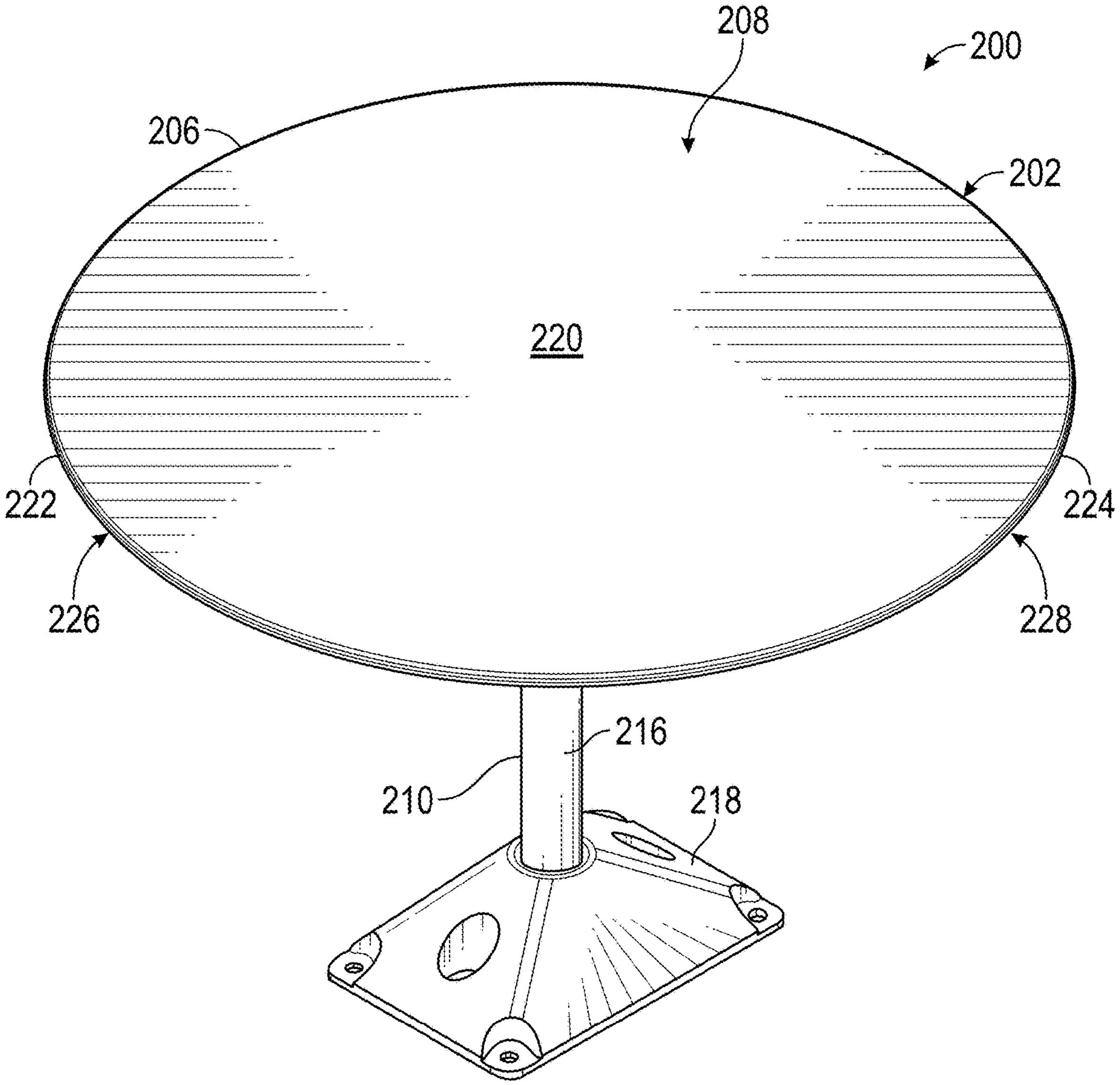
FIG. 2A is an isometric top view depicting an exemplary antenna apparatus according to one embodiment of the present disclosure.
Figure 2B:
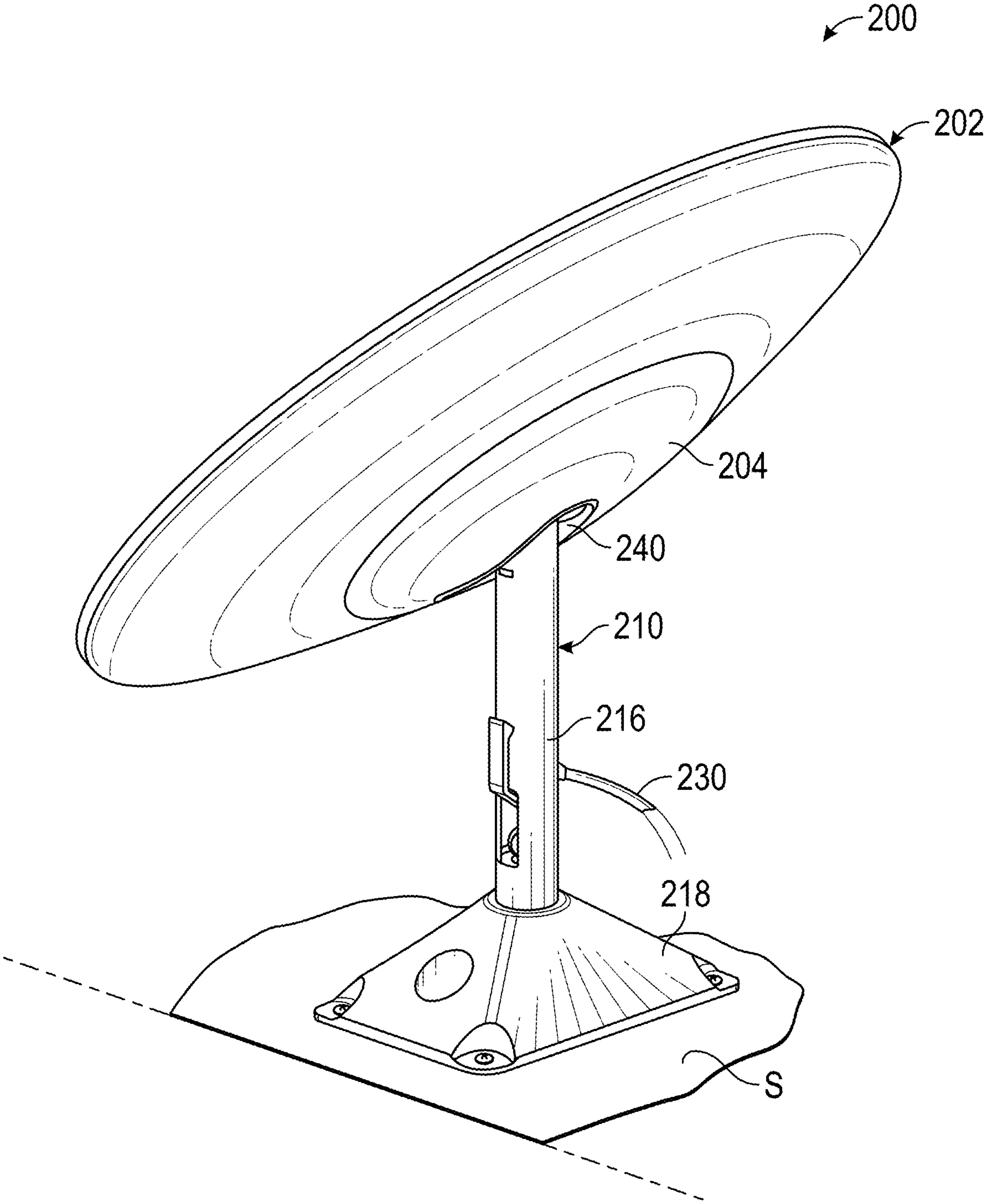
FIG. 2B is an isometric bottom view depicting exemplary antenna apparatus of FIG. 2A, showing a housing secured to a leg, wherein the leg is shown mounted to a surface according to one embodiment of the present disclosure.
Figure 3A:
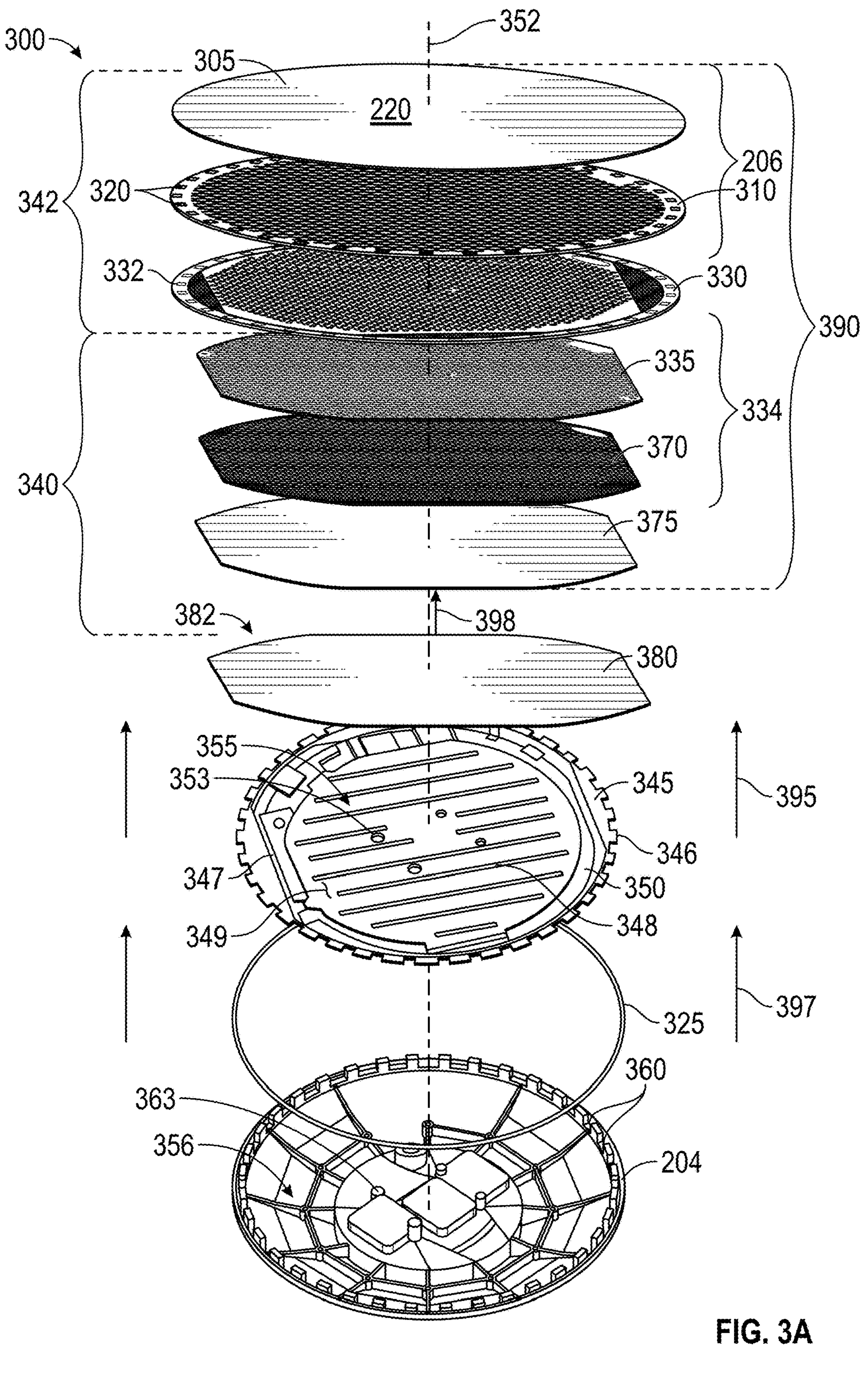
FIG. 3A is an isometric exploded view depicting an exemplary antenna apparatus including the housing and the antenna stack assembly according to one embodiment of the present disclosure.

The endpoint or user terminal 102 may include an antenna apparatus 200, for example, as illustrated in FIGS. 2A and 2B. As shown, the antenna apparatus may include a housing assembly 202, which includes a radome portion 206 and a lower enclosure 204 that couples to the radome portion 206. The housing assembly 202 may also include a chassis portion 345 (see FIG. 3) in addition to or in lieu of a lower enclosure. An antenna system and other electronic components, as described below, are disposed within the housing assembly 202. In accordance with embodiments of the present disclosure, the antenna apparatus 200 and its housing 202 may include materials for durability and reliability in an outdoor environment as well as facilitating the sending and/or receiving radio frequency signals to and/or from a satellite or a constellation of satellites with the satellites 104.

FIG. 2B illustrates a perspective view of an underside of the antenna apparatus 200. As shown, the antenna apparatus 200 may include a lower enclosure 204 that couples to the radome portion 206 to define the housing 202. In the illustrated embodiment, the mounting system 210 includes a leg 216 and a base 218. The base 218 may be securable to a surface S and configured to receive a bottom portion of the leg 216. The leg 216, shown as a single mounting leg, may be defined by a generally hollow cylindrical or tubular body, although other shapes may be suitably employed. With a hollow configuration, any necessary wiring or electrical connections 220 may extend into and within the interior of the leg 204 up into the housing 202 of the antenna apparatus 200.

Figure 33A:
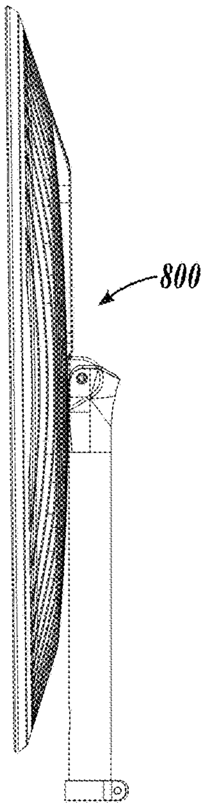
FIGS. 33A, 33B, and 33C are side views of the antenna apparatus of FIGS. 16 and 17 showing the antenna apparatus in various different tilt positions.
Figure 33B:
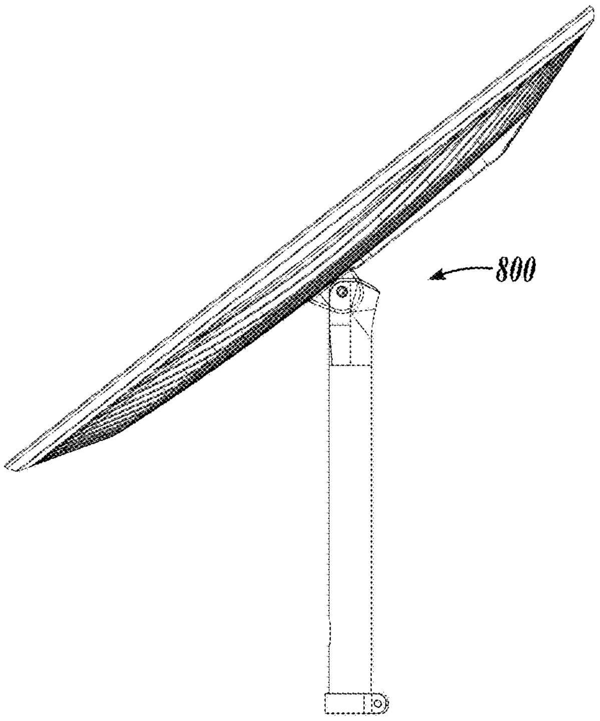
Figure 33C:
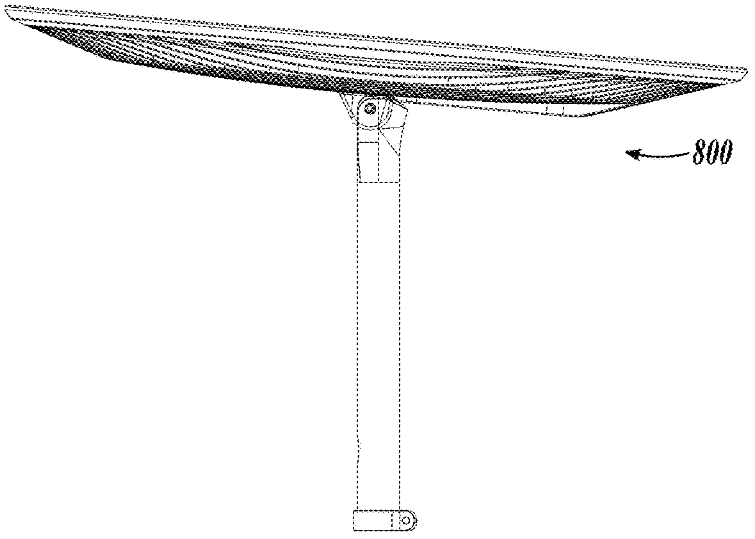

A tilting mechanism 240 (details not shown) disposed within the lower enclosure 204 permits a degree of tilting to point the face of the radome portion 206 at a variety of angles for optimized communication and for rain and snow run-off (see FIGS. 33A, 33B, 33C). Such tilting may be automatic or manual.

As discussed in greater detail below, an alternate embodiment of an antenna apparatus is provided in FIGS. 16-33C, including differences regarding the radome portion, the chassis, the leg, and the base.

Returning to FIG. 1, the antenna apparatus 200 is configured to be mounted on a mounting surface S for an unimpeded view of the sky. As not limiting examples, the antenna apparatus 200 may be mounted at an Earth-based fixed position, for example, the roof or wall of a building, a tower, a natural structure, a ground surface, an atmospheric platform or balloon, or on a moving vehicle, such as a land vehicle, airplane, or boat, or to any other appropriate mounting surface having an unimpeded view of with the sky for satellite communication.

In various embodiments, the antenna apparatus 200 includes an antenna system designed for sending and/or receiving radio frequency signals to and/or from a satellite or a constellation of satellites. The antenna system, as described below, is disposed in the housing assembly 202 and may include an antenna aperture 208 (see FIGS. 2A and 5A) defining an area for transmitting and receiving signals, such as a phased array antenna system or another antenna system. Besides the antenna aperture 208, the antenna apparatus 200 may include other electronic components within the housing assembly 202, for example, which may include, but are not limited to beamformers, a modem, a Wifi card and/or Wifi antennas, a GPS antenna, as well as other components.

Figure 3B:
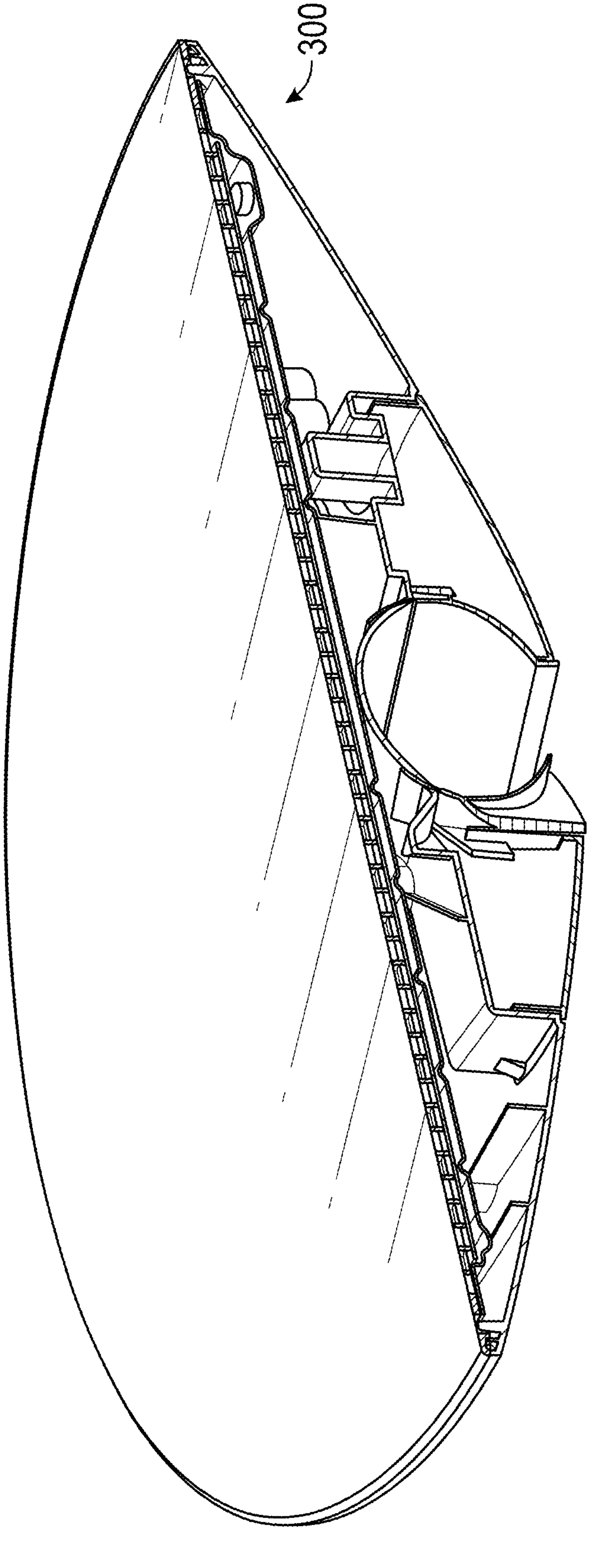
FIGS. 3B and 3C are cross-sectional views of the housing assembly of the antenna assembly of FIGS. 2A and 2B.
Figure 3C:
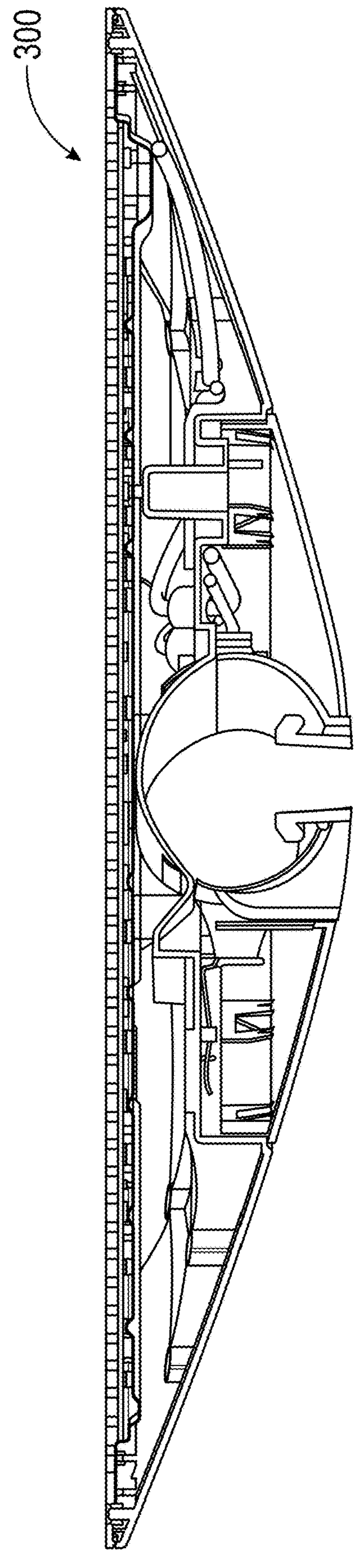

As seen in the exploded view of FIG. 3, the housing assembly 202 of the antenna apparatus 200 includes a chassis portion 345 for supporting an antenna stack assembly 300 and other electronic components. The chassis portion 345 may also serve as a heat spreader to help spread heat from conductive elements in the antenna apparatus 200 to the environment. As mentioned above, the housing assembly 202 also includes the radome portion 206 (shown as part of the antenna stack assembly 300) for protecting the antenna stack assembly 300 and other electronic components disposed within the housing assembly 202. The housing assembly 202 of the illustrated embodiment also includes a lower enclosure 204.

Referring to FIG. 3, the antenna stack assembly 300 includes a plurality of antenna components, which may include a printed circuit board (PCB) assembly 380 configured to couple to other electrical components that are disposed within the housing assembly 202. In the illustrated embodiment, the antenna stack assembly 300 includes a phased array antenna assembly made up from a plurality of individual antenna elements (see FIGS. 6A and 6B) configured in an array (see FIGS. 5A and 5B). The components of the phased array antenna assembly may be mechanically and electrically supported by a printed circuit board (PCB) assembly 380.

Radome Portion of the Housing

Referring to FIGS. 2A and 3, the radome portion 206 of the housing 202 for the antenna apparatus 200 will now be described in greater detail. The radome portion 206 is a structural surface or enclosure that protects the antenna stack assembly 300, providing an environmental barrier and impact resistance. As described in detail below, the radome portion 206 may incorporate features for snow, rain, and other dirt and moisture mitigation.

In radio frequency communication, the presence of water can attenuate electromagnetic signal transmission and/or reception by the antenna aperture 208. Therefore, radome portions in accordance with embodiments of the present disclosure are designed to mitigate the accumulation of snow, rain, and other moisture. In addition to design features for durability in various environmental conditions, radome portions described herein may be constructed from material that minimally attenuates the radio frequency signals transmitted or received by the antenna system of the antenna apparatus 200.

Referring to FIG. 2A, in the illustrated embodiment, the radome portion 206 has a planar top surface 220 extending from a first end 222 to a second end 224. In the illustrated embodiment, the radome portion 206 has a circular planar top surface 220. However, in other embodiments, the radome portion 206 may have another shape for the planar portion of the top surface, such as square, ovoid, rectangular, polygonal, or another other suitable shape.

In the illustrated embodiment of FIG. 2, the first end 222 is on the first outer edge 226 of the radome portion 206 and the second end 224 is on the second outer edge 228 of the radome portion 206. In other embodiments, the planar top surface 220 need not extend from the first outer edge 226 to the second outer edge 228 of the radome portion 206. Instead, the planar top surface 220 may only extend for a portion of the distance from the first outer edge to the second outer edge of the radome portion 206. For example, the planar top surface 220 of the radome portion 206 may have a raised planar top surface between outer edges. While illustrated as having a top planar surface, in other embodiments, a suitable radome may have curvature across its surface rather than being planar.

Figure 4:
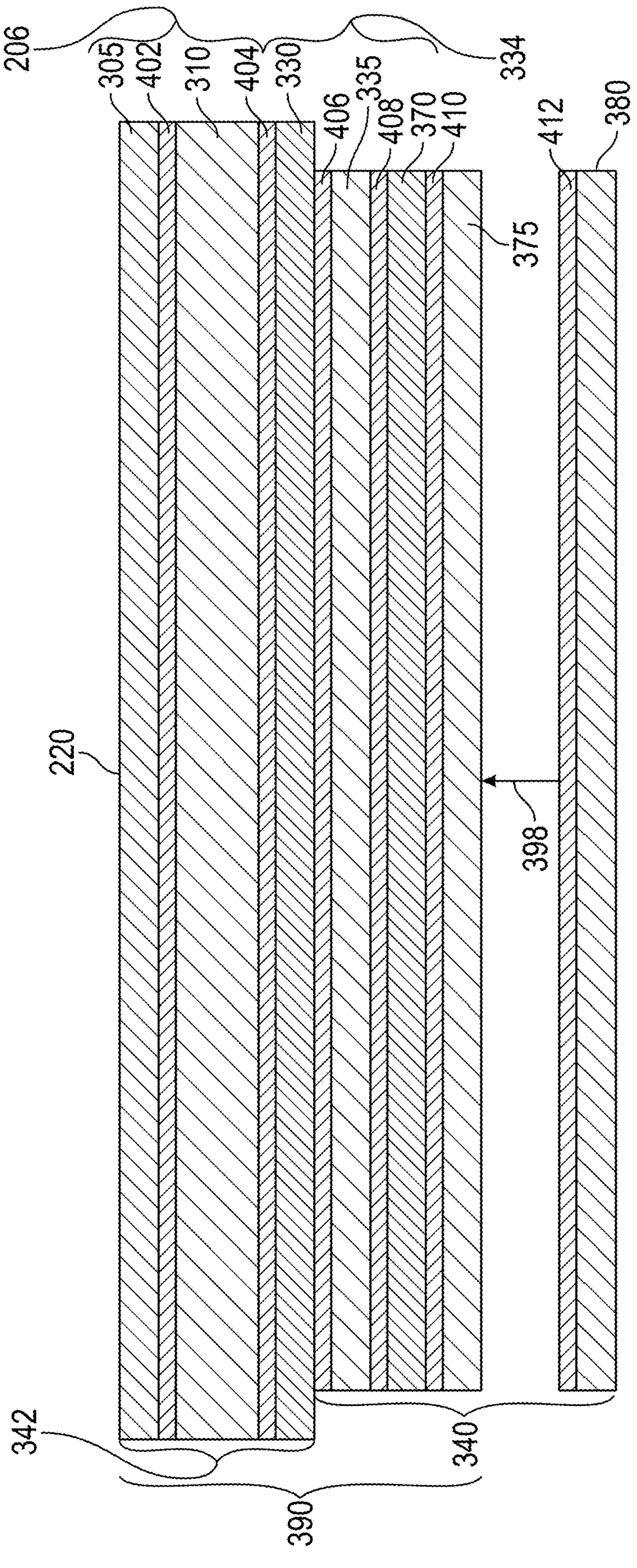
FIG. 4 is a cross-sectional view of the antenna stack assembly of the antenna apparatus of FIG. 3.
Figure 5A:
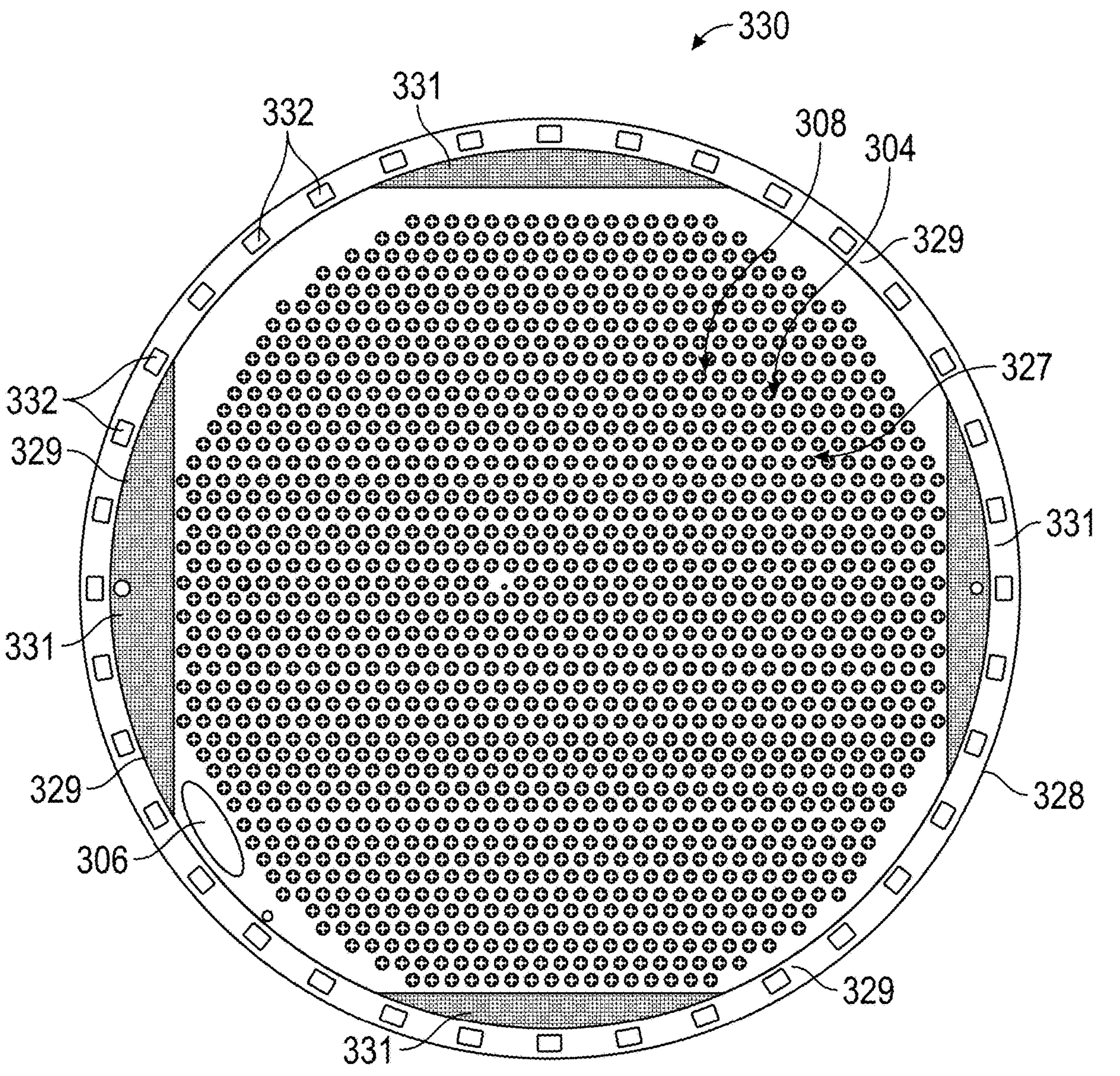
FIG. 5A is a top view of an upper patch antenna layer of the antenna stack assembly of the antenna apparatus of FIG. 3.

Referring to FIGS. 3 and 4, the radome portion 206 is designed and configured to have a uniform thickness from the first end 222 to the second end 224 of the planar top surface 220. Referring to FIGS. 3 and 5A, individual antenna elements 304 that make up the antenna array 308 defining the antenna aperture 208 of the illustrated embodiment are configured to be equally distanced from the planar top surface 220 of the radome portion 206. A bottom planar surface of the radome portion 206 (see FIG. 4) is designed to be adjacent and/or equally distanced from a top surface of a patch antenna assembly 334, as described in greater detail below.

On advantageous effect of a planar top surface 220 for the radome portion 206 is that the flat surface allows for minimal tuning of specific antenna elements 212 in an antenna array to account for differences in radome thickness and/or differences in spacing between the radome portion 206 and each of the individual antenna elements 304 in the antenna array 308. With a constant thickness of the radome portion 206, all of the individual antenna elements 304 in the antenna array 308 can be tuned the same to account for attenuation of the electromagnetic signal by the radome portion 206 and also for impedance matching between the antenna elements 304 and the radome portion 206.

Referring to FIGS. 3 and 4, which show respective exploded and cross-sectional views of the antenna stack assembly 300, the radome portion 206 of the illustrated embodiment includes a plurality of layers 305 and 310. In one non-limiting example, the plurality of layers includes a radome layer (or radome) 305 and a radome spacer layer (or radome spacer) 310 for providing mechanical and environmental protection to the antenna aperture 208 and other electrical components associated with the housing assembly 202 of the antenna apparatus 200. The radome 305 and radome spacer 310 may together be referred to as the radome portion or radome assembly 206.

In one embodiment of the present disclosure, the radome 305 is designed to be an outer layer, which is exposed to the outdoor environment and has mechanical properties of good strength to weight ratios, a high modulus of elasticity for stiffness and resistance to deformation, and a low coefficient of thermal expansion (CTE). So as not to impede RF signals, the radome 305 has electrical properties of a low dielectric constant, a low loss tangent, and a low coefficient of thermal expansion (CTE). In addition, in some embodiments, the radome 305 has chemical properties of bondability for bonding with adhesive and low or near zero water absorption. Without such bondability, the radome lay-up can buckle in extreme weather conditions.

The radome 305 is designed to maintain high mechanical values and electrical insulating qualities in both dry and humid conditions over thermal cycles between −40° C. and 85° C. In some embodiments, the radome 305 has high yield strength and a high enough modulus to spread load on the radome 305 to the radome spacer 310. In some embodiments of the present disclosure, the radome 305 has a dielectric constant of less than 4. In some embodiments of the present disclosure, the radome 305 has a loss tangent of less than 0.001.

In one embodiment of the present disclosure, the radome 305 may be constructed of a fiberglass base for mechanical strength. The fiberglass may be laminated with a polymer or copolymer of polyethylene, which may be functionalized with fluorine and/or chlorine. The laminate may be a fluorinated polymer (fluoro polymer), such as polytetrafluoroethylene (PTFE) or a copolymer of ethylene and chlorotrifluoroethylene, such as ethylene chlorotrifluoroethylene (ECTFE). The radome 232 may be fiberglass-reinforced epoxy laminate material, such as FR-4 or NEMA grade FR-4. In other embodiments, the radome 305 may be another type of high-pressure thermoset plastic laminate grade, or a composite, such as fiberglass composite, quartz glass composite, Kevlar composite, or a panel material, such as polycarbonate. In addition, the radome 305 may include a top hydrophobic layer may include a layer having hydrophobic paint or a polytetrafluoroethylene (PTFE) coating.

In accordance with embodiments of the present disclosure, the radome 305 may be a lay-up made from a first layer made from fibrous material, such as fiberglass or Kevlar fibers, preimpregnated with a resin, such as an epoxy or polyethylene terephthalate (PET) resin. The radome 305 may include one or more additional layers that include UV protection and/or water mitigation. For example, a second layer may be made from a fluorinated polymer (fluoropolymer), such as polytetrafluoroethylene (PTFE) to aid in hydrophobic properties resulting in beading of water droplets on the surface of the radome 305. The second layer may include titanium dioxide doping at up to 10% for UV protection.

In one non-limiting example, the radome 305 layers may be combined by a lamination process, which may require activation of the fluoropolymer layer for bonding. Suitable activation may include sodium etching, plasma treatment, flame treatment, or other suitable activation treatments to create bonding sites. In another non-limiting example, the fluoropolymer layer may be coated on the first layer of the radome 305 using an emulsion coating.

The thickness of the radome 305 may be in the range of less than or equal to 60 mil (1.5 mm), less than or equal to 30 mil (0.76 mm), less than or equal to 20 mil (0.51 mm), or less than or equal to 10 mil (0.25 mm). The thickness may depend on the conditions of the environment in which the antenna apparatus 100 resides, for example, with greater radome 305 thickness being used in geographic locations having harsh weather conditions, such as heavy rain and hail. However, a thinner radome 305 may reduce RF signal attenuation from the antenna array. In one embodiment, the radome 305 has a thickness of 0.5 mm.

A radome spacer 310 supports the radome 305 in providing mechanical and environmental protection to the antenna aperture 208 and other electrical components inside the housing assembly 202 of the antenna apparatus 200. The radome spacer 310 also provides suitable spacing between the antenna elements of the antenna aperture 208 and the outer top surface 220 of the radome 305.

In one non-limiting example, the radome spacer 310 is a plastic or foam layer having properties of low dielectric constant, low loss tangent, good compression strength, and a suitable coefficient of thermal expansion (CTE). In addition, the radome spacer 310 may have bondability for bonding with adhesive for coupling with other layers in the antenna stack assembly 300.

Like the radome 305, the radome spacer 310 is also designed to maintain high mechanical values and electrical insulating qualities in both dry and humid conditions over thermal cycling between −40° C. and 85° C. In some embodiments of the present disclosure, the radome spacer 310 has a dielectric constant of less than 1.0. In some embodiments of the present disclosure, the radome spacer 310 has a loss tangent of less than 0.001.

The radome 305 may be adjacent or coupled to a radome spacer 310 to space the outer top surface of the radome 305 from components of the antenna stack assembly 300. As described in greater detail below, such spacing can provide advantages in reduced signal attenuation due to environmental effects on the outer top surface of the radome 305, such as dirt, dust, moisture, rain, and/or snow.

In one embodiment, the radome 305 may be coupled to the radome spacer 310, for example, by adhesive bonding. As mentioned above, the radome 305 and radome spacer 310 may together be referred to as a radome portion or radome assembly 206. The radome spacer 310 may also have a planar and circular shape corresponding to that of the radome 305.

As seen in the cross-sectional view of FIG. 4, the radome spacer 310 may be thicker than the radome 305. In accordance with embodiments of the present disclosure, the radome spacer 310 has a thickness such that the distance from the top patch antenna layer to the top of the radome in the range of greater than about 3.0 mm, less than about 4.5 mm, or in the range of 3.0 mm to 4.5 mm. The thickness of the radome spacer 310 is described in greater detail below with reference to EXAMPLE 3.

The radome spacer 310 may include a spacing configuration to space the radome 305 from the antenna aperture 208 with air. As one non-limiting example, the radome spacer 310 may be made from foam material having air disposed within the structure of the foam. Foam spacers may be advantageous materials in some environments because of their lower dielectric constant and lower thermal conductivity. For example, in cold environments (such as cold climates or for antenna apparatuses 200 disposed on airplanes) foam spacers may provide an insulative effect for electrical components). One suitable foam may be a polymethacrylimide (PMI) or a urethane foam. However, other foams are within the scope of the present disclosure. Foams, unlike other materials described herein having thermal conductivity, may require separate heating systems for snow melt.

In other embodiments, the radome spacer 310 may be a frame structure. In one suitable embodiment, the frame structure may be designed to have air spaces within the structure of the plastic. One suitable frame structure may be a honeycomb structure. A suitable honeycomb structure may be made from a low-loss plastic material (such as thermoplastic or another suitable plastic material), which may be configured in a honeycomb frame construction.

In other embodiments, the radome spacer 234 may be air.

In the illustrated embodiment of FIG. 3 (see also FIGS. 5B and 11A), the radome spacer 310 includes an interior portion 327 and an exterior portion 328. In the illustrated embodiment, the interior portion 327 includes a plurality of cell walls 316 defining a plurality of apertures 315 (see FIGS. 5B and 11A). The exterior portion 328 extends around the outer perimeter of the interior portion 327, and may be a solid portion to assist in heat transfer around the outer perimeter of the antenna apparatus 200.

Figure 5B:
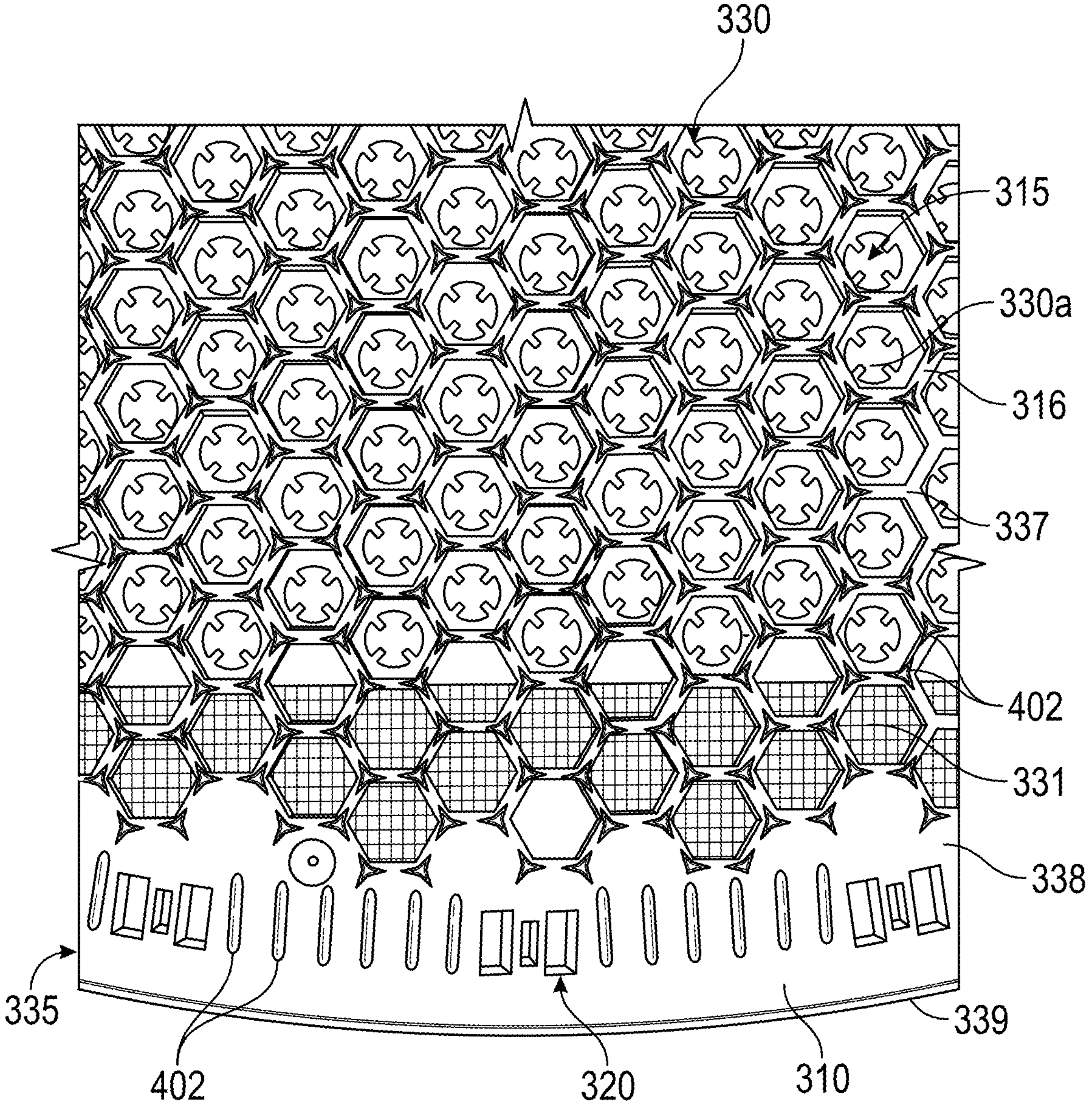
FIG. 5B is a close-up top view of the radome spacer of the antenna stack assembly of the antenna apparatus of FIG. 3 showing the upper patches of antenna elements in apertures of the radome spacer.
Figure 11A:
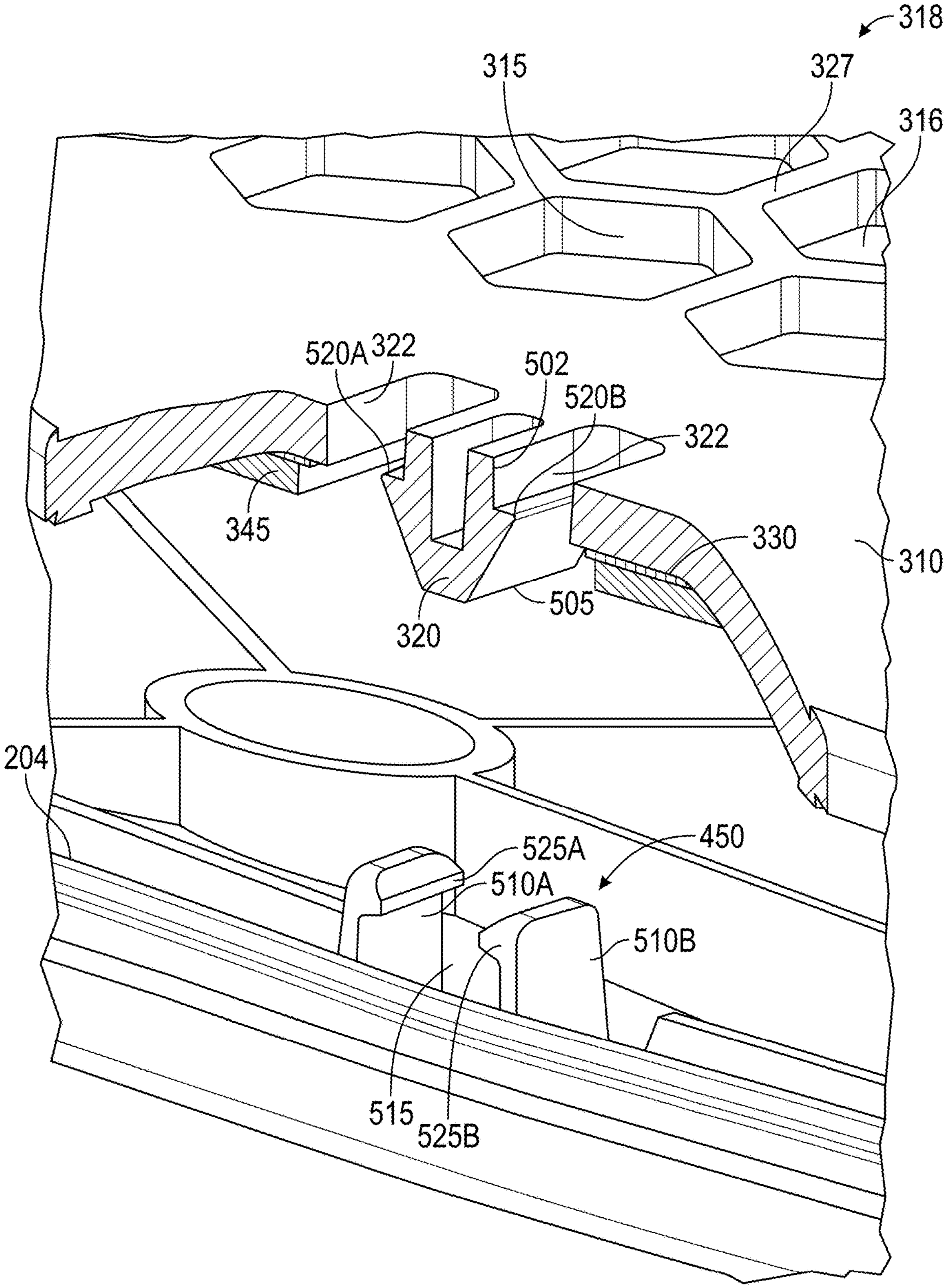
FIGS. 11A and 11B are isometric partial cut-away view showing a disengaged and engaged fastener system for the antenna assembly of FIGS. 2A and 2B in accordance with embodiments of the present disclosure.

Each of the plurality of cell walls 316 may include an opening at the top, an opening at the bottom, and a vertical pathway therebetween defining an aperture 315 (see FIGS. 5B and 11A). Each vertical pathway is configured to vertically align with an individual antenna element 304 in the antenna array 308 to provide an airspace above each upper patch element 330*a* of each antenna element 304 in the antenna array 308. (See FIGS. 6A and 6B for exemplary antenna element structures.) Of note, each of the illustrated antenna elements 304 of the antenna stack assembly 300 include an upper patch 330*a* and a lower patch 370*a* spaced from each other and spaced from a PCB assembly 380 (see FIG. 6A). The plurality of apertures 315 defined by the cell walls 316 may be made in the shape of a hexagon in a honeycomb configuration as shown, or may have any shape including polygonal, such as a square, rectangle, hexagon, octagon, or may be circular or oval.

In accordance with embodiments of the present disclosure, the radome spacer 310 may be made of a suitable material for strength and integrity in the antenna stack assembly 300 and also to mitigate any RF interference with antenna signals from the antenna array 308. As described in greater detail below, the apertures 315 in the radome spacer 310 may also be designed and configured such that the thermal path of heat transmits through the cell walls 316 surrounding the apertures 315.

In one embodiment, the radome spacer 310 may be made from a plastic such as polyethylene (PE), such as linear low density polyethylene (LLDPE), high density polyethylene (HDPE), as well as other plastics such as polypropylene (PP), polyethylene terephthalate (PET), polyvinyl chlorine (PVC), or other suitable polymers. A suitable plastic may be thermally conductive and capable of dissipating heat through its structure, while also have a low dielectric constant. In one embodiment of the present disclosure, the radome spacer 310 may have a dielectric constant of less than 3.0, and a thermal conductivity value of greater than 0.35 W/m-K or greater than 0.45 W/m-K.

In particular, LLDPE may be employed, and may have a melt index of from about 10 to about 30 g/min, or alternatively from about 15 to about 25 g/min, or alternatively about 20 g/min at 190° C./2.16 kg. A commercially available suitable LLDPE includes the Bapolene® family of LLDPEs. Radome spacers 310 made from plastic may be formed by injection molding or any other suitable method of manufacture. In addition, radome spacers 310 may include UV additives to protect the radome spacer 310 from any UV light that passes through the radome 305.

Although illustrated and described as a single spacing layer, the radome spacer 310 may be a plurality of spacer elements defining the space between the radome portion 305 and the top layer of the patch antenna assembly 334.

As mentioned above and as shown in FIG. 5B, each of the plurality of apertures 315 may include a vertical pathway to align with each upper patch element 330*a* of each individual antenna elements 304 in the antenna array 308. In view of these vertical pathways, the radome spacer 310 may be designed such that there is a low volume of solid material, with air making up a significant portion of the volume of the structure. The presence of air (which may also be considered the omission of solid material) in the radome spacer 310 reduces interference with the signal communication of the antenna elements 304. At the same time, the presence of solid material making up the cell walls of the radome spacer 310 provides structure to the antenna stack assembly 300 and allows for dissipation and flow of heat from the electrical components of the antenna stack assembly 300 through its conductive cell walls 316.

As mentioned above, and as seen in FIG. 5B, the radome spacer 310 includes an interior portion 327 defining a plurality of honeycomb cell walls 316 defining a plurality of honeycomb apertures 315, and an exterior portion 328 extending around the outer perimeter of the interior portion 327. Therefore, the interior portion 327 defining honeycomb cell walls may make up only a portion of the radome spacer 310. For example, the interior portion 327 may be present in greater than 75%, greater than 85%, or greater than 90%, greater than 95%, and in some embodiments 100% of the surface area of the radome spacer 310. The exterior portion 328 of the radome spacer 310 may be of different construction than the interior portion 327, for example, a solid or non-honeycomb construction, to provide integrity to the radome spacer 310 and the radome assembly 206 along its outer perimeter 339.

The cell walls 316 of the interior portion 327 radome spacer 310 may provide a greater proportion of air to mitigate any RF interference with antenna signals from the antenna array 308. In some embodiments, the volumetric ratio of air to solid surface area or the body of the radome spacer 310 is greater than about 50:50, or alternatively greater than about 65:45, or alternatively greater than about 75:25, or alternatively greater than about 80:20, or alternatively greater than about 85:15, or alternatively greater than about 90:10.

The radome 305 and the radome spacer 310 may be joined to each other using suitable joining methods, as described in detail below. Likewise, the radome portion 206 may be joined with a lower enclosure 204 to form the housing 202 of the antenna apparatus 200, as described in greater detail below. In some embodiments of the present disclosure, the radome spacer 310 may include a plurality of projecting fasteners (see FIGS. 11A and 11B) radially arranged around its perimeter for coupling with the lower enclosure 204 to define an inner chamber of the housing 202 (as described in greater detail below). In other embodiments, the radome portion 206 may be joined to a chassis in lieu of a lower enclosure, as described in greater detail below (see FIG. 18).

RF signal attenuation due to gain degradation can be significant as a result of rain or moisture accumulation on the planar top surface 220 of the radome portion 206. Regarding rain and moisture accumulation, water has a significant relative permittivity which can introduce a non-trivial interface for an antenna aperture causing RF reflection. Such RF reflection results in gain degradation in the RF signal.

Snow accumulation on the planar top surface 220 of the radome portion 206 was generally not found to be as degrading to the RF signal power as water accumulation. However, snow with any moisture content was found to be degrading, such as snow at or near 0° C., or melting snow or ice resulting in water accumulation on the on the planar top surface 220 of the radome portion 206 was found to significantly degrade the RF signal power.

For moisture mitigation and to aid in the run-off of water or moisture accumulating on the radome 232, the planar top surface 220 of the radome 232 may include a top hydrophobic layer (not shown) having low surface energy to cause water to bead up and not spread out. Non-limiting examples of a top hydrophobic layer may include a layer having hydrophobic paint or a polytetrafluoroethylene (PTFE) coating. In other non-limiting examples, the radome 232 may include additives, such as platicizers, within the radome 232 to cause the radome 232 have hydrophobic properties.

In addition to surface treatments for the planar top surface 220 of the radome portion 206, tilting of the radome portion 206, as described in greater detail below (see FIGS. 18A, 18B, 18C), may help to mitigate snow and moisture accumulation.

To mitigate signal attenuation due to the lingering presence of droplets of rain, the top surface 220 of the radome portion 206 is spaced a predetermined distance from the antenna aperture 208. In accordance with embodiments of the present disclosure, the radome spacer 310 provides a suitable thickness to the radome portion 206 (described above) to space the top surface 220 of the radome portion 206 a predetermined distance from the upper patch layer 330 of the antenna elements 306 of the antenna array 304. In one embodiment of the present disclosure, the top surface of the radome portion 206 is equidistantly spaced from the upper patch antenna element of each individual antenna element in the antenna array at a distance of at least 3.0 mm.

Example 1

Radome Snow Mitigation

The radome reduces the effect of gain degradation due to snow accumulation. With no radome and 1 inch of snow on the antenna aperture, degradation in received power was found to be 4 dB (receiving) and 9 dB (transmitting). Minimum degradation in received power observed over all trials was 0.7 dB and 2.2 dB (with and without radome, respectively). Corresponding maximum degradation was 7.8 dB and 19.4 dB (with and without radome, respectively). With a radome composed of about 3.0 mm foam in accordance with embodiments of the present disclosure, gain degradation was reduced to 0.8 dB (receiving) and 2.6 dB (transmitting).

Example 2

Radome Rain Mitigation

The radome reduces gain degradation due to water accumulation. With no radome and water accumulation on the antenna aperture, gain degradation was found to be up to 3 dB. With a radome composed of about 3.0 mm foam in accordance with embodiments of the present disclosure, gain degradation was reduced to about 1 dB.

Example 3

Radome Optimized Thickness

Four radome spacings were measured (with the spacing distance spanning from the top surface of the radome to the top surface of the antenna aperture) to evaluate the effect on gain degradation as a result of rain accumulation: 1.5 mm, 3.0 mm, 4.5 mm, and 6.0 mm. The data showed significant reductions in gain degradation for a radome thickness of 3.0 mm. For a radome thickness greater than 3.0 mm, additional reductions in gain degradation were nominal.

Chassis and/or Lower Enclosure Support of Antenna Stack Assembly

Referring to FIG. 3, the chassis portion 345 and lower enclosure portions 204 of the housing assembly 202 will now be described in greater detail. The chassis portion 345 supports the electronic features of the antenna apparatus 200, including any of the radome portion 206, the antenna array 308, the PCB assembly 380, and any other electrical components contained in the housing assembly 202, such as beamformers, the modem, GPS, Wi-Fi card, Wi-Fi antennas, etc. The chassis portion 345 may be a heat spreader designed and configured to conductively spread heat generated by the various electrical components to the outside environment.

In the illustrated embodiment of FIG. 3, the lower enclosure 204 is the bottom most part of the housing assembly 202 of the antenna apparatus 200, configured to provide support for and enclose the components contained within the housing assembly 202. In the illustrated embodiment (see FIG. 7A), a first inner chamber 355 is defined between the chassis 345 and the radome portion 206 for supporting the antenna aperture 208 on the PCB assembly 380 and the electronic features of the antenna stack assembly 300. The lower enclosure 204 may define a second inner chamber 356 between the lower enclosure 204 and the chassis 345. Components relating to the tilting mechanism for the antenna apparatus 200 may reside in the second inner chamber 356.

In the illustrated embodiment of FIG. 3, the chassis 345 includes an inner wall 347. Within the inner wall 347, the chassis includes a support platform 349 and one or more moat sections 350 which may include a plurality of pocket sections 350. The support platform 349 includes a bonding system shown as a plurality of bonding bars 348 extending therefrom to provide support to the electronic features of the antenna stack assembly 300. In the illustrated embodiment, the bonding bars 348 extending laterally, parallel to one another.

The bonding bars 348 of the chassis 345 provide multiple points of bonding between the antenna stack assembly 300 and the chassis portion 204 to mitigate buckling of the PCB assembly 380 (as a result of thermal cycling). In previously designed systems, printed circuit board (PCB) assemblies were generally screwed down to a chassis. Such screw configuration is difficult to design to withstand buckling.

The antenna stack assembly 300 may be bonded to the bonding bars 348 using a low stiffness adhesive to further mitigate buckling. In some embodiments of the present disclosure, the adhesive is an acrylic foam adhesive. In some embodiments, the shear modulus of a 0.5 mm bondline of adhesive is less than 0.34 MPa. In some embodiments, the shear strain capability of the bondline is greater than 150%. The adhesive allows for stress distribution, shock absorption, and has the flexibility to expand and contract to adjust to extreme temperatures without disconnecting from the components to which it is connected. As a non-limiting example, the adhesive may be a VHB brand tape manufactured by 3M Corporation. Such adhesive may have poor heat conductivity.

Although shown as bonding bars 348, other configurations of chassis bonding systems designed to mitigate buckling of a PCB assembly are within the scope of the present disclosure. As a non-limiting example, the bonding system may include a grid of bonding posts instead of bonding bars.

Figure 10:
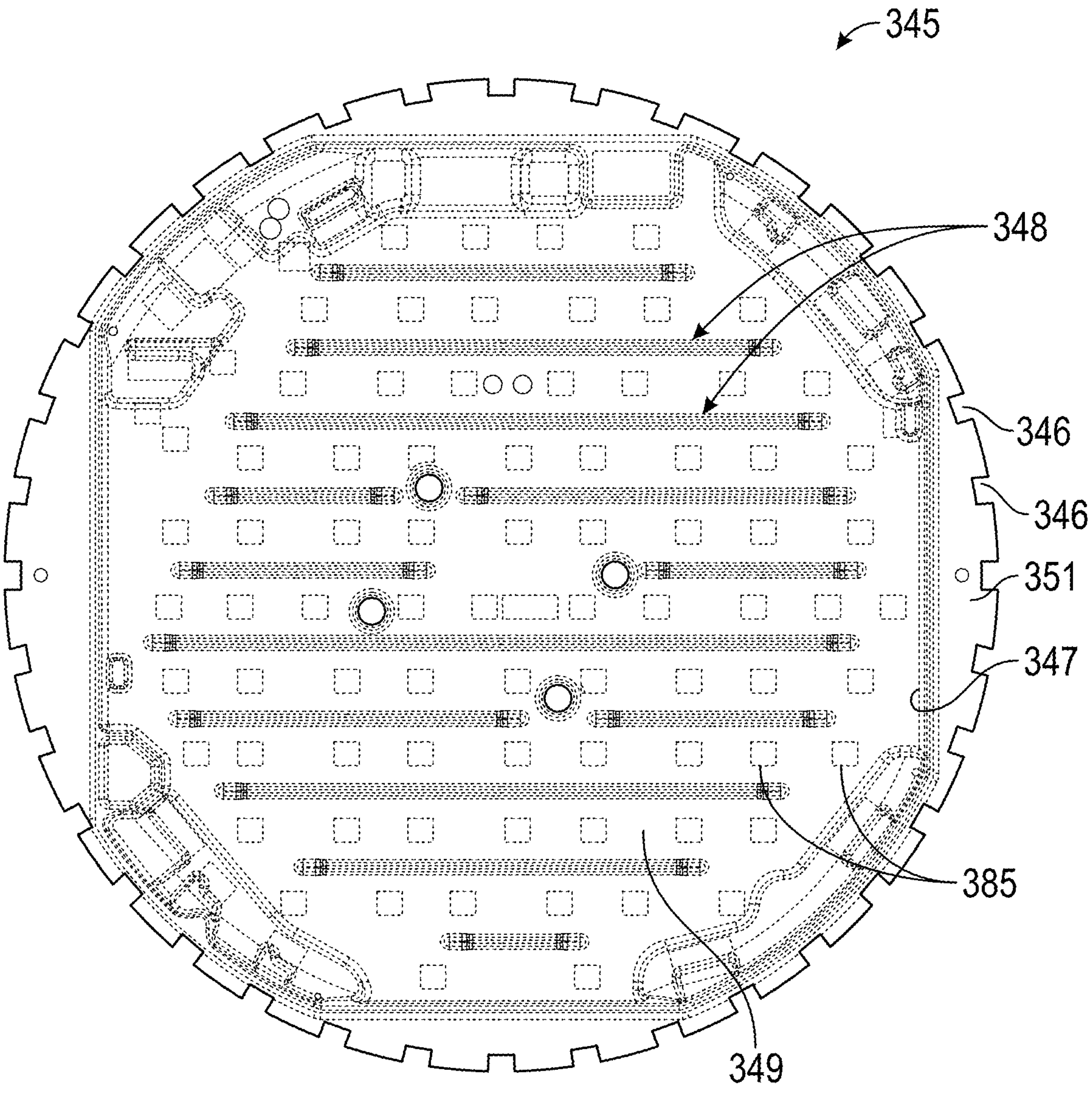
FIG. 10 is a top view of a chassis of the antenna apparatus of FIG. 3.

Referring to FIG. 10, one or more moat sections 350 extend around at least a portion of the outer perimeter of the support platform 349 of the chassis 345. The moat sections 350 provide spacing for components of the electronic features of the antenna apparatus 200, such as power inductors. Various conductive protrusions 385 may extend from the moat sections to provide additional support and thermal mitigation to the electronic components of the antenna system outside the regions of the bonding bars 348. In one embodiment of the present disclosure, the conductive protrusions 385 may be made from a metal material, such as aluminum, or thermal interface material (TIM), and may provide a thermal path for heat dissipation.

The chassis may be made from any suitable material. In one embodiment, the chassis 345 may be made from metal, such as aluminum, or another conductive material to provide a thermal path for heat dissipation from the radiating components in the antenna apparatus 200. The chassis portion 204 may be manufactured as a discrete part, for example, by a process for integrally forming a part, such as a casting process. The bonding bars 348 and the moat sections 350 both add to stiffness of the chassis portion 204. Such stiffness provides advantages in durability. In addition, the bonding bars 348 and the moat sections 350 assist with mold flow during manufacturing.

Extending outwardly around the inner wall 347, the chassis 345 includes a perimeter section 351 configured for interfacing with the radome portion 206. A plurality of detents 346 around the outer perimeter of the chassis 345 accommodate a fastening system 510 (described below) between the radome portion 206 and the lower enclosure 204.

As seen in the illustrated embodiment of FIG. 3, the chassis 345 may be configured to couple to the lower enclosure 204 via a plurality of fasteners (not shown) configured to extend between holes 353 in the chassis 345 and fastener receivers 363 in the lower enclosure.

Referring to FIG. 3, the lower enclosure 204 includes a plurality of mating fastener portions 360 radially arranged around its circumferential perimeter for coupling to the radome portion 206. The lower enclosure 204 may be made up of a plastic, and may include PE, polypropylene (PP), LLDPE, HDPE, polyethylene terephthalate (PET), polyvinyl chlorine (PVC) or other suitable materials. In some embodiments, the lower enclosure 350 may be omitted, and instead, the chassis 345 may serve as the lower enclosure (see e.g., the embodiment shown in FIG. 18).

Antenna Array

In accordance with embodiments of the present disclosure, phased array antennas described herein include a plurality of antenna elements to simulate a large directional antenna. An advantage of the phased array antenna is its ability to transmit and/or receive signals in a preferred direction (i.e., the antenna's beamforming ability) without physically repositioning or reorienting the system.

In accordance with one embodiment of the present disclosure, a phased array antenna system is configured for communication with a satellite that emits or receives radio frequency (RF) signals. The antenna system includes a phased array antenna including a plurality of antenna elements distributed in one or more rows and/or columns and a plurality of phase shifters configured for generating phase offsets between the antenna elements.

A two-dimensional phased array antenna is capable of electronically steering in two directions. An exemplary phased array antenna may include a lattice of a plurality of antenna elements distributed in M columns oriented in a first direction and N rows extending in a second direction at an angle relative to the first direction (such as a 90 degree angle in a rectangular lattice or a 60 degree angle in a triangular lattice) configured to transmit and/or receive signals in a preferred direction.

FIG. 5A shows a schematic layout or lattice 308 of individual antenna elements 304 of a two-dimensional phased array antenna. The illustrated phased array antenna layout 308 includes antenna elements 304 that are arranged in a 2D array of M columns by N rows. For example, the phased array antenna layout 308 has a generally circular or polygonal arrangement of the antenna elements 304. In other embodiments, the phased array antenna may have another arrangement of antenna elements, for example, a square arrangement, rectangular arrangement, or other polygonal arrangement of the antenna elements. As described above, the antenna elements 304 are arranged in multiple rows and columns and can be phase offset such that the phased array antenna emits a waveform in a preferred direction. When the phase offsets to individual antenna elements are properly applied, the combined wave front has a desired directivity of the main lobe.

In accordance with embodiments of the present disclosure, the antenna stack assembly 300 is designed to meet various goals of antenna performance, heat transfer, and manufacturability. In that regard, antenna performance is most optimal if the upper and lower antenna patches 330*a* and 370*a* are spaced from each other by spacers that approximate air with a space above the upper patch 330*a* that approximates air, while also being thermally conductive. Through-plane heat transfer vertically through the radome spacer 310 and the antenna spacer 335 requires the presence of thermally conductive material (for example, defining the cell walls) in the near vicinity of the upper and lower antenna patches 330*a* and 370*a*. Likewise, the manufacturability of the radome spacer 310 and antenna spacer 335 is improved by a minimum wall thickness in the cell structure.

In accordance with embodiments of the present disclosure, the upper and lower patch antenna elements may have a longest dimension in the range of 6 mm to 8 mm. The center of each of the upper and lower patch antenna elements may spaced from the center of adjacent upper and lower patch antenna elements by a distance in the range of 11 mm to 13.5 mm. The cell height of the antenna spacer 335 may be in the range of 1 mm to 2 mm. Likewise, the cell walls of the antenna spacer 335 are in the range of 1 mm to 2 mm wide. The adhesive patterns at either end of the cell walls may have a height in the range of 0.005 mm to 0.01 mm.

A suitable plastic for the antenna spacer 335 may be thermally conductive and capable of dissipating heat through its structure, while also have a low dielectric constant. In one embodiment of the present disclosure, the antenna spacer 335 may be made from the same or similar materials as the radome spacer 310 and may have a dielectric constant of less than 3.0, and a thermal conductivity value of greater than 0.35 W/m-K or greater than 0.45 W/m-K.

The radome spacer 310 may have similar dimensions, properties, and adhesive properties. However, the radome spacer 310 may have a different height than the antenna spacer 335, for example, in the range of 2 mm to 3 mm.

As one non-limiting example, the lower patch antenna element is 6.8 mm in diameter, and the upper patch antenna is 7.5 mm in diameter. In the illustrated embodiment, adjacent antenna elements may be spaced 12.3 mm from each other in a triangular lattice (see FIG. 5A). The height of antenna spacer 335 may be 1.2 mm with a 0.075 adhesive bond line on either side, for a total height of 1.35 mm. (The radome spacer 310 is 2.35 mm thick with a 0.075 adhesive bond line on either side, for a total thickness of 2.5 mm.) The cell walls of the antenna spacer 335 and the radome spacer 310 are 1.5 mm with a 5 degree draft.

Antenna Layers

Referring to FIGS. 3 and 4, the antenna stack assembly 300 disclosed herein may include a plurality of planar layers including a radome, antenna layers, and alternating layers of spacers having particular characteristics. The spacer layers may be made up of different materials which may be difficult to couple with the other layers of the assembly using typical lamination processes. Accordingly, described herein are processes for bonding the plurality of layers together despite their differences. Suitable processes may use particular adhesives, such as epoxy-based adhesives, as well as a stencil patterning and heat pressing to form an assembly that facilitates a combination of potentially competing interests including heat dissipation, signal transmission, antenna resonance, ease of assembly, and durability. The adhesive patterns employed additionally allow for the venting of air and moisture to further improve the functionality and structural integrity of the antenna stack assembly 300.

FIGS. 3 and 4 illustrate an exemplary antenna stack assembly 300 in the form of a plurality or stack of layers. The illustrated plurality of layers includes alternating layers of spacers bonded to other layers including antenna layers or layers including antenna elements or components, which may be for instance electronic layers, such as printed circuit board (PCB) layers. Adjacent layers may be bonded together using an adhesive (not shown in FIG. 3, but shown in FIG. 4). In one suitable process, the adhesive may be applied using a stenciling process and a pressing process as further described in FIGS. 8A-8C below. The patterns employed facilitate bonding as well as providing bonding for the plurality of layers and support for the antenna stack assembly 300 without attenuating signal.

In the illustrated embodiment of FIG. 3, the layers in the antenna stack assembly 300 layup include a radome assembly 206, a patch antenna assembly 334, a dielectric layer 375, and a printed circuit board (PCB) assembly 380.

As illustrated in FIG. 3, an outer top layer of the antenna stack assembly 300 includes a radome portion 206. As described above, in the illustrated embodiment, the radome portion 206 is a radome assembly including a radome 305 and a radome spacer 310.

In the illustrated embodiment of FIG. 3, a patch antenna assembly 334 is a phased array antenna assembly made up from a plurality of individual patch antenna elements 304 (see FIGS. 6A and 6B) configured in an array 308 (see FIG. 5A for a top view of an array of upper patch antenna elements 330*a*). A patch antenna is generally a low profile antenna that can be mounted on a flat surface, including a first flat sheet (or "first patch") of metal mounted over, but spaced from, a second flat sheet (or "second patch") of metal, the second patch defining a ground plane. The two metal patches together form a resonant structure. In an alternate embodiment, the patches may be printed, for example, using a conductive ink, on the patch layers. An array of multiple patch antennas on the same substrate can be used to make a high gain array antenna or phased array antenna for which the antenna beam can be electronically steered.

Figure 6A:
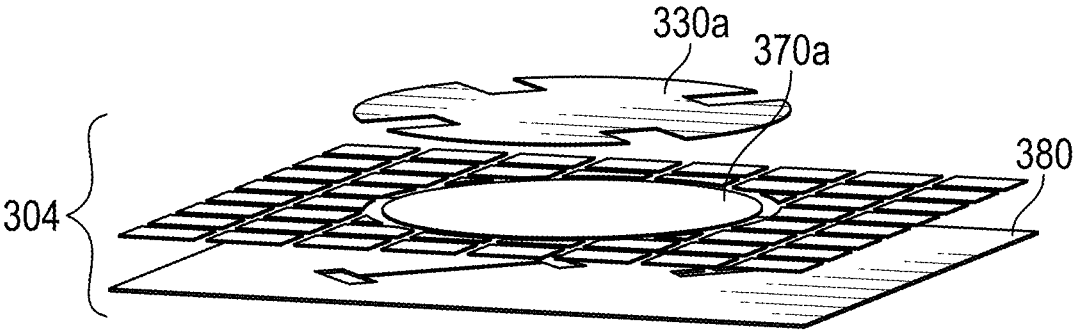
FIGS. 6A and 6B are isometric views of a single antenna element in an antenna element array in the antenna stack assembly of the antenna apparatus of FIG. 3.

FIG. 6A illustrates a perspective view of a simplified exemplary individual antenna element 304 including an upper patch layer 330*a*, a lower patch layer 370*a*, and spacing therebetween. The individual element shown FIG. 6A is one of a plurality of antenna elements forming an array of antenna elements (see FIG. 5A).

In the illustrated embodiment, the array 308 of individual patch antenna elements 304 is formed from a plurality of patch antenna layers, including the upper patch antenna layer 330 (see also FIG. 5A), the antenna spacer 335, and the lower patch antenna layer (or ground plane) 370. The upper antenna patch layer 330 and the lower patch antenna layer 370 may be formed on standard PCB layers or other suitable substrates. The two layers 330 and 370 are suitably spaced from each other specific by the antenna spacer 335 to achieve the desired tuning of the patch antenna assembly 334. While a two-patch (upper and lower patch) antenna is illustrated herein, other single or multilayer patch antennas may be employed in accordance with embodiments of the present disclosure.

The antenna spacer 335 may be made up of the same or similar materials and by similar manufacturing processes as the radome spacer 310. As seen in FIG. 3, the antenna spacer 335 may have a cell and wall structure, such as a honeycomb structure, similar to the radome spacer 310 or may be made from a suitable foam or other suitable spacing structure. See FIG. 5A for a bottom view of a radome spacer 310 in accordance with one embodiment of the present disclosure. See FIG. 5B for a partial top view of the radome spacer 310 with the upper patch layer 330 disposed beneath the radome spacer 310. Although illustrated and described as a single spacing layer, the antenna spacer 335 may be comprised of a plurality of spacer elements defining the space between the upper and lower patch layers 330 and 370 of the patch antenna assembly 334.

In the illustrated embodiment, the patch antenna assembly 334 is mechanically and electrically supported by a printed circuit board (PCB) assembly 380. The PCB assembly 380 is generally configured to connect electronic components using conductive tracks, pads and other features etched from one or more sheet layers of copper laminated onto and/or between sheet layers of a non-conductive substrate. The PCB assembly 380 may be a single or multilayer assembly with various layers copper, laminate, substrates and may have various circuits formed therein.

A dielectric layer 375 provides an electrical insulator between the patch antenna assembly 334 and the PCB assembly 380. The dielectric spacer 375 may have a low dielectric constant (which may be referred to as relative permittivity), for instance in the range of about 1 to about 3 at room temperature.

In accordance with embodiments of the present disclosure, in addition to being an electrical insulator, the dielectric spacer 375 may be configured to be a fire enclosure for the antenna apparatus 200. In that regard, the dielectric spacer 375 may be manufactured to have flame retardant properties, for example, by inclusion of 5% decabromodiphenyl ethane (DBDPE) together with the dielectric materials of the dielectric spacer 375. Therefore, the fire enclosure is a part of the antenna stack assembly 300.

Figure 9A:
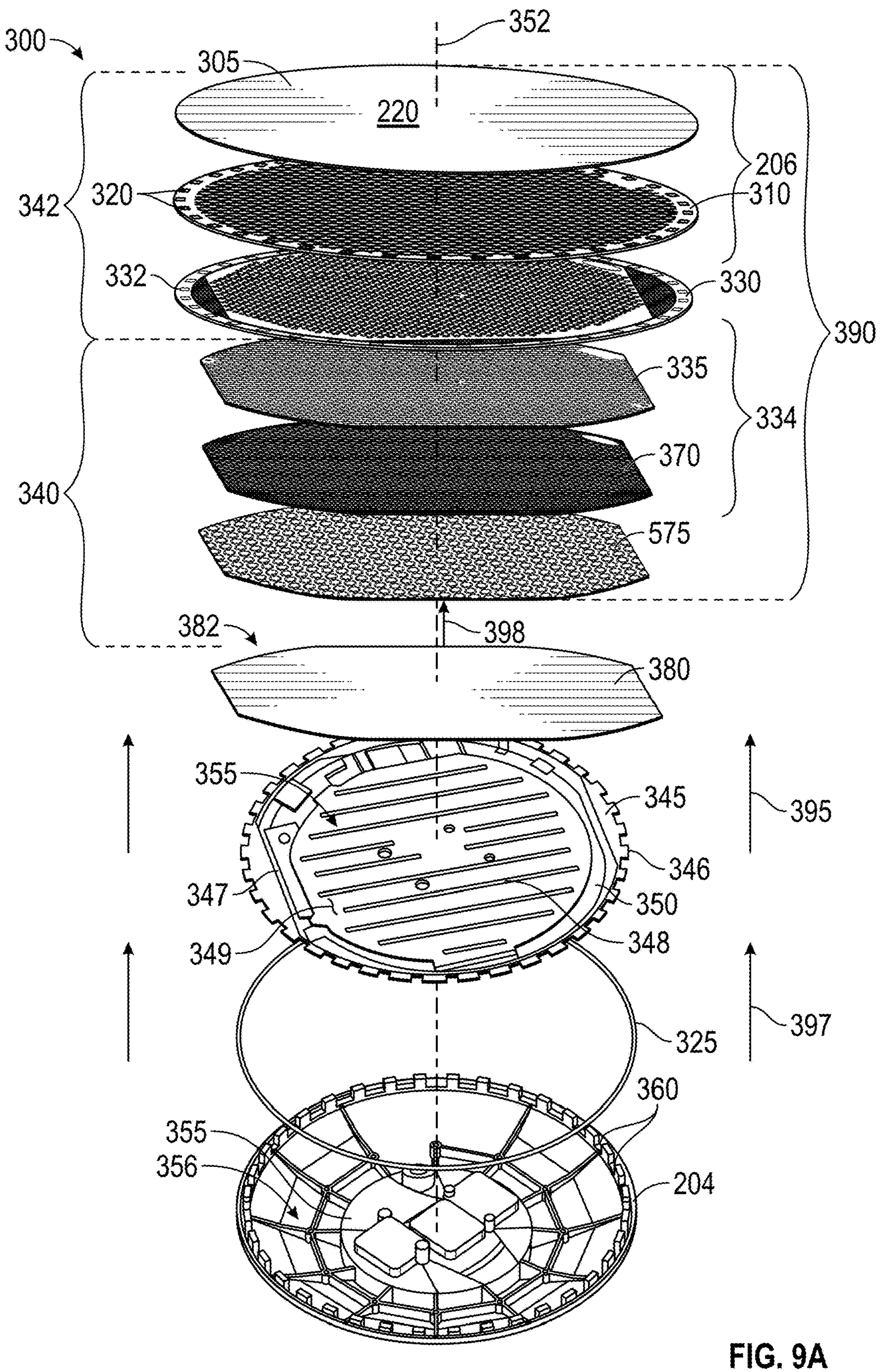
FIGS. 9A and 9B are isometric exploded views depicting an exemplary antenna apparatus including a dielectric spacer according to another embodiment of the present disclosure.
Figure 9B:
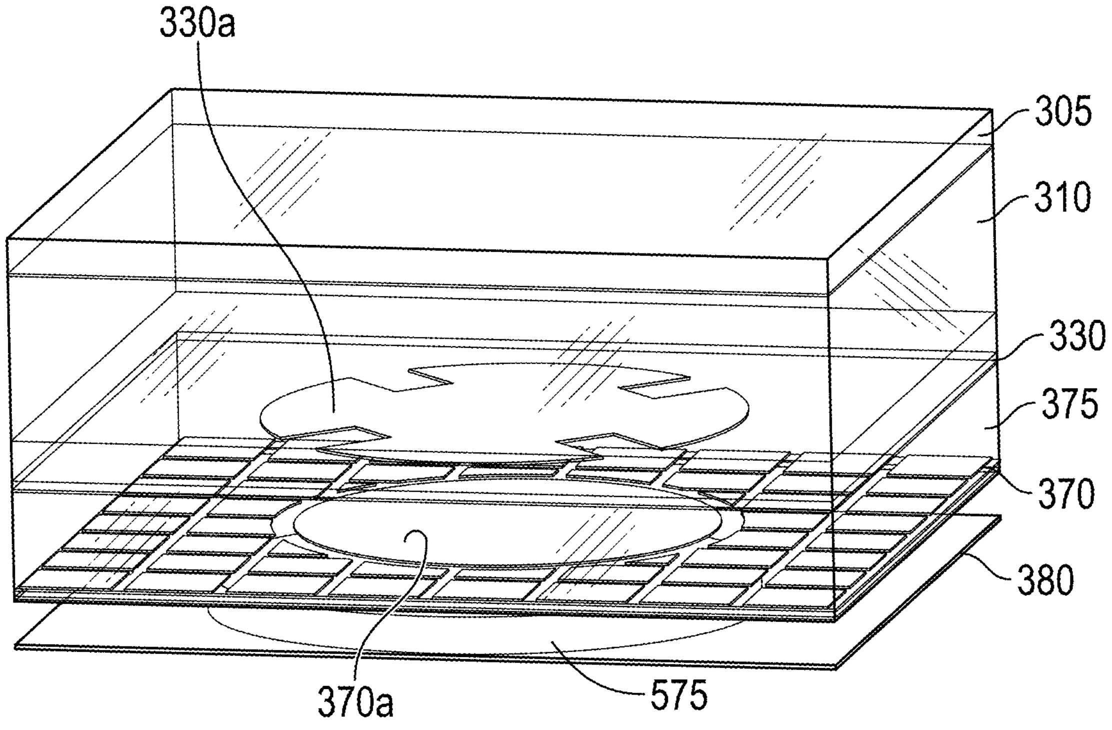

In an alternate embodiment, a single layer dielectric spacer may be replaced with an array of discrete spacers, such as puck spacers 575. See, for example, FIGS. 9A and 9B. Puck spacers may be formed from suitable materials, such as plastic, to provide a suitable dielectric constant and low loss tangent to conform with the performance of the patch antenna assembly. As one non-limiting example, the puck spacers may be formed from a polycarbonate plastic. The puck spacer 375 may be attached to the PCB assembly 380 using a suitable adhesive designed in accordance with embodiments of the present disclosure. The puck spacers may be located adjacent the individual lower patch antenna elements.

In typical PCB construction, individual PCB layers are typically made up of fiberglass material surrounding a pattern of copper traces defining electrical connections. The copper and fiberglass having similar CTE values and generally have no purposeful air gaps within the structure. Therefore, the various layers defining a multi-layer PCB can be laminated together under high heat and pressure conditions. In typical patch antenna assemblies, the upper patch layer, the lower patch layer, and the spacing therebetween may be formed using a conventional PCB lamination process.

In contrast to typical PCB lamination, in the design of the antenna stack assembly 300 of the present disclosure, high heat may damage some of the spacing components (e.g., the radome spacer 310 and the antenna spacer 335) of the antenna stack assembly 300. In the embodiments described herein, the spacing components are made from injection molded plastics having purposeful air gaps, which would be damaged under typical PCB lamination process.

In accordance with embodiments of the present disclosure, for improved bonding between dissimilar materials and to avoid lamination heat damage, adhesives may be applied to the various layers of the antenna stack assembly 300 to join the various layers of the antenna stack assembly 300 together. The adhesives described herein for bonding the various layers of the antenna assembly may be any adhesives capable of adhesively coupling adjacent layers to each other.

As described above, plastic materials used in the spacing components (e.g., the radome spacer 310 and the antenna spacer 335) of the antenna stack assembly 300 may include polyethylene (PE) materials including linear low density polyethylene (LLDPE), high density polyethylene (HDPE), as well as other plastics such as polypropylene (PP), polyethylene terephthalate (PET), polyvinyl chlorine (PVC), or other suitable polymers. Suitable adhesives in accordance with embodiments of the present disclosure are capable of bonding to such plastics. Moreover, to allow for assembly alignment, suitable adhesives may be curable adhesives, which may cure in the presence of or as a result of being exposed to heat above room temperature, for instance in a range of 70° C. to 110° C., above 100° C., or in range from about 100° C. to about 325° C. In lieu of heat curing, the adhesive may be curable over time, using UV curing techniques, and/or additives may be added for crosslinking the adhesive. The adhesive may have a dielectric constant of less than 3.0 and a thermal conductivity in the range of 0.1 to 0.5 W/m-K.

As a non-limiting example, a suitable adhesive may be an epoxy adhesive. Epoxy may be any adhesive composition formed from epoxy resins, epoxides, or compounds including epoxide functional groups. The epoxy adhesive may be a one-part self-curing epoxy or a two-part epoxy, either of which may include cross linkers or reactants such as amines, acids, acid derivatives such as anhydrides, thiols, or other functional groups which assist in hardening and crosslinking.

In embodiments of the present disclosure, the epoxy adhesive may be a low durometer adhesive in the range of 25 to 100 (Shore A) to allow for some movement between components as a result of the differences in coefficients of thermal expansion (CTEs) between components in the adhesive layer stack 390. As the antenna apparatus 200 is exposed to heating and cooling cycles during normal outdoor environmental conditions, the different components of the adhesive layer stack 390 may expand and contract in different amounts and at different rates due to CTE mismatch. Therefore, an elastic (low durometer) adhesive allows for some movement of components relative to each other without breaking the adhesive bond between components. Therefore, the adhesive designed for use in accordance with embodiments of the present disclosure holds the layers of the antenna stack assembly 300 in alignment with the PCB assembly 380 over temperature swings and also provided a thermal path for through-plane heat dissipation to the radome 305.

The application of adhesive to the various surfaces of the antenna assembly 300 will be described in detail below. Although illustrated and described as being applied to upper surface of various components in the electronic assembly 300, adhesive may be suitably applied to upper surfaces or undersurfaces of the layering components.

Referring to FIGS. 3 and 4, the adhesive layer stack 390, which is a stack of adhesively coupled layers in the electronic assembly 300 includes the following structural layers: radome 305, radome spacer 310, upper patch antenna layer 330, antenna spacer 335, lower patch antenna layer 370, and dielectric spacer 375. As will be discussed further below, the layers may be pressed by a heat press to aid in curing the adhesive to form a bonded adhesive layer stack 390.

In addition to the adhesive layer stack 390, in some embodiments, the PCB assembly may also be adhered by adhesive bonding and heat pressed with the adhesive layer stack 390 as shown by arrow 398 in FIG. 4. Furthermore, the lower antenna stack 340 may be adhered by heat press separately or together with the other layers in the adhesive layer stack 390.

As seen in FIG. 3, after bonding the adhesive layer stack 390 and PCB assembly 380 together, the stack 390 and PCB assembly 380 may be disposed on chassis 345 as illustrated by arrows 395, and enclosed in chamber 355 of the housing assembly 202 of the antenna apparatus 200 as illustrated by arrows 397. The coupling of the housing assembly 202 may be achieved by mechanical coupling between radome portion 206 and the lower enclosure 208 (see arrows 397), as described in greater detail below.

FIG. 4 illustrates a side sectional view of the layers of the adhesive layer stack 390 along with the PCB assembly 380 shown in FIG. 3. As shown in FIG. 4, the adhesive layer stack 390 includes an adhesive layer (numbered in the 400 series) between each of the structural layers making up adhesive layer stack 390 (radome 305, radome spacer 310, upper patch antenna layer 330, antenna spacer 335, lower patch antenna layer 370, and dielectric spacer 375).

Moving from top to bottom in the adhesive layer stack 390 in FIG. 4, adhesive layer 402 couples the radome 305 with the radome spacer 310; adhesive layer 404 couples the radome spacer 310 with the upper patch antenna layer 330; adhesive layer 406 couples the upper patch antenna layer with the antenna spacer 335; adhesive layer 408 couples the antenna spacer 335 with the lower patch antenna layer 370; and adhesive layer 410 couples the lower patch antenna layer 370 to the dielectric spacer 375. In addition, an adhesive layer 412 couples the bottom portion of the adhesive layer stack 390 (e.g., the dielectric spacer 375) with the PCB assembly 380.

Arrow 398 indicates the coupling between the PCB assembly 380 and adhesive layer stack 390. The adhesive layer stack 390 may be coupled together first, and then separately coupled with the PCB assembly 380, or the adhesive layer stack 390 and PCB assembly 380 may be coupled simultaneously. In each instance, a heat press may be used, as further described below.

Prior to discussing the coupling of the adhesive layer stack 390 and the PCB assembly 380, each of the individual components of the antenna stack assembly 300 will be described in greater detail.

The radome portion 206 (including the radome 305 and radome spacer 310) has been described above.

As seen in FIG. 3, below the radome portion 206 is the upper patch layer 330 (which makes up a portion of the antenna patch assembly 334). FIG. 5A illustrates a top view of the upper patch layer 330 and FIG. 5B illustrated a portion of the upper patch layer 330 overlaid with the radome spacer 310. As seen in FIG. 5A, the upper surface of the upper patch antenna layer 330 includes an interior portion 327 having a plurality of individual upper antenna patch elements **330*a* that make up the upper patches of individual antenna elements 304 defining the antenna array 308. The upper antenna patch elements 330*a* may be a plurality of discrete individual dots, circles, modified circles, or other polygonal shapes made up of a conductive metal such as copper. The upper antenna patch elements 330*a* may be separated from each other on the upper patch layer 330 by non-conductive portions of the upper patch antenna layer 330 between the upper antenna patch elements 330*a***.

The upper patch antenna layer 330 further includes an exterior portion 328 extending to its perimeter portion 329, which may include thieving features and/or thermally conductive features, which may be formed from the same conductive metal as the upper antenna patch elements **330*a*. Accordingly, the exterior portion 329 flows heat radially from the overall electronic assembly 300 outward to the perimeter portion 329 of the upper patch layer 330 and to the perimeter portion 329 of the radome portion 206 (as described in greater detail with reference to FIG. 13). The perimeter portion 329 of the upper patch layer 330 may be interrupted by ports 332** through which fasteners may pass, as described in detail below.

Between the exterior portion 328 and the interior portion 327 of the upper patch layer 330 is a gap section which may contain no conductive features. The gap section and the thieving section isolate the thermally constructive rim from the antenna elements.

In addition to the array of individual upper antenna patch elements **330*a*, a GPS antenna portion 306 may be provided on the upper patch antenna layer 330 to facilitate GPS use in the electronic assembly 300. As the GPS produces heat, the heat can also be dissipated by the heat dissipation features of the exterior portion 328 of the upper patch antenna layer 330**.

In one embodiment, the upper patch antenna layer 330 is a PCB substrate having a plurality of upper antenna patch elements **330*a*. The features of the upper patch antenna layer 330** may be formed by suitable semiconductor processing to obtain the desired feature patterns and shapes.

As shown in FIG. 5B, each of the plurality of antenna elements 304 of the upper patch layer 330 align with each of the plurality of apertures 315 of the cells 315 of the radome spacer 310. For example, each of the antenna elements 304 are disposed within the cells 315 to provide suitable spacing around each of the antenna elements 304. Because the radome portion 206 and the upper patch antenna layer 330 are similarly designed and configured, these components are grouped together in the description herein as the upper antenna stack 342. The components of the lower antenna stack 340 will now be described below.

The lower antenna stack 340 may be made up of one or a plurality of components. For instance, it may be made up of a stack of antenna spacer 335, lower patch antenna layer 370, dielectric spacer, and and PCB assembly 380. In contrast to the upper stack 342, the lower antenna stack 340 has a difference shape around it outer perimeter. For example, as shown the layers of the lower antenna stack 340 be generally rectangular with straight edges yet have curved edges. Other shapes may be suitably employed. The lower antenna stack 340 may be designed to fit within the inner wall 347 of the chassis 345 which may be provided to surround and hold the lower antenna stack 340 in a static position (see FIG. 7A). In contrast in the illustrated embodiment, the upper antenna stack 342 is designed to extend near to or beyond the outer perimeter of the chassis. In other embodiments, components the lower antenna stack 340 (such as the antenna spacer 335 and the lower antenna patch layer 370) may be designed to extend to or near the outer the perimeter of the components of the upper antenna stack 342.

Referring to FIG. 3, the lower patch antenna layer 370 is spaced beneath the upper patch antenna layer 330. As shown, the top surface of the lower patch antenna layer 370 includes an a plurality of individual upper antenna patch elements 370*a* that make up the lower patches of individual antenna elements 304 defining the antenna array 308. Like the upper antenna patch elements 330*a*, the lower antenna patch elements 337*a* may be a plurality of discrete individual dots, circles, modified circles, or other polygonal shapes made up of a conductive metal such as copper. The lower antenna patch elements 370*a* may be separated from each other on the lower patch layer 370 by portions of the lower patch antenna layer 370 between the lower antenna patch elements 370*a*. In one embodiment, the lower patch antenna layer 370, like the upper patch antenna layer 330, is a PCB substrate having a plurality of upper antenna patch elements 370*a*.

In the illustrated embodiment, the lower patch antenna layer 370 includes a grid of conductive material between lower patch antenna elements 370*a* to create an anisotropic dielectric layer, as described in greater detail below.

Figure 6B:
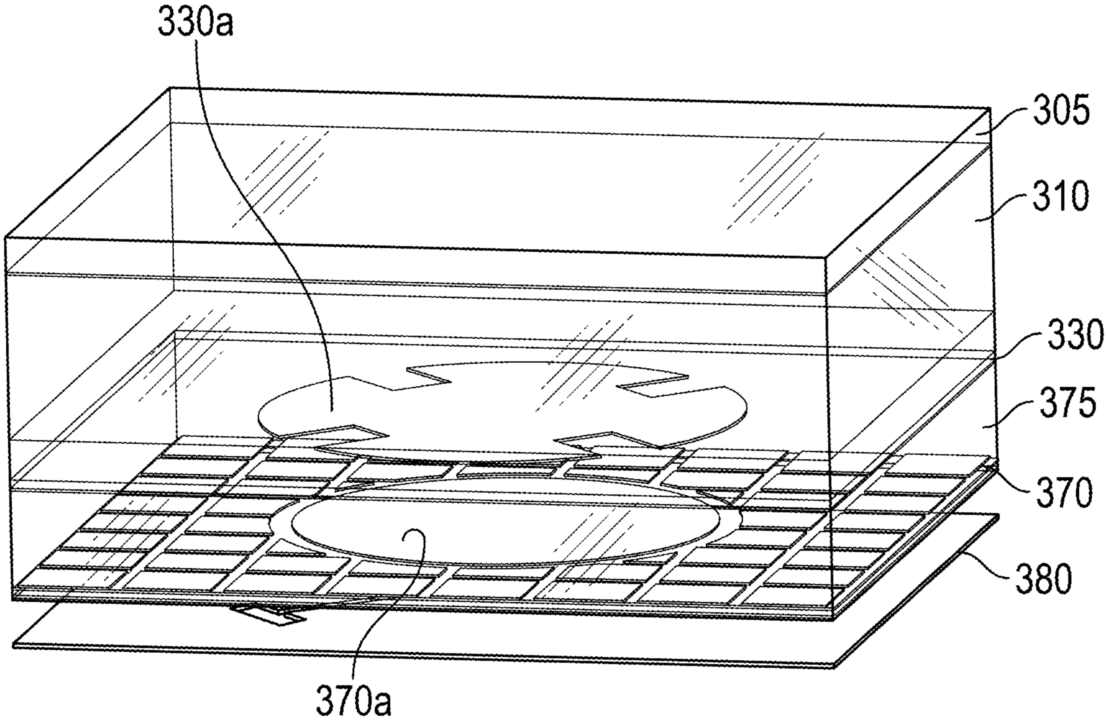

As seen in FIGS. 6A and 6B, the individual lower patch layer elements 370*a* are configured to align with the individual upper patch antenna elements 330*a*, for example, in a vertical stack. The lower patch antenna elements 370*a* may be the same as or similar in shape and configuration as the upper patch antenna elements 330*a*. In the illustrated embodiment, the upper patch elements 330*a* are generally circular in configuration and include a plurality of slots for antenna polarization or tuning effects, while the lower patch antenna elements 370*a* are generally circular in configuration.

As seen in FIGS. 6A and 6B the upper patch antenna layer 330 is spaced by an antenna spacer 335 from the lower patch antenna layer 370. As described above, the antenna spacer 335 may be made up of the same or similar material as the radome spacer 310, and may also have a cell and wall structure similar to the radome spacer 310. Similar to the upper patch antenna elements 330*a* and the radome spacer 310, each of the plurality of apertures in the antenna spacer 335 may include a vertical pathway to align with each lower patch element 370*a* (at the bottom) and each upper patch antenna element 330*a* (at the top) to define a plurality of individual antenna elements 304 in the antenna array 308.

Below the upper and lower antenna patch elements 330*a* and 370*a* is the PCB assembly 380, which includes circuitry that may be aligned with the upper and lower antenna patch elements 330*a* and 370*a*, which together may form a resonant antenna structure.

The PCB assembly 380 is separated from the lower patch antenna 370 by a dielectric spacer 375.

Antenna Lay-Up and Methods of Manufacture

Figure 8A:
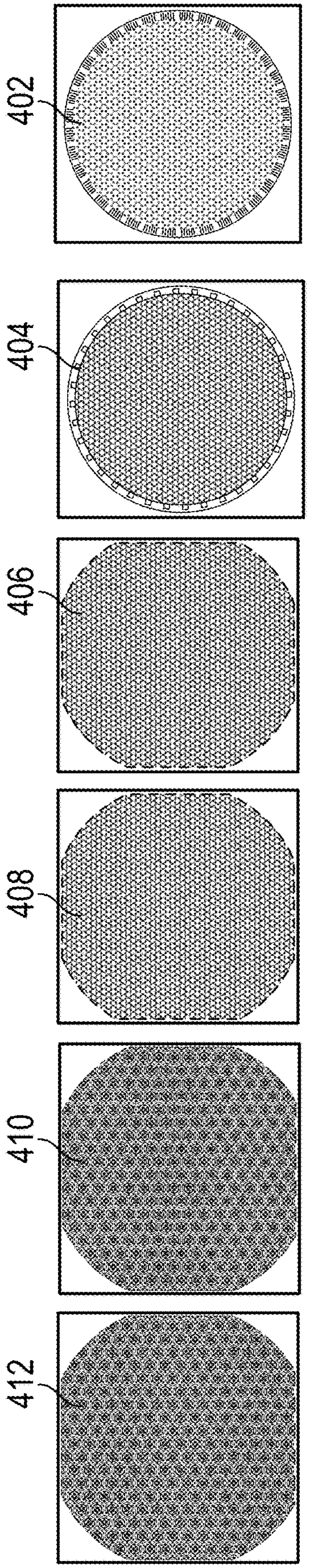
FIGS. 8A, 8B, and 8C are top views of adhesive patterns on the various layers of the antenna stack assembly in accordance with embodiments of the present disclosure.

The adhesive patterning for coupling each of the layers in the antenna stack assembly 300 of FIGS. 3 and 4 will now be described. FIG. 8A illustrates example adhesive patterns that may be applied to one or more of the layers making up the adhesive layer stack 390. The amount of adhesive and/or thickness of the adhesive used may decrease with each successive layer proceeding toward the radome. Furthermore, as described in greater detail below, the adhesive may act as a supplemental dielectric material when applied to the PCB assembly 380 or the dielectric spacer 375.

The patterns may have a predetermined design, and may be applied to the top or bottom of one or more of such a layers for example by stencil printing or other methods. The patterns applied to each layer may depend on if the layer is a spacer layer, such as radome spacer 310 and antenna spacer 335, which may include honeycomb structure or apertures. For these layers, the adhesive pattern may be applied along the cell walls forming each of the cell apertures in the honeycomb structure.

The patterns may be applied differently for layers having antenna elements or electronic circuitry, such as the upper patch antenna layer 330, the lower patch antenna layer 370, and the PCB assembly 380.

Each exemplary layer having a specific adhesive pattern will now be described. The radome spacer adhesive pattern 402 may be applied to the upper surface of the radome spacer 310, such that the adhesive is applied along the top of the walls forming the apertures of the cells 315.

The upper patch adhesive pattern 404 may be applied to the upper surface of the upper patch antenna layer 330.

The antenna spacer adhesive pattern 406 may be applied to the upper surface of the antenna spacer surface 335.

The lower patch adhesive pattern 408 may be applied to the upper surface of the lower patch antenna layer 370.

The dielectric adhesive pattern 410 may be applied to the upper surface of the dielectric spacer 375.

The PCB assembly adhesive pattern 412 may be applied to the upper surface of the PCB assembly 380.

Figure 8B:
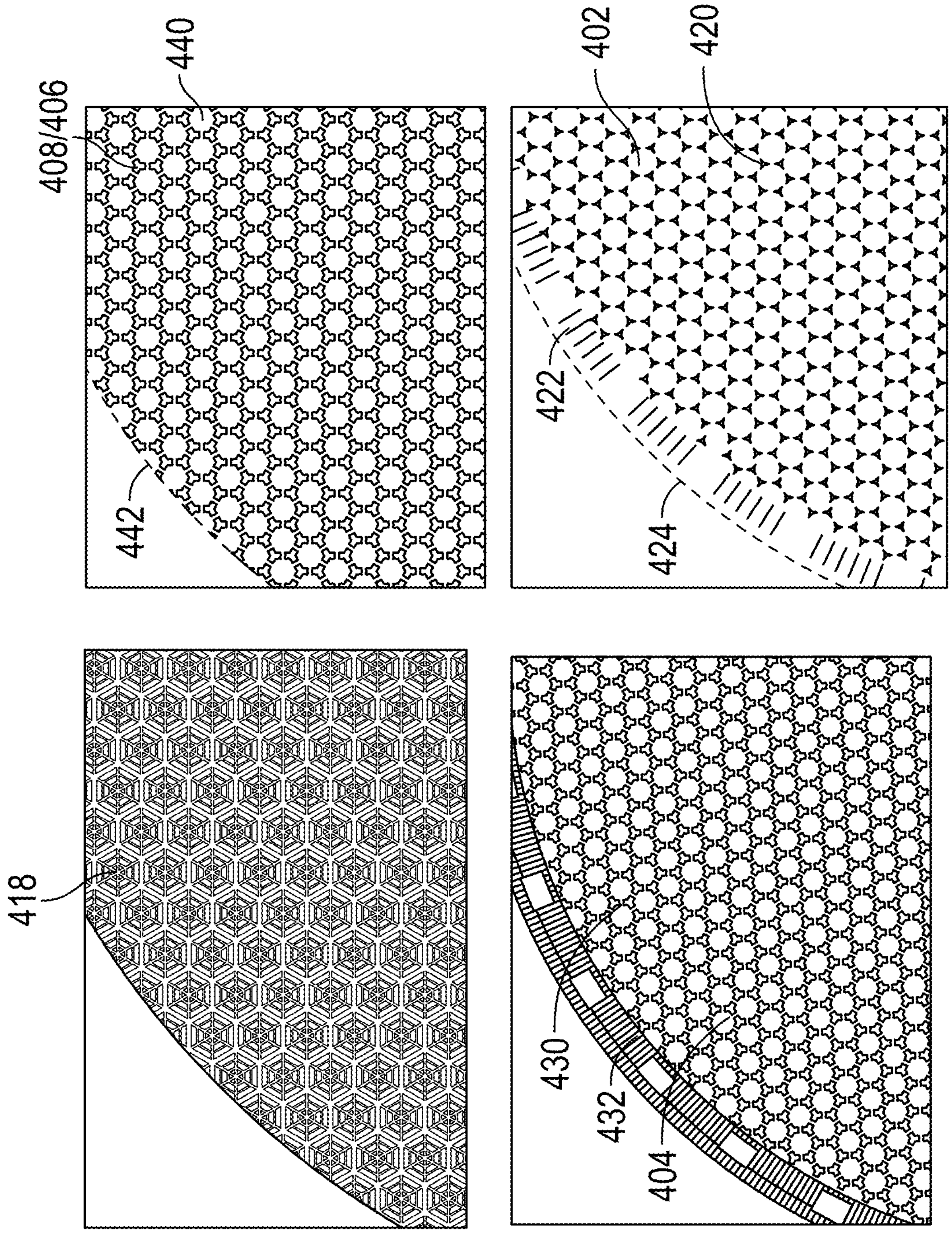
Figure 8C:
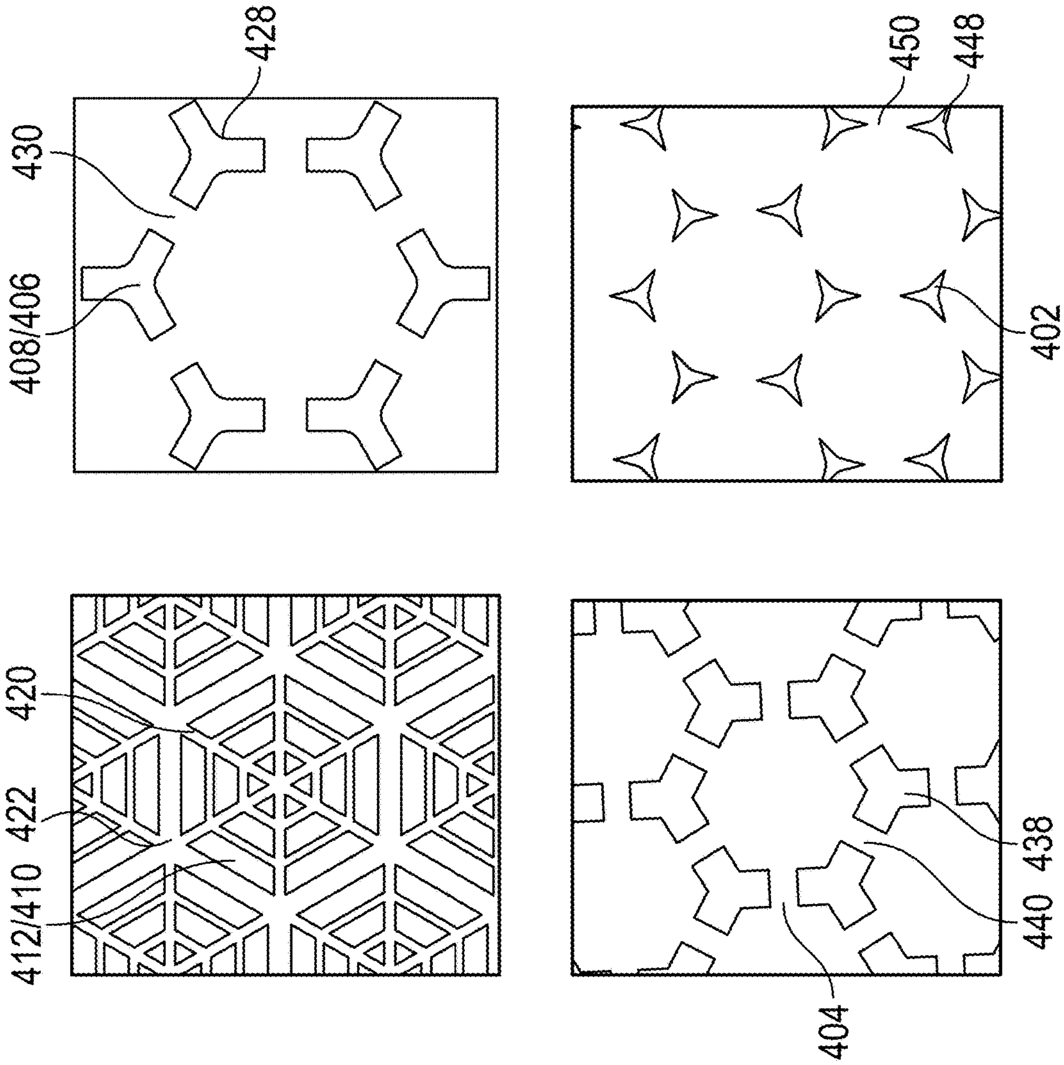

The illustrated adhesive patterns are provided as exemplary patterns in FIGS. 8A, 8B, and 8C. Other adhesive patterns may be used to couple the various layers. The patterns may be the same for some of the different layers and different for some of the different layers. For example, due to differences in the various layers of the electronic assembly 300, the PCB assembly adhesive pattern 412 and the dielectric spacer adhesive pattern 410 may be the same or substantially similar to each other; the antenna spacer adhesive pattern 408 and the lower patch layer adhesive pattern 406 may be the same or substantially similar to each other; however, the radome spacer adhesive pattern 404 and upper patch layer adhesive pattern 402 may be different from each other and from the other patterns.

FIGS. 8B and 8C illustrate close-up depictions of the exemplary adhesive patterns. As described in greater detail below, each of the patterns provide vent pathways from the cell apertures to permit the flow of air and moisture. Such venting maintains an equal pressure with ambient pressure over temperature and altitude change to avoid the entrapment of air and/or moisture in the apertures which may cause bulging or instability in the layers.

The close-up adhesive pattern 412/410 for the PCB assembly 380 and the dielectric spacer 375 includes a plurality of adhesive pattern elements 418 shown as discrete hexagonal shapes. The shapes of the adhesive pattern elements 418 may correspond to the shape of the apertures of the honeycomb structures of the radome and antenna spacers, and/or the individual patch layers of the antenna elements. While a hexagonal shape is illustrated for the adhesive pattern elements 418, any other polygonal or circular shape including those corresponding to the shape of antenna elements may be suitably employed.

As can be seen in FIG. 8C, the hexagonal shapes themselves may be made up of a plurality of shapes including spacing therebetween. As seen in FIG. 8C, the close-up adhesive pattern 412/410 for the PCB assembly 380 and the dielectric spacer 375 includes vent pathways 420 within each adhesive pattern element permitting the escape of air and/or moisture from within. Furthermore, additional vent pathways 422 are provided between each adhesive pattern element, which permits venting of air from the antenna stack assembly 300, thereby preventing or inhibiting the entrapment of air.

Referring to FIG. 8B, the adhesive pattern 412/410 for the PCB assembly 380 and the dielectric spacer 375 may be distributed evenly across the entire layers (as compared to the other patterns 404 and 402 in which adhesive is provided in different patterns along the outer perimeter portions compared to the interior portions of the associate layers).

The close-up adhesive pattern 408/406 for the antenna spacer 335 and the lower patch layer 370 will now be described. Like the other adhesive patterns, the shape of the adhesive pattern elements may correspond to the shape of the apertures of the honeycomb structures of the radome and antenna spacers, and/or the individual patch layers of the antenna elements. While a 9-sided polygonal shape is illustrated for the adhesive pattern elements 428, any other polygonal or circular shape including those corresponding to the shape of antenna elements may be suitably employed. The adhesive making up the adhesive pattern elements 428 are generally in triangular shapes which may correspond to the shape of the apertures of the honeycomb structures of the radome and antenna spacers, and/or the individual patch layers of the antenna elements. Other polygonal or circular shapes including those corresponding to the shape of antenna elements may be suitably employed. In addition, simple dots of adhesive may also be suitably employed.

As seen in FIG. 8C, the close-up adhesive pattern 408/406 for the PCB assembly and the dielectric spacer includes vent pathways 430 within each adhesive pattern element 428 permitting the escape of air and/or moisture from within the antenna stack assembly 300.

As shown, the adhesive pattern 408/406 for the antenna spacer 335 and the lower patch layer 370 may be distributed evenly across the entire layers (as compared to the other patterns 404 and 402 in which adhesive is provided in different patterns along the outer perimeter portions compared to the interior portions of the associate layers).

The close-up adhesive pattern 404 for the upper patch layer 330 will now be described. Like the other adhesive patterns, the shape of the adhesive pattern elements may correspond to the shape of the apertures of the honeycomb structures of the radome and antenna spacers, and/or the individual patch layers of the antenna elements. While a 9-sided polygonal shape is illustrated for the adhesive pattern elements 438, any other polygonal or circular shape including those corresponding to the shape of antenna elements may be suitably employed. The adhesive making up the adhesive pattern elements 438 are generally polygonal shapes which may correspond to the shape of the apertures of the honeycomb structures of the radome and antenna spacers, and/or the individual patch layers of the antenna elements. Other polygonal or circular shapes including those corresponding to the shape of antenna elements may be suitably employed.

As seen in FIG. 8C, the close-up adhesive pattern 404 for the upper patch layer 330 includes vent pathways 440 within each adhesive pattern element 438 permitting the escape of air and/or moisture from within the antenna stack assembly 300.

As shown, the adhesive pattern 404 for the upper patch layer 330 is provided in a different pattern along the outer perimeter portions compared to the interior portion of the upper patch layer pattern. A perimeter adhesive pattern for the upper patch layer 330 is designed for secure coupling only the other perimeter.

The close-up adhesive pattern 402 for the radome spacer will now be described. Like the other adhesive patterns, the shape of the adhesive pattern elements may correspond to the shape of the apertures of the honeycomb structures of the radome and antenna spacers, and/or the individual patch layers of the antenna elements. While a 12-sided polygonal shape is illustrated for the adhesive pattern elements 448, any other polygonal or circular shape including those corresponding to the shape of antenna elements may be suitably employed. The adhesive making up the adhesive pattern elements 448 are generally triangular shapes which may correspond to the shape of the apertures of the honeycomb structures of the radome and antenna spacers, and/or the individual patch layers of the antenna elements. Other polygonal or circular shapes including those corresponding to the shape of antenna elements may be suitably employed. Likewise, the adhesive may simple be patterned as a plurality of dots to minimize adhesive use.

As seen in FIG. 8C, the close-up adhesive pattern 402 for the radome spacer 310 includes vent pathways 450 within each adhesive pattern element 448 permitting the escape of air and/or moisture from within the antenna stack assembly 300.

As shown, the adhesive pattern 402 for the radome spacer pattern is provided in a different pattern along the outer perimeter portions compared to the interior portion of the upper patch layer pattern. A perimeter adhesive pattern for the radome spacer 310 is designed for secure coupling only the other perimeter.

The adhesive may have dielectric properties that enhance the antenna performance when applied in a step function with more adhesive closest to the dielectric layer 385 and the PCB assembly 380 and less adhesive in the layers closer to the radome portion 206. As seen in the illustrated exemplary adhesive patterning of FIGS. 8A, 8B, and 8C, the adhesive may be applied in greater amounts in the lower layers (lower meaning furthest from the radome 305) and decreasing in thickness as the layers proceed toward the radome 305, such that the adhesive thickness on the PCB assembly 380 and the dielectric spacer are the most thick, and the adhesive on the radome spacer 310 is the least thick, with the adhesive on the lower patch antenna layer 370 and antenna spacer 335 being in between. Accordingly, less adhesive material may be employed with each successive layer toward the radome 305.

As a non-limiting example, adhesive thickness is generally constant, for example, in a range of about 0.050 mm to about 0.100 mm, or at about 0.075 mm. However, adhesive coverage at each layer may range from, for example, 5%-20% at the uppermost layers to 50%-80% at the lowermost layers, and a middle range at the middle layers. Adhesive in accordance with embodiments of the present disclosure may have a dielectric constant of less than 3.0.

The adhesive may include a stopping mechanism, such as glass beads or plastic bumps, to control spreading when the adhesive layer stack 390 is pressed together. Such stopping mechanisms control spreading providing a small amount of spacing between adjacent layers within which the adhesive resides.

The patterns provided in FIGS. 8A, 8B, and 8C are merely illustrative, and any patterns may be suitably employed which bond the layers together while avoiding interfering with, or alternatively, may enhance, the signals or resonance of the antenna assembly.

In processes designed in accordance with embodiments of the present disclosure, a stencil may be placed on a first layer, which may be, for example, the top surface of a PCB assembly 380, or alternatively, the dielectric spacer 375, or any other of the layers of the antenna stack assembly 300. A stencil is used to apply adhesive in a desired pattern, for instance, one of the patterns of FIGS. 8A, 8B, and 8C. If the first layer is the PCB assembly layer, the PCB adhesive pattern 412 may be applied, or if the dielectric spacer is the first layer, the dielectric spacer pattern 410 may be applied. This process may be repeated for the entire adhesive layer stack 390 with or without the PCB assembly 380.

To press an antenna stack assembly 300, such as the adhesive layer stack 390 of FIGS. 3 and 4 with or without the PCB assembly 380, on or more, or all of the layers in the assembly may be provided with adhesive by a stenciling process or an automated adhesive application process, and then cured. The antenna stack assembly 300 can be heated to a predetermined temperature for adhesive curing. The antenna stack assembly 300 can then then removed and allowed to cool. Over time, the adhesive in the antenna stack assembly 300 cure forming a strong bond between the layers. In other embodiments, the adhesive layer stack 390 may not require heating for adhesive curing. As a non-limiting example, UV curing may be another adhesive curing option.

The curing temperatures may range for example from about 80° C. to about 120° C., or alternatively from 90° C. to 110° C., or alternatively from 95° C. to 105° C., however the temperature should remain below the melt temperature of any plastics with the assembly, such as PE, LLDPE, or HDPE. After curing, the antenna assembly may be placed on a chassis 345, and the antenna apparatus 200 may be joined by a coupling between the radome portion 206 and the lower enclosure 204.

Joining of Radome and Lower Enclosure to Form Housing

As discussed above, the housing assembly 202 includes a radome portion 206 coupled with a lower enclosure 204 to form an interior compartment 250 for components of the antenna stack assembly 300 as well as to prevent the ingress of unwanted dirt, moisture, or other materials. In accordance with embodiments of the present disclosure, the housing assembly 202 may have a fastener system 318 for coupling the radome portion 206 to the lower enclosure 204 with a seal therebetween (see FIGS. 7A and 7B). In at least one embodiment, the fastener system 948 between the radome 932 and the lower enclosure 904 (which is also a chassis in this embodiment) is an adhesive seal (see FIG. 22).

Referring to FIGS. 7A-7B and 11A-11B, and 12, in some embodiments, rather than or in addition to an adhesive, the fastener system 318 may include one or more mechanical fasteners. Suitable mechanical fasteners may engage via a friction fit or interference fit, such as a snap-fit. Portions of the mechanical fasteners may be attached to or integrally formed in the radome portion 206, for example, attached to or integrally formed in the radome spacer 310. Mating portions of mechanical fasteners may be attached to or integrally formed in the lower enclosure 204. In the illustrated embodiment of FIG. 12, the mechanical fastener portions may be radially arranged around the respective circumferential perimeters of the radome spacer 310 and the lower enclosure 204.

The housing assembly 202 may be exposed to changes and swings in temperature as a result of environmental conditions and/or heating cycles of electronic components. Such temperature changes may impact the thermal expansion of different components of the housing assembly 202. In particular, the components making up the housing assembly 202, such as the radome spacer 310, and the lower enclosure 204 may be made from different materials have different coefficients of thermal expansion (CTE). As a result, the radome spacer 310 and the lower enclosure 204 may expand and contract at different rates of expansion and by different amounts. Likewise, the radome spacer 310 and the lower enclosure 204 may be exposed to different heating cycles as a result of different components in the antenna apparatus 200.

As result of a mismatch in CTE, undesirable stress may be imposed on conventional fastener systems, which can weaken the housing assembly 202 and may even lead the breakage of certain components of the housing assembly 202. Accordingly, in embodiments described herein, a suitable fastener system is designed and configured to permit the relative movement between the radome portion 206 (including the radome 305 and the radome spacer 310) and the lower enclosure 204 resulting from differences in expansion and contraction amounts of the components. In particular, the fastener system 318 may include radial apertures as fastener receiving portions. Such radial apertures are aligned with a radial axis extending from a central axis of the radome spacer 310 or lower enclosure 204. Such radial apertures permit sliding engagement of fastener portions relative one another radially inward and outward to permit varying amounts of thermal expansion among of the components of the housing assembly 202.

In the illustrated embodiment of FIG. 12A, the radome spacer 310 may have a plurality of projecting fastener portions 520 radially arranged around its circumferential perimeter for coupling with receiving fastener portions 560 in the lower enclosure 204. A seal 525 may be disposed between the radome spacer 310 and the lower enclosure 204 and may be made from an elastomer material such as silicone or synthetic rubber, such as ethylene propylene diene terpolymer (EPDM), to prevent or inhibit moisture and dirt ingress at the interface.

Figure 13:
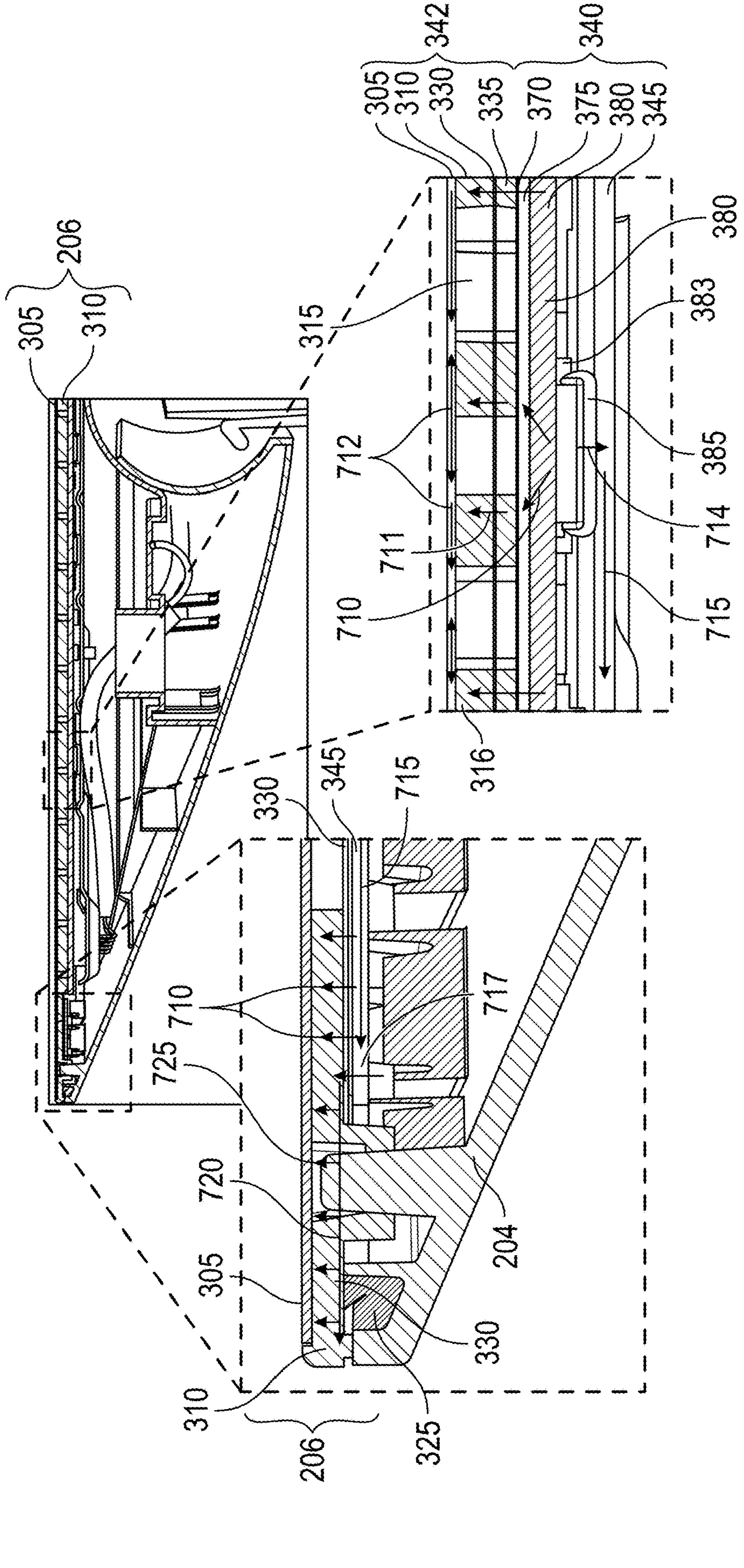
FIG. 13 is a close-up partial cross-sectional view of the antenna assembly of FIGS. 2A and 2B showing heat transfer pathways in accordance with embodiments of the present disclosure.

Although shown in the illustrated embodiment of FIG. 13 as the radome spacer 310 having a plurality of projecting fastener portions and the lower enclosure including a plurality of receiving fastener portions, it should be appreciated that the opposite configuration is also within the scope of the present disclosure. For example, projecting fastener portions may extend from the lower enclosure 204 and may be received in receiving fastener portions of the radome spacer 310.

In alternative embodiments, fastener portions may be radially arranged around the circumferential perimeter of the radome 305 (instead of the radome spacer 310) thereby extending around or through the radome spacer, or in embodiments where no radome spacer is employed. Likewise, the mating fastener portions may be alternatively disposed in the chassis instead of the lower enclosure in some embodiments having a chassis and a lower enclosure, or in embodiments having only a chassis and no lower enclosure.

In the illustrated embodiment of FIG. 3, the lower enclosure 204 is the bottom most part of the housing assembly

202 of the antenna apparatus 200, configured to provide support for and enclose the components contained within the housing assembly 202. As seen in the illustrated embodiment of FIG. 7A, the lower enclosure 204 may define an inner chamber 356 between the lower enclosure 204 and the chassis 345. Another inner chamber 355 is defined between the chassis 345 and the radome portion 206.

Referring to FIG. 12A, the lower enclosure 204 has a plurality of receiving fastener portions 560 radially arranged around its circumferential perimeter for coupling to the extending fastener portions 520 extending from the radome spacer 310. The chassis 345 includes a plurality of detents 346 around its perimeter through which the engaged projecting fasteners 520 and receiving fasteners 560 may pass.

Accordingly, the upper radome spacer 310 couples to and engages the lower enclosure 204 via the engagement of the plurality of projecting fastener portions 520 with the plurality of receiving fastener portions 560. This coupling encloses and forms the inner chambers 355 and 356 above and below the chassis 345 in the housing assembly 202. Within inner chamber 355, the other components of the antenna stack assembly 300 may reside, including the upper patch antenna layer 330 and the lower antenna stack 340 and the chassis 345. Within inner chamber 356, other components relating to the power supply and the tilting mechanism for the antenna apparatus 200 may reside.

The antenna stack assembly 300 rests on the support platform 349 of the chassis 345 and may rest within the inner wall 347 of the chassis 345 which may be provided to surround and maintain the antenna stack assembly 300 in a supported position. The chassis 345 may have a plurality of bonding bars 348 to provide multiple points of bonding between antenna stack assembly 300 and the chassis portion 345 to mitigate buckling (as a result of thermal cycling).

Therefore, the housing assembly 202 is formed with the radome portion 206 (radome 305 and radome spacer 310) at the top and the lower enclosure 204 at the bottom to support with the components of the antenna apparatus therein. Further, all of the components, including the radome 305, radome spacer 310, the chassis 345, and the lower enclosure 204 may all share a common central axis 562 represented by the dashed line 352 in FIG. 3.

As seen in FIG. 3, the radome 305 and radome spacer 310 each extend to the same or similar outer perimeters, such that these layers are aligned when stacked. The upper patch antenna layer 330 has a similar profile as the radome 305 and radome spacer 310, but may not extend to the full edges of the radome 305 and radome spacer 310. Instead, the upper patch antenna layer 330 may substantially align with the profile of the chassis 345. The lower antenna stack 340 (made up of the antenna spacer 335, the lower patch antenna layer 370, dielectric layer 375, and PCB assembly 375) has a different profile than the radome 305, radome spacer 310, and upper patch antenna layer 330, such that these layers substantially align with each other when stacked.

Figure 7A:
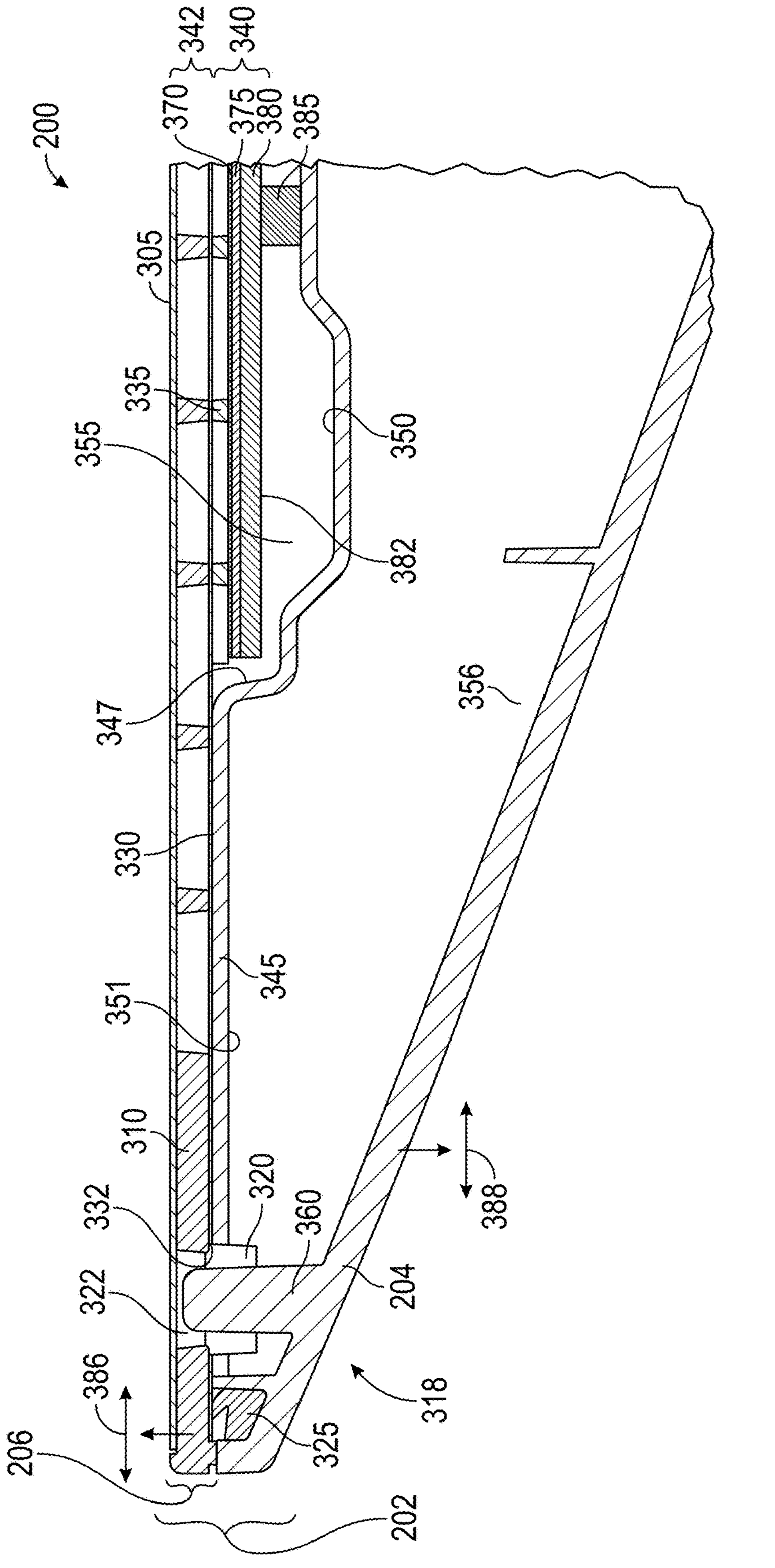
FIG. 7A is a partial cross-sectional view of the antenna apparatus of FIG. 3 showing the antenna stack assembly inside the housing.
Figure 7B:
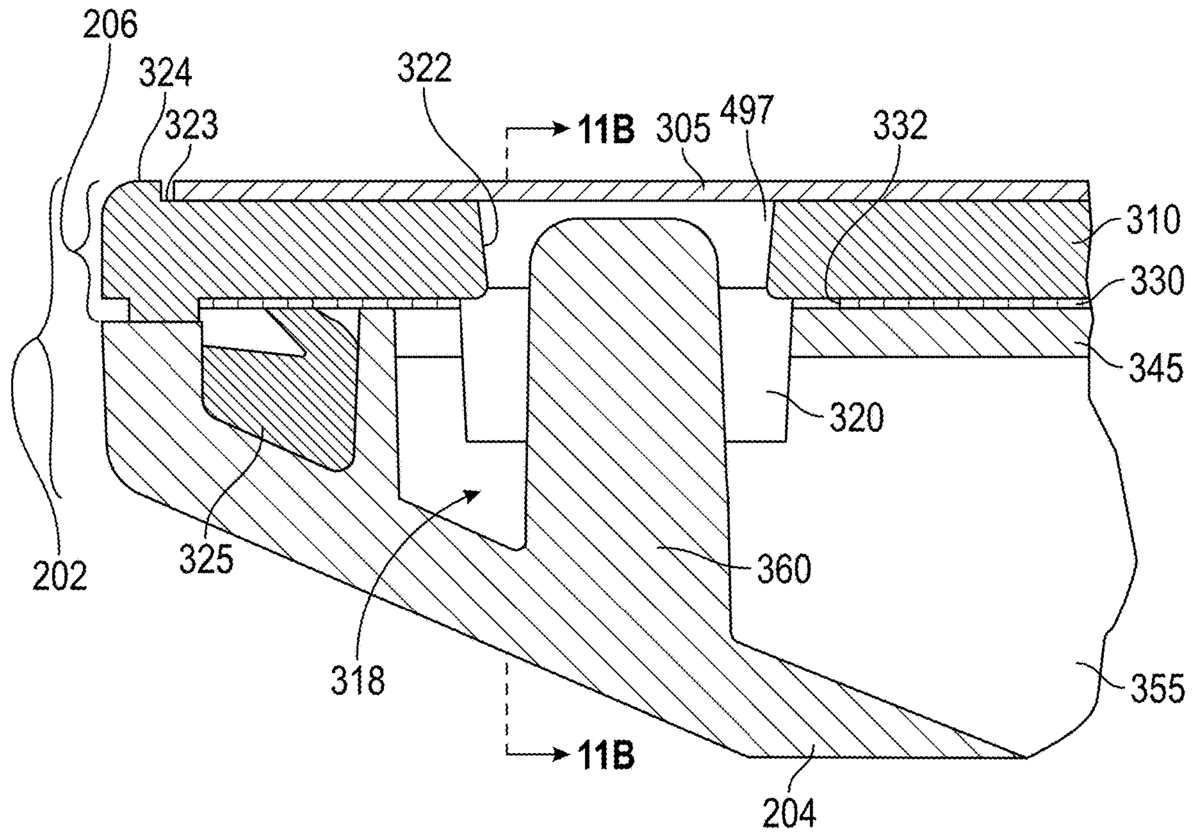
FIG. 7B is a close-up partial cross-sectional view of the antenna apparatus of FIG. 3 showing the fastening system.
Figure 7C:
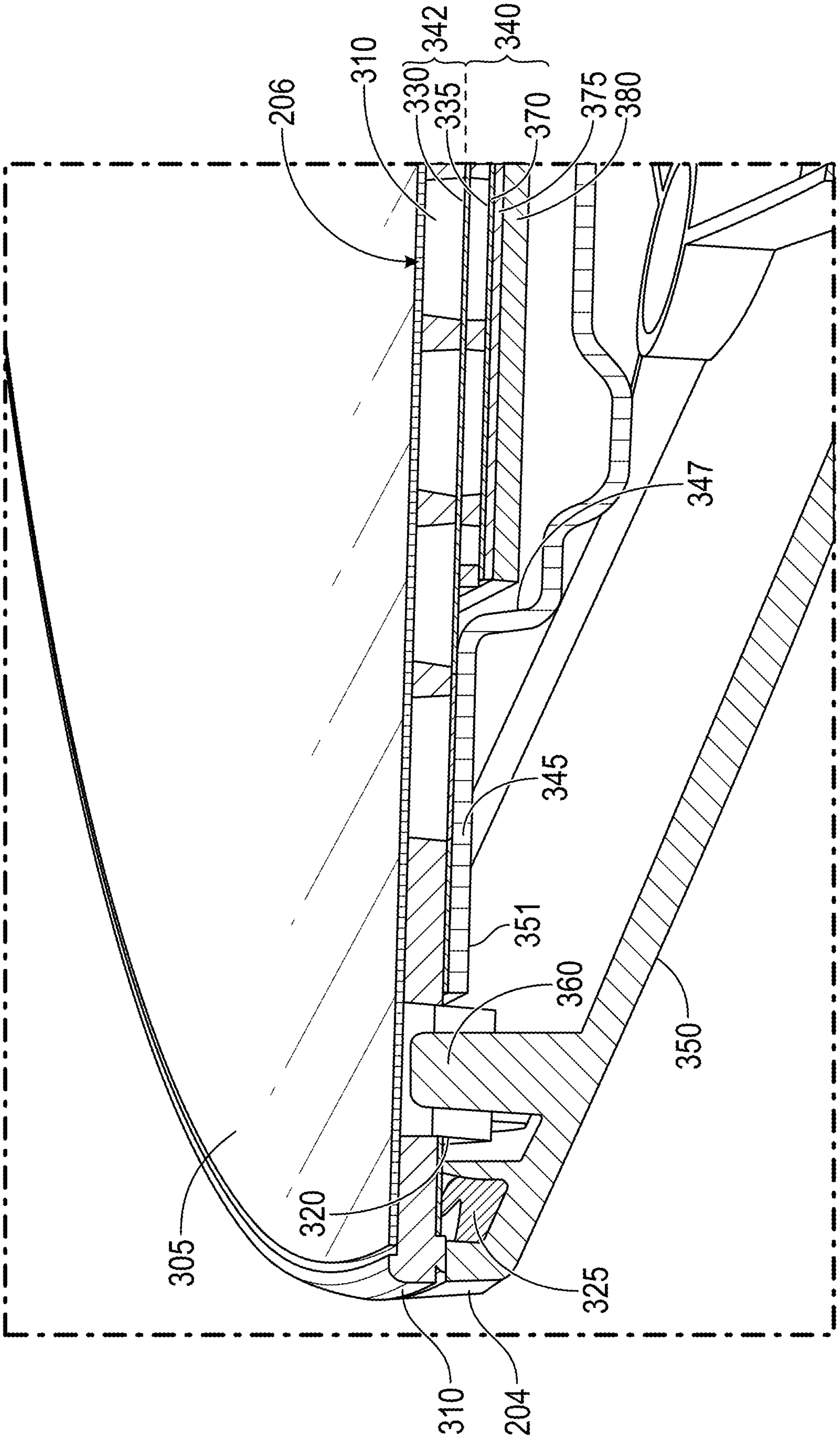
FIG. 7C is an isometric partial cut-away view of the antenna apparatus of FIG. 3.

Referring to FIG. 7A such alignment is illustrated in a cross-sectional side view of a portion of the housing assembly 202. As shown in FIGS. 7A and 7B, the radome 305 is coupled to the radome spacer 310. In the illustrated embodiment, the radome 305 resting inside a recessed area 323 on the radome spacer 310 defined by a lip 324 near the outer edge of the radome spacer 310.

The antenna stack assembly 300 including the upper patch antenna layer 330 and the lower antenna stack 340 may generate heat in operation. Further, other electrical components (not shown) associated with the antenna system within the inner chamber 355 may generate heat, such as a modem, Wi-Fi card and Wi-Fi antennas, GPS antenna, or other circuitry or PCB's. The heat generated by the antenna components or other electrical components may cause many of the components making up the housing assembly 202 and the antenna stack assembly 300 to expand and contract (grow and shrink). Further, weather conditions external the housing assembly 202 may involve changes in temperature, which also may impact the expansion and contraction of components making up housing assembly 202.

As discussed above, the radome spacer 310 may be made from plastic such as polyethylene (PE), such as linear low density polyethylene (LLDPE), high density polyethylene (HDPE), as well as other plastics such as polypropylene (PP), polyethylene terephthalate (PET), polyvinyl chlorine (PVC), or other suitable polymers. A suitable plastic may be conductive and capable of dissipating heat through its structure In contrast, the lower enclosure 204 may be made up of a material, which may be different than the material of the radome spacer. For example, the lower enclosure 204 may be made from metal or from a plastic have good stiffness and that does not creep at temperature. A drawback of a metal lower enclosure 204 is that it is more difficult to form the shape of such a metal component. Because heat conductivity is not required for the lower enclosure, a suitable plastic material for the lower enclosure may be a thermoplastic material, such as a polycarbonate or a polycarbonate and acrylic-styrene-acrylate terpolymer (ASA) blend that offers good resistance to both UV and moisture. Other suitable materials may include thermoplastics, such as polypropylene (PP) or polyphenylene ether (PPE).

The various components making up the housing assembly 202 may have different CTEs. As a result, the various components expand and contract by different degrees and therefore move relative to one another. Consequently, the different degrees of expansion and contraction can cause instability or threaten the structural integrity of the housing. Accordingly, the fasteners as disclosed herein permit the relative movement and sliding of the components relative to one another to accommodate the changes in size as expansion and contraction occurs.

In particular, the coefficient of thermal expansion (CTE) of the lower enclosure 204 may be different than the CTE of the radome spacer 310. Accordingly, the lower enclosure 204 may expand and contract a different degree and/or rate than the radome spacer 310. Furthermore, the components bonded to the radome spacer 310 (such as the radome 305, the upper patch antenna layer 330, and the lower antenna stack 340) may also have different CTEs, and therefore, may expand and contract differently than the lower enclosure 204.

Even if the radome spacer 310 and the lower enclosure 204 were made from the same plastic materials, the radome spacer 310 is disposed within the adhesive layer stack 390. Accordingly, the other components within the adhesive layer stack 390 may mechanically impose contraction and expansion to the radome spacer 310, thereby altering the CTE of the radome spacer 310.

As shown by the dual arrows 388 in FIG. 7A, the lower enclosure 204 may expand and contract in a radial direction. As used herein, the term radial direction may include movement radially inward toward a center or radially outward from a center. Similarly, as shown by the dual arrows 386 in FIG. 7A, the radome spacer 310 may expand and contract in a radially inward or outward direction. The rates and degrees of expansion indicated by the dual arrows 388 and 386 may differ as a result in the difference in materials of the involved components.

In some embodiments, the lower enclosure 204 may be made from material having a relatively high CTE, for example, equal to or greater than about 50 ppm/° C., alternatively equal to or greater than about 60 ppm/° C., alternatively equal to or greater than about 70 ppm/° C., alternatively equal to or greater than about 100 ppm/° C. In one non-limiting example, a plastic material including a polycarbonate-ASA blend has a CTE in the range of about 60-65 ppm/° C. With a fiberglass additive, the CTE may be in the range of about 40-50 ppm/° C.

In some embodiments, the radome spacer 310 and the antenna spacer 335 may be made from a conductive plastic material having a very high CTE, for example, more than 100 ppm/° C. In one non-limiting example, for LLDPE, the CTE of the radome spacer 310 is 150 ppm/° C. However, because the radome spacer 310 is disposed within and adhesively coupled to the adhesive layer stack 390, the combined CTE changes to a much lower value. For example, radome 305, upper patch antenna layer 330, lower patch antenna layer 370, dielectric spacer 375, and PCB assembly 380, may be PCBs or other non-plastic materials made from fiberglass, copper and other substrate materials, and may have a CTE of less than about 45 ppm/° C., alternatively equal to or less than about 30 ppm/° C., alternatively equal to or less than about 20 ppm/° C. In one non-limiting example, the PCB components in the adhesive stack assembly 390 may have a CTE of about 14 ppm/° C.

Due to the low CTE and general stiffness of most components of the adhesive stack assembly 390, the combined CTE of the radome spacer 310 and the adhesive stack assembly 390 also becomes much lower, such as equal to or less than about 45 ppm/° C., alternatively equal to or less than about 30 ppm/° C., alternatively equal to or less than about 20 ppm/° C. In one non-limiting example, the combined CTE of the radome spacer 310 and the adhesive stack assembly 390 is 17 ppm/° C.

Because of the differences in the CTE values of the plastic components in the assembly, such as the radome spacer 310, the antenna spacer 335, and the lower enclosure 350, and because of the relatively high CTE values of the plastic components compared to the other non-plastic components in the antenna apparatus 200, the plastic components are typically manufactured in temperature controlled environments. With temperature-controlled manufacturing, parts are manufactured to be within tolerances during assembly (which also may be in a temperature-controlled environment).

In addition to manufacturing tolerances, the differences in CTE of the radome spacer 310 and the lower enclosure 350, as well as in the other components of the antenna stack assembly 300 may cause the radome spacer 310 and the lower enclosure 350 to shift relative to one another as the components expand and contract. Accordingly, the plurality of projecting fasteners 520 and the plurality of receiving fasteners 560 are design to accommodate such shifting.

Likewise, the detents 346 around its perimeter of the chassis 345, and the ports 332 in the upper patch antenna layer 330 through which the engaged projecting fasteners 520 and receiving fasteners 560 may pass are also designed and configured to allow a mismatch in expansion and contraction of the radome space 310 and the lower enclosure 204.

Figure 11B:
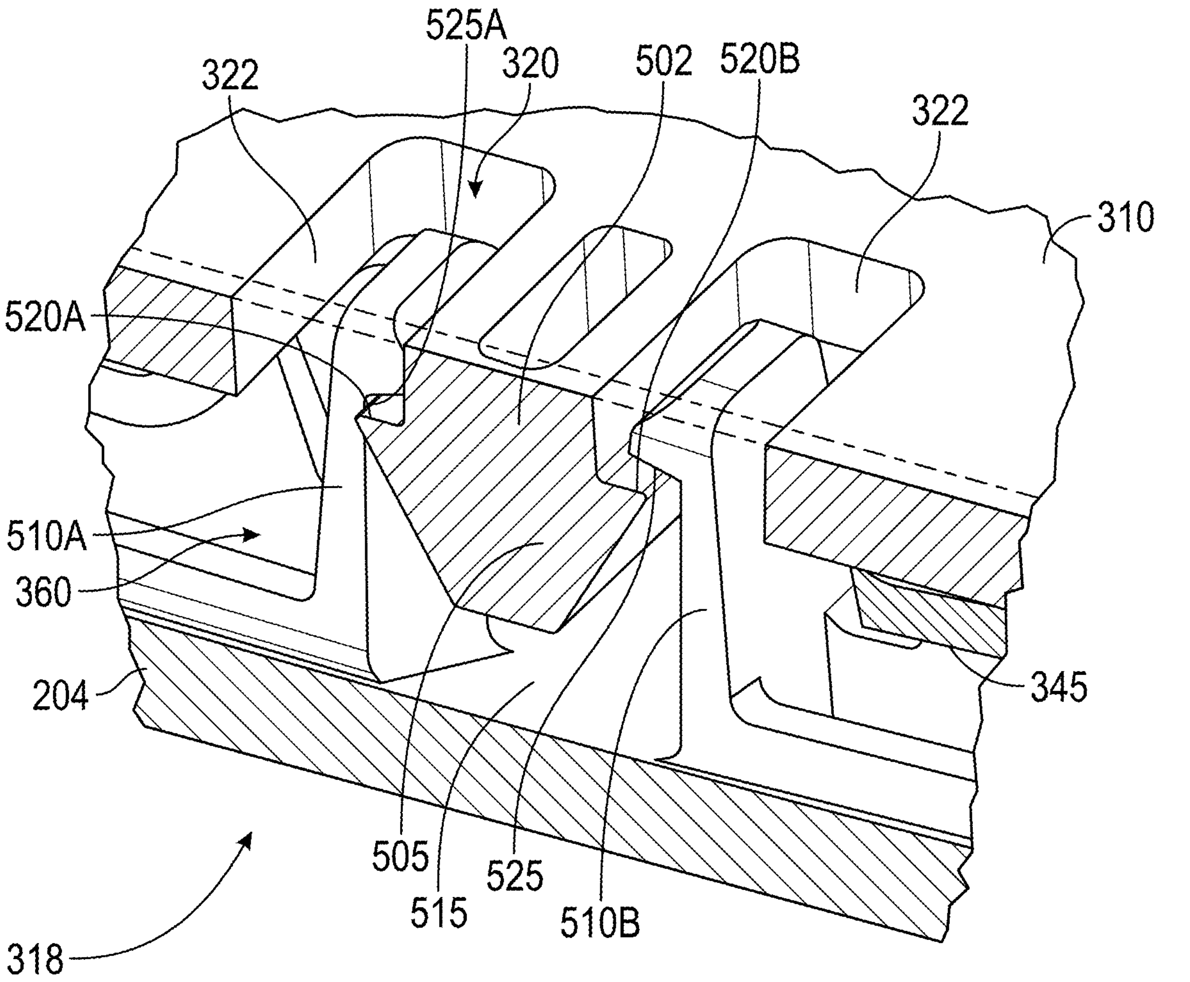
Figure 12:
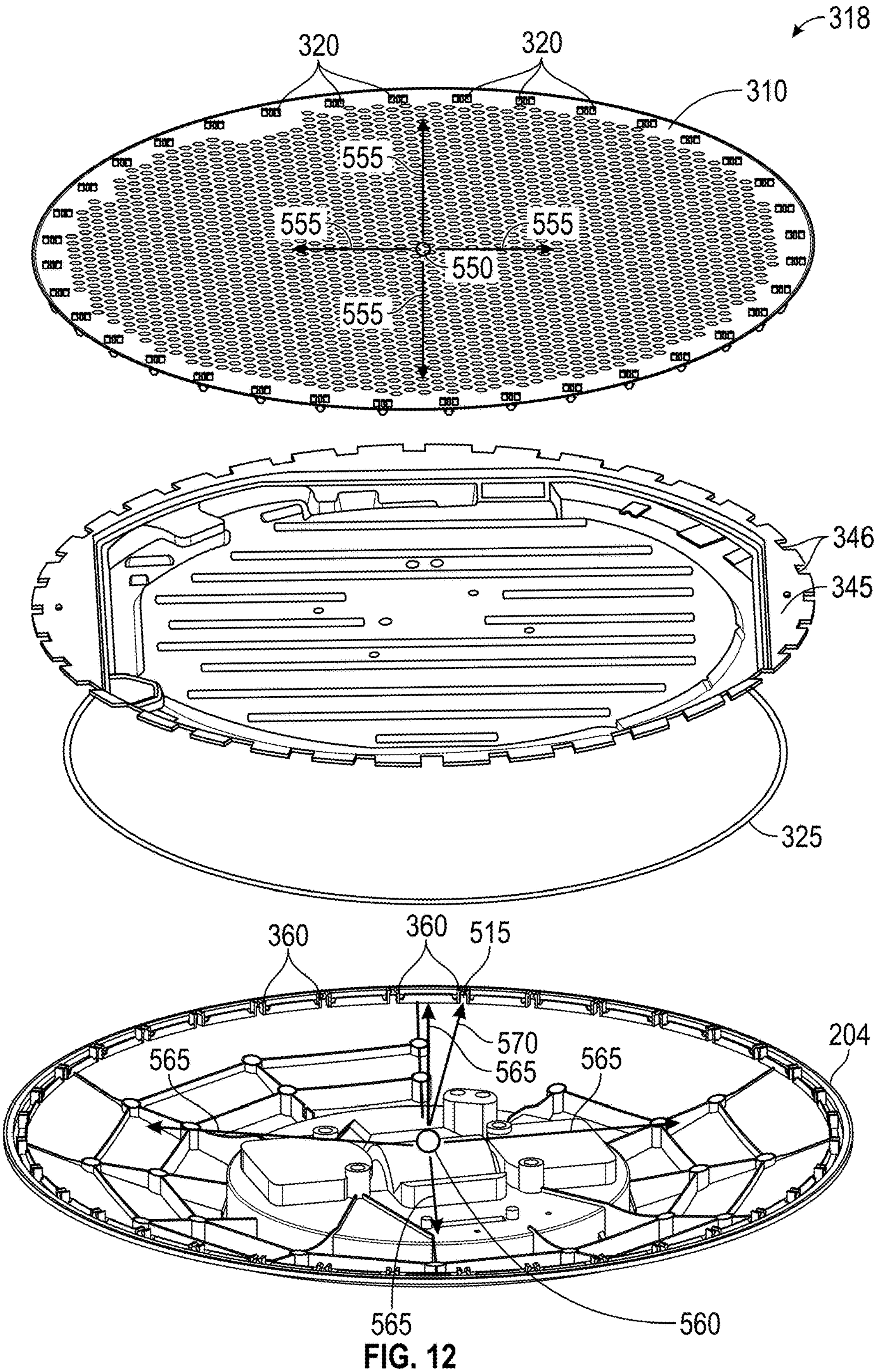
FIG. 12 is an exploded view of the housing assembly components of the antenna assembly of FIGS. 2A and 2B in accordance with embodiments of the present disclosure.

As shown in the cross-sectional views of FIGS. 7A and 7B, and also in the cut away views of FIGS. 11A and 11B, each one of the plurality of receiving fastener portions 360 are slidingly engaged with one of the plurality of projecting fastener portions 320. A plurality of portals 322 are provided in the radome spacer 310 near the projecting fastener portion 320 for plastic manufacturing and for flexibility in the material as the projecting fastener portions 320 of the radome spacer 310 engage the receiving fastener portions 360 of the lower enclosure 204.

The projecting fastener portions 320 of the radome spacer 310 engage the receiving fastener portions 360 of the lower enclosure 204 are oriented relative to the housing assembly 202 such that, when engage, the projecting fastener 320 may slide relative to the receiving fastener 360 in both radially inward and radially outward directions from the center of the housing assembly 202. Further, annular seal 325 (see FIG. 3) between the radome spacer 310 and the lower enclosure 204 along the outer perimeter of the housing assembly 202 is designed to provide a seal between the two components regardless of any shift of the components resulting from the contraction and expansion.

FIG. 11A illustrates a projecting fastener 320 and receiving fastener 360 in a disengaged configuration. FIG. 11BA illustrates an engaged configuration. As illustrated, the projecting fastener 320 extends downward from the radome spacer 310 toward the lower enclosure 204. The projecting fastener 320 may have a central projection 502 having a head 505, which in the illustrated embodiment has a truncated triangular shape. The head 505 has sides that expand in width as they extend toward the radome spacer 310, thus defining outwardly extencing shoulder portions 520A and 520B.

The receiving fastener 360 includes dual walls 510A and 510B separated by an aperture 515 which is a longitudinal passageway aligned with a radial axis extending from the radome spacer 310 and/or lower enclosure 204. Further, in the embodiment shown, the aperture 515 is open to a radial axis, however in other embodiments it can be enclosed. However, in each case, the aperture 515 provides a passageway aligned with a radial axis extending from the central axis 352 (see FIG. 3) such that movement of a projecting fastener 320 therein may move radially inward or radially outward with respect to the receiving fastener 360. The central projection 502 may have a corresponding rectangular shape to fit within the longitudinal shape of aperture 515 and facilitate movement in the radially inward or outward. The dual walls 510A and 510B including overhanging flanges 525A and 525B configured to engage shoulders 520A and 520B of the projecting fastener 320.

To shift from the disengaged configuration of FIG. 11A to the engaged configuration shown in FIG. 11B, the head 505 contacts and urges the dual walls 510A and 510B from their original position to deform laterally. The walls 510A and 510B deform until the shoulders 520A and 520B passes by the overhanging flanges 525A and 525B. When this occurs, the dual walls 510A and 510B snap back to their original position and the overhanging flanges 525A and 525B engage the shoulders 520A and 520B interlocking with one another. Consequently, the projecting fastener 420 is inhibited from removal from the receiving fastener 460 by the abutment and friction between the overhanging flanges 525A and 525B engage the shoulders 520A and 520B. This fastening system may also be referred to as a snap-fit coupling.

FIG. 12A illustrates perspective views of the underside face of the radome spacer 310 and the top surface of the lower enclosure 204. As shown, the plurality of projecting fasteners 320 are provided extending from the perimeter area of the radome spacer 310. The radome spacer 310 has a center point 550 from which radial axes extend represented by the arrows 555. The radome spacer 310, when exposed to heat or cooling, will expand and contract radially inward toward or outward from the spacer center 550.

Regarding the lower enclosure 204, the plurality of receiving fasteners 360 are provided in the perimeter area of the lower enclosure 204. The lower enclosure 204 also has a center point 560 from which radial axes extend represented by the arrows 565.

As shown, radial axis 570 is aligned with the aperture 515 of receiving fastener 360. The radial axis 570 is shown for representative purposes only; each of the plurality of apertures 515 of each receiving fastener 360 are aligned with a corresponding radial axis extending from the center point 560 of the lower enclosure 204. In particular, the aperture 515 forms a longitudinal passageway aligned with a radial axis 570 extending from the center point 560, which permits sliding engagement of the projecting fasteners 320 extending downwardly from the radome spacer 310 and the aperture 515 of the receiving fasteners 360 on the lower enclosure 204 relative to each other in the radial direction. Such radial movement may be inward and outward relative to the respective center points 550 and 560 of the radome spacer 310 and lower enclosure 204, as the parts expand and contract and shift and move with respect to one another during normal operation of the antenna apparatus 200.

Figure 5C:
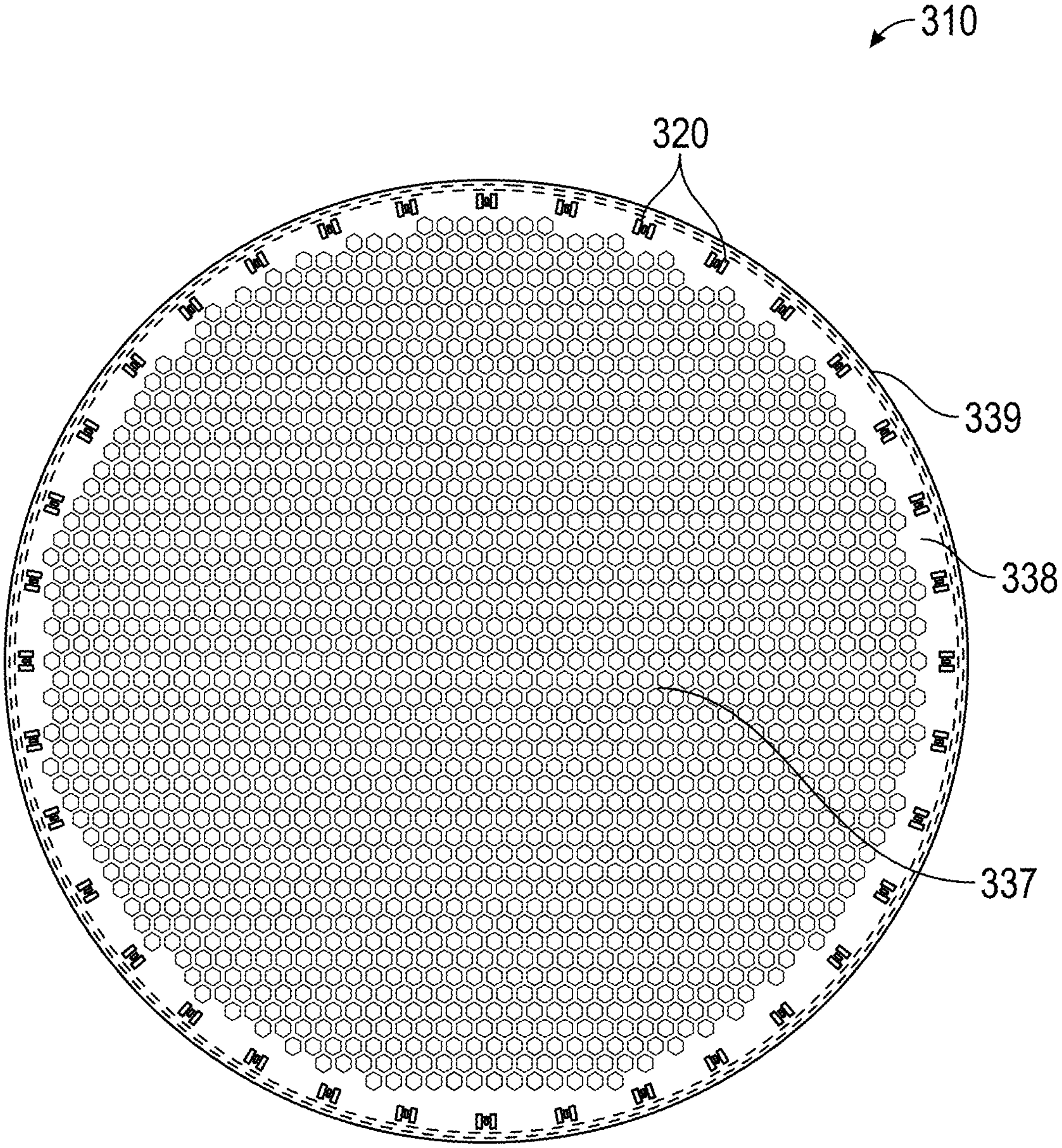
FIG. 5C is a top view of the upper patch antenna layer of the antenna stack assembly of the antenna apparatus of FIG. 3.

FIG. 5C illustrates an overhead plan view of the radome spacer 310 coupled with the lower enclosure 204, with the plurality of projecting fasteners 320 of the radome spacer 310 inserted into the plurality of receiving fasteners 360 of the lower enclosure 204. The dotted lines illustrates the seal 325 extending between the respective perimeters of the radome spacer 310 and the lower enclosure 204 (see also FIG. 7A), which serves to prevent the ingress of unwanted materials such as dirt, water, moisture or other elements. As a representative example, projecting fastener 320 is inserted in receiving fasteners 360 aligned along a radial axis 570. Although this alignment with radial axis 580 is illustrated for only one projecting fastener 320 and one receiving fastener 360, each of the plurality of projecting fasteners and receiving fasteners are aligned with radial axes extending from the common center point. The engagement of the extending fasteners 320 and the receiving fasteners 360 permits relative movement between such fasteners as the radome spacer 310 and the lower enclosure 204 expand and contract relative one another radially inward or radially outward as represented by the dual arrows 585.

Dissipation of Heat

The dissipation and/or flow of heat generated by the antenna stack assembly 300 and/or other electrical components will now be described with reference to FIGS. 5A-5B, 7A-7C, and 13. In some embodiments, the radome portion 206 may be made from conductive materials or may include a conductive portion for heat dissipation. In the illustrated embodiment, the radome portion 206 is designed to include a radome spacer 310 having a structure with cell walls 316 that are conductive and facilitate the flow of heat vertically to the radome 305. Moreover, a conductive chassis 345 is provided to support the antenna stack assembly 300 and spread heat in-plane (radially) toward the perimeter of the housing assembly 202.

During operation, heat may be generated by the PCB and other various components in the antenna stack assembly 300. Heat transmitted to the radome portion 206 may be transmitted in a pattern to the radome 305 via the cell walls 316 of the radome spacer 310 or via the chassis 345 to the outer rim of the upper patch layer 330 then to the outer rim of the radome portion 206. In accordance with some embodiments of the present disclosure, the heat dissipated through the radome 305 and the outer rim of the upper patch layer 330 may be sufficient to melt snow and/or ice that may be present on the radome 305. Likewise, the heat dissipated may be sufficient to prevent or inhibit the buildup of such snow and/or ice.

In alternative embodiments, heat may be dissipated via a heat sink or heat spreader, which may extend from a bottom region of the housing assembly on the chassis or lower enclosure. In one non-limiting example, a suitable heat sink may include fins along the length of the external surface of the lower enclosure (see FIG. 26).

The radome spacer 310 may act as a heat transfer layer that is configured to facilitate the flow of heat generated by the antenna, electronic components or other components to the outer surfaces of the antenna apparatus 200, for example, through the top surface of the radome portion 206, through the outer perimeter of the antenna apparatus 200, or through the lower enclosure 204. Heat dissipated through the through the top surface of the radome portion 206 or through the outer perimeter of the antenna apparatus 200 can be used for snow and moisture mitigation.

As described above, the radome spacer 310 may include a structure including an interior portion 337 defining a plurality of cell walls 315 and extending toward an exterior portion 338, which is adjacent the outer perimeter 339 of radome spacer 310 (see FIGS. 5B and 5C). The exterior portion 338 may include a plurality of projecting fasteners 320 relating to the fastening system 318 of the antenna apparatus 200. The cell walls 316 (see FIG. 5B) of the radome spacer 310 are designed and configured from a conductive material such that a through-plane thermal path of heat passes through the walls 316 to the radome 305, as seen in FIG. 13. These thermal paths accordingly assist in dissipating heat to the radome 305, which is then dissipated to the environment.

While the radome spacer 310 provides a heat dissipation function, the radome spacer 310 includes a large amount of air in the apertures 315 defined by the cell walls 316. This air spacing is designed to align with the antenna elements 304 so as not to impede communication of the antenna array 308. Therefore, the apertures 315 within the cell walls 316 of the honeycomb structure provide a proportion of air, such that the ratio of air to solid surface area or the body of the radome spacer 310. A consistent pattern, such as a honeycomb pattern, in the cell walls 315 radome spacer 310 reduces a potential temperature gradient across the body of the radome spacer 310.

As discussed above, the radome spacer 310 may be adjacent and/or coupled to an upper patch antenna layer 330. The conductive features of the upper patch layer 330 serves as a heat transfer layer. As shown in FIG. 5A of the upper patch layer 330, the upper surface has an interior portion 327 having a plurality of antenna patch elements 304. The upper patch layer 330 has a perimeter portion 329 extending around the exterior portion 328 of the upper patch layer 330. The perimeter portion 329 may include a continuous thermally conductive portion or a heat transfer portion.

At certain locations along the perimeter portion 329 of the upper patch layer 330, the exterior portion 328 may include an intermediate portion 331, which may include gridline features extending in toward the interior portion 327, so as to provide thieving effects to increase the in-plane stiffness of the upper patch layer and better balance the laminate outside of the PCB. The grid features makes the structure less visible to the antenna, while still greatly increasing the stiffness. While the grid features do not have high in-plane thermal conductivity, the solid copper features near the outer perimeter have high in-plane thermal conductivity for heat transfer effects.

In some embodiments, the antenna array 308 may be offset from a center point of the antenna apparatus 200 (see central axis 352 in FIG. 3A) to accommodate a GPS antenna 306 or for balancing heat generating components.

The perimeter portion 328 of the upper patch layer 330 may be interrupted by ports 332 through which projecting fasteners 320 of the fastener system 318 may be configured to pass to couple the radome portion 206 (for example, the radome spacer 310) to the lower enclosure 204. However, in some embodiments, the perimeter portion 328 may be a continuous portion without ports 332 or other apertures.

The thermally conductive features on the exterior portion 329 of the upper patch layer 330 may include metal patterning or features on the upper surface of the upper patch antenna layer 330. The metal of the metal features may be a single type of metal, or a mixture of metals, an alloy or a composite having a metal. The metal may be one or more of copper, aluminum, brass, steel, bronze, carbon, graphene, or other thermally conductive metals.

In one embodiment, the upper patch layer 330 may be a PCB layer and the thermally conductive exterior portion 329 of the upper patch layer 330 may be metal features formed on a PCB, such as copper layers on the upper and/or lower surface of the upper patch layer 330. The copper, or other conductive metal, may be patterned to form the discrete antenna elements, thieving elements, and the thermally conductive features.

The thermally conductive features of the upper patch antenna layer 330 may have any thickness suitable for flowing or otherwise conducting heat. The thickness may be in the range about 0.5 mil to about 5.0 mil (about 0.0005 inches to about 0.0050 inches), or about 0.1 mil to about 3.0 mil (about 0.0010 inches to about 0.0030 inches), or about 1.2 mil to about 2.5 mil (about 0.0012 inches to about 0.0025 inches). In one embodiment, the thickness may be about 1.4 mil (about 0.0014 inches). While not being held to any particular thickness in view of differences in materials and conditions, there may be improved benefits in heat dissipation in other thicknesses.

Accordingly, the upper patch layer 330 may accordingly be considered a patch antenna layer and a heat transfer layer or a thermally conductive layer that transfers heat to the radome spacer 310 for heat dissipation through the radome 305.

Figure 5D:
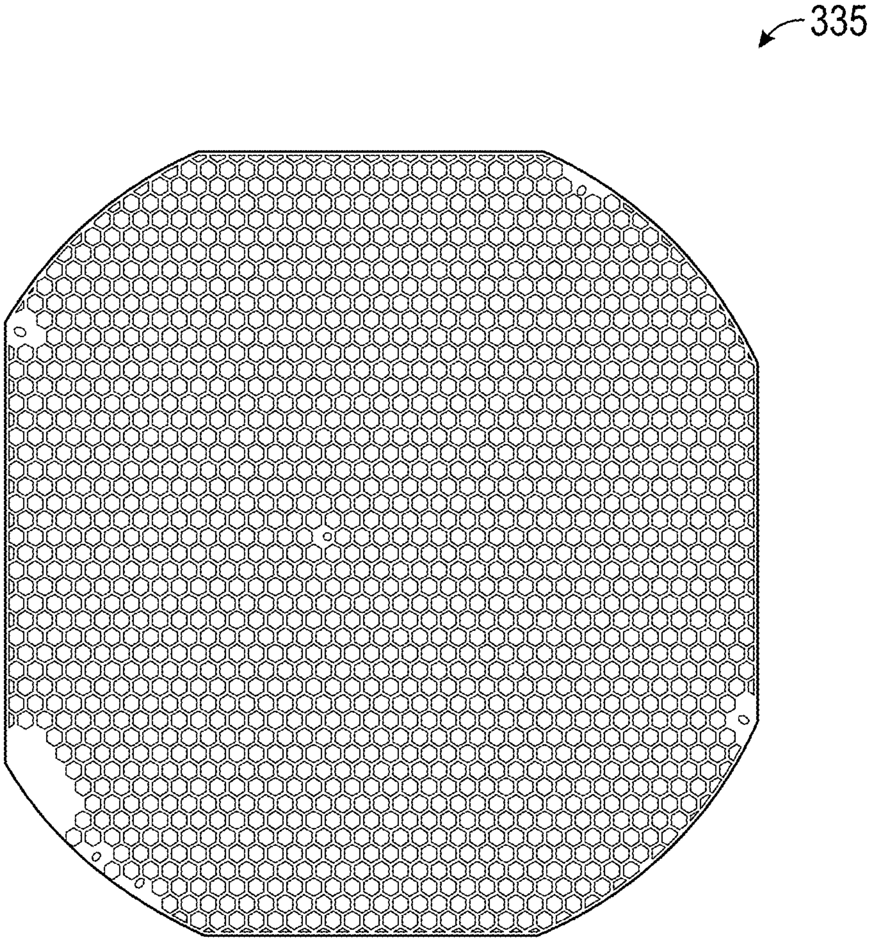
FIG. 5D is a top view of the antenna spacer of the antenna stack assembly of the antenna apparatus of FIG. 3.

Referring to FIG. 5D, located below the upper patch antenna layer 330 is an antenna spacer 335 to which it may be adjacent and coupled. The antenna spacer 335 may be made up of the same or similar material as the radome spacer 310, and may also have a honeycomb structure defined by a plurality of cells and apertures. As described above, the antenna spacer 335 together with other components (the lower patch antenna layer 370, made up of a PCB layer or other similar material as upper patch layer 330, and PCB assembly 380 separated by a dielectric spacer 375) make up the lower antenna stack 340. The components of the lower antenna stack 340 may have the same or similar shape and fit within the inner wall 347 of the chassis 345.

Figure 5E:
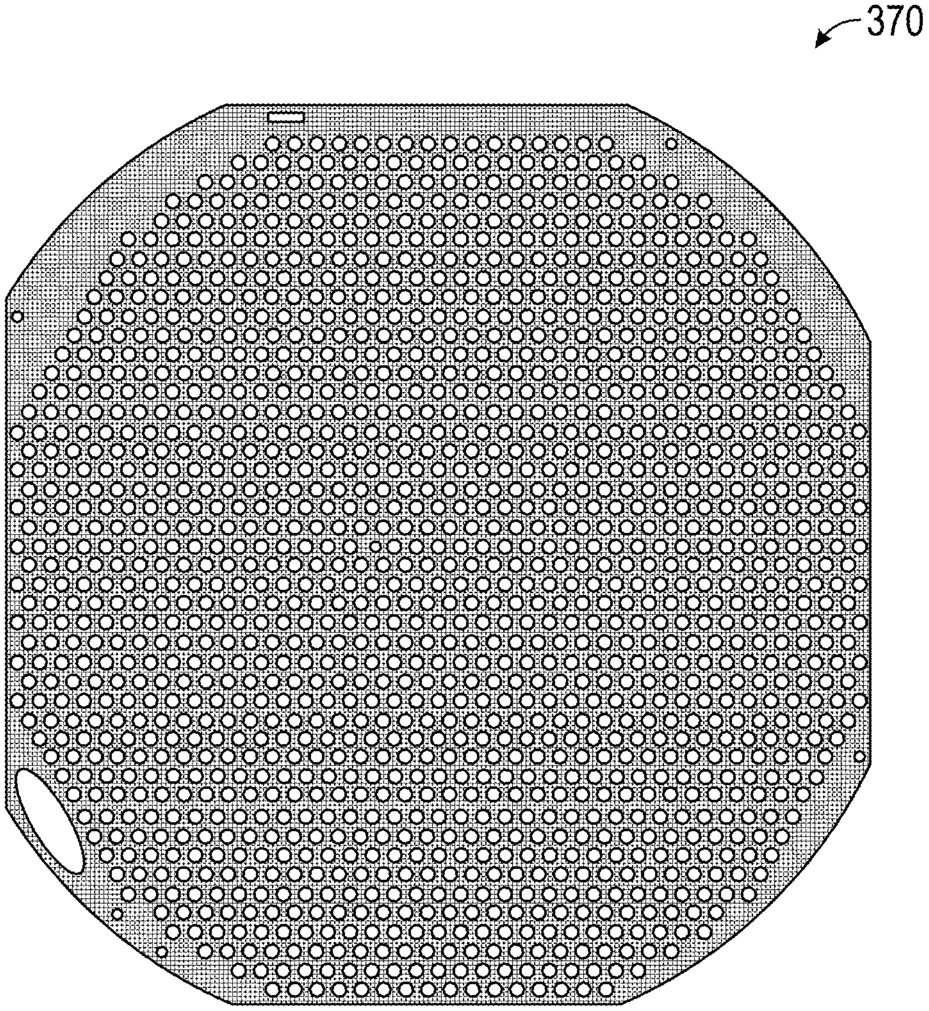
FIG. 5E is a top view of the lower patch antenna layer of the antenna stack assembly of the antenna apparatus of FIG. 3.

Referring to FIG. 5E, the lower patch antenna layer 370, like the upper patch antenna layer may have a plurality of antenna patch elements made from conductive material, such as copper. The lower patch antenna layer 370, may also have other metal features between antenna patch elements designed for antenna signal tuning.

As seen in FIG. 13, a thermal interface material (TIM) 385 may be provided in contact with the undersurface 382 of the PCB assembly 380 for dissipating heat away from the PCB assembly 380 and other electrical components to the chassis 345. The thermal interface material 385 is provided as a plurality of discrete elements (see FIG. 10), and may be coupled to antenna components provided on the undersurface of the PCB assembly 380.

With the stack assembly 300 thermally coupled to the chassis 345, the chassis 345 may act as a heat spreader to facilitate in-plane thermal flow across its body, including in a direction radially outward from the center axis 352 (see FIG. 3). The spreading of heat across the body of the chassis 345 assists in the dissipation of heat from the heat generating components coupled to the chassis 345.

Extending outwardly around the inner wall 347, the chassis 347 includes a perimeter section 351 configured for interfacing with the radome portion 206. Accordingly, heat may spread along the body of the chassis 345 radially outward to the perimeter section 351, then flow into the conductive features on the upper patch layer 330. Such heat may then further spread radially outward by the conductive features on the exterior portion 338 of the upper patch layer 330 to the radome spacer 310. This conductive path defined by the chassis 345, upper patch layer 330, and radome spacer 310 has the effect of spreading heat in plane, which is shown in FIG. 13 as radially outward with respect to the center axis 362 of the antenna stack assembly 300.

The chassis 345 may extend radially to the same radius as the placement of the plurality of fasteners 320 extending from the radome spacer 330 in the fastener system 318 and may have a plurality of detents 346 around its outer perimeter through which the engaged projecting fasteners 320 and receiving fasteners 360 may pass. The detents 346 that connect with such fasteners 320 and 360 may further aid in heat dissipation from the chassis 345 to the other housing assembly 202 components, such as the radome spacer 330 and/or to the lower enclosure 204 (which also may be made from a conductive material, such as conductive plastic).

FIG. 5B illustrates an overhead plan view of a portion of the upper patch layer 330 overlaid with radome spacer 310. As shown, each of the plurality of upper patch elements 330*a* on the upper patch layer 330 align with each of the plurality of apertures 315 of the honeycomb structure 315. For instance, the each of the circular edges of the upper patch antenna elements 330*a* are encircled by the edges of the apertures 315. While each of the plurality of apertures 315 are shown in a hexagonal shape, they may have any other polygonal shape or other shape as mentioned previously.

FIG. 13 illustrates a side cross-sectional view of a portion of the housing assembly 300 showing thermal flow paths. As shown, two sections are exploded. Reference numerals used are the same as mentioned with respect to the previous figures. Heat may be generated by component 705, which may be coupled to the PCB assembly 380, may flow to the perimeter 339 of the radome spacer 305 via upward path 710 or downward path 714. The thermal interface material 385 may be coupled directly to the one or more heat generating components or to the PCB assembly 380.

Arrows are provided showing the flow of heat. In particular, the arrows 710, 711, and 712 illustrate the flow of heat from the PCB assembly 380 upwards and outward to the perimeter of the radome spacer 305. For instance, as shown by flow arrows 711, the heat may flow through-plane, such as through the cell walls 316 in both the antenna spacer 335 and the radome spacer 310, to the radome 305, from which is dissipates to the surrounding environment.

Furthermore, arrows 714 and 715 show the flow of heat from the PCB assembly 308 downward via the thermal interface material 385 to the chassis 345. The chassis 345 may act as an in-plane heat spreader, and as indicated, heat flows radially along its body, toward the perimeter of the housing assembly 300 and radome 305.

As heat is dissipated to the radome 305, the radome itself spreads heat along its body and/or surfaces, radially in both directions as indicated by flow arrows 712. This heat spreading assists in reducing the temperature gradient across radome 305 so that there is a consistent temperature across its area. As described above, the heat transferred to the radome 305 may be sufficient to melt or inhibit the buildup of snow or ice.

On the left side of FIG. 13 is another expanded portion. As shown by the in-plane flow arrow 715, the heat from the component 705 travels along the body of the chassis 345 toward the perimeter of the radome 305. Toward the outer perimeter of the chassis 345 the heat may from then move upward toward the radome 305 as shown by flow arrow 717. As shown the heat may travel radially outward as shown by flow arrows 720 and then upward 725 through the radome spacer 305 to the radome 305. The heat will flow radially across the body of the radome 305 similarly as shown on the right side of the FIG. 13.

In one non-limiting example, the radome spacer 310 is made from a conductive plastic having a thermal conductivity of about 0.5 W/mK. Because the radome spacer 310 has a short height (for example, about 2.35 mm) compared to a very long in-plane length, the radome spacer 310 generally moves heat along its shorter dimension (i.e., vertically) through the radome spacer 310, but generally has poor in-plane conductivity. To complement the vertical heat dissipation effects of the radome spacer 310, the chassis (or heat spreader) 345 may be made from aluminum, having a thermal conductivity of about 138 W/mK (for 5052 aluminum). Therefore, the chassis 345 is largely responsible for the in-plane heat transfer through the antenna assembly 200. The heat travels downward through the PCB assembly 380 and the TIM material 385 to the chassis 345, then in-plane along the chassis 345 to the outer rim in upper patch layer 330 that is in contact with the chassis 345, and then to the environment at the outer perimeter of the antenna assembly 200. The outer rim of the upper patch layer 330 may include a copper feature, which has a thermal conductivity of about 385 W/mK.

Various features and aspects of the present invention are illustrated further in the examples that follow. EXAMPLE 4 shows the benefit of a perimeter conductive feature on the upper patch layer 330. EXAMPLE 5

Example 4

Perimeter Conductive Feature

Figure 14:
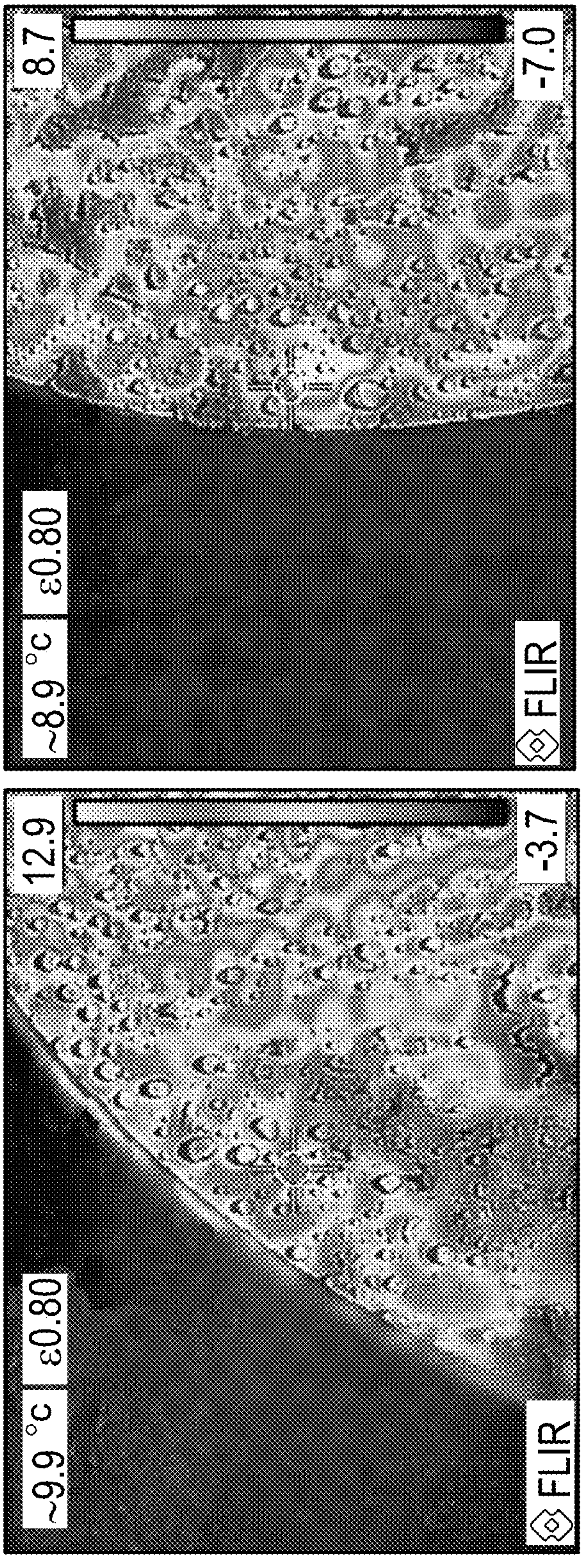
FIGS. 14 and 15 are data schematics showing heat transfer effects of the antenna assembly of FIGS. 2A and 2B in operation in accordance with embodiments of the present disclosure.

FIG. 14 illustrates heat maps of an antenna assembly in accordance with embodiments of the antenna apparatus of the present disclosure, with an upper patch having a thermally conductive portion on its outer perimeter. In the heat map shown on the left, an antenna assembly is provided having an upper patch layer having a perimeter copper conductive feature of thickness of 1.4 mil (0.0014 inches). Heat dissipation is shown from the perimeter of the antenna assembly on the left. In the heat map on the right, the upper patch layer has no perimeter conductive feature. Very little heat dissipation is shown from the perimeter of the antenna assembly on the right.

Example 5

Conductive Feature Thickness

Figure 15:
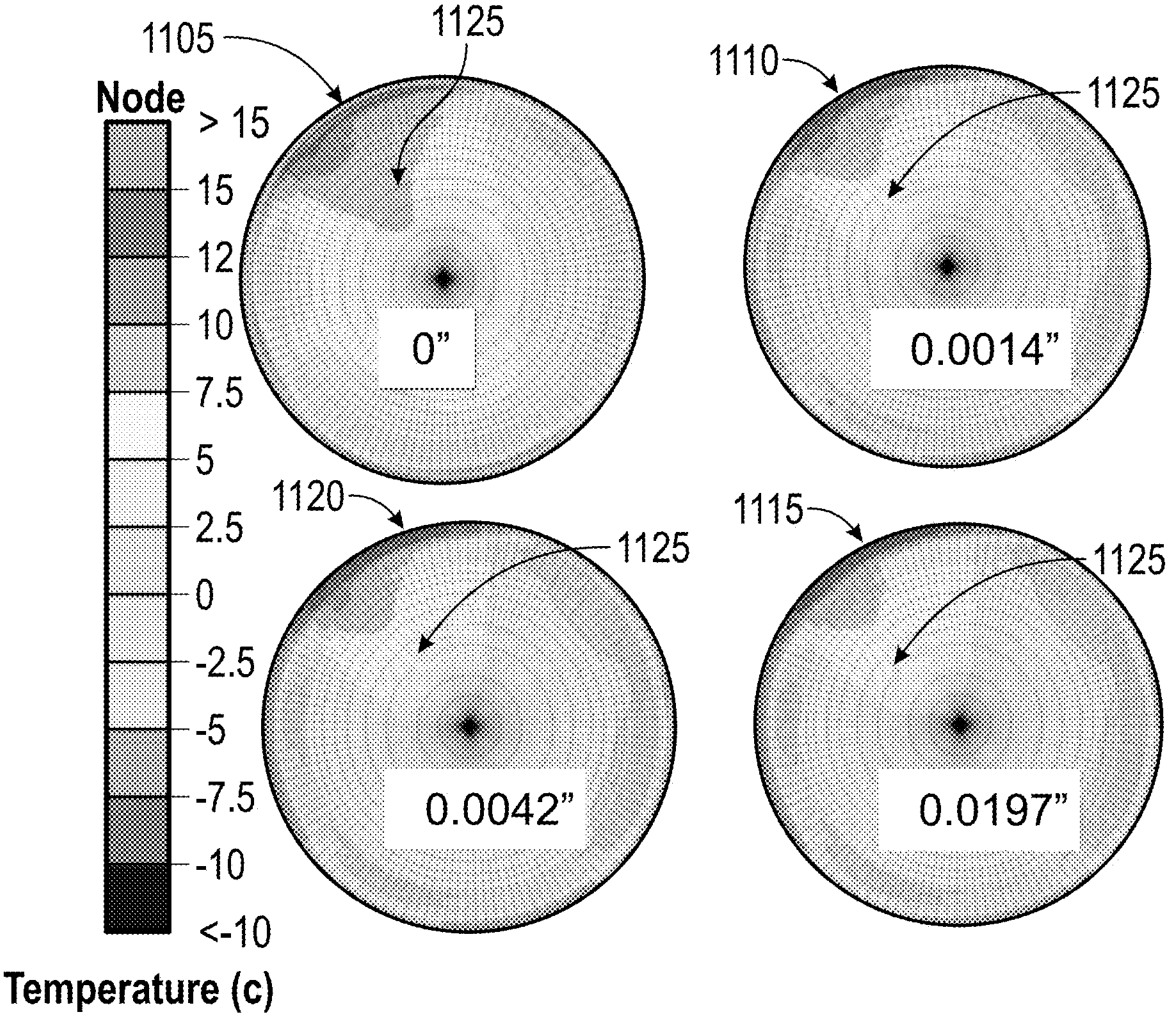
Figure 16:
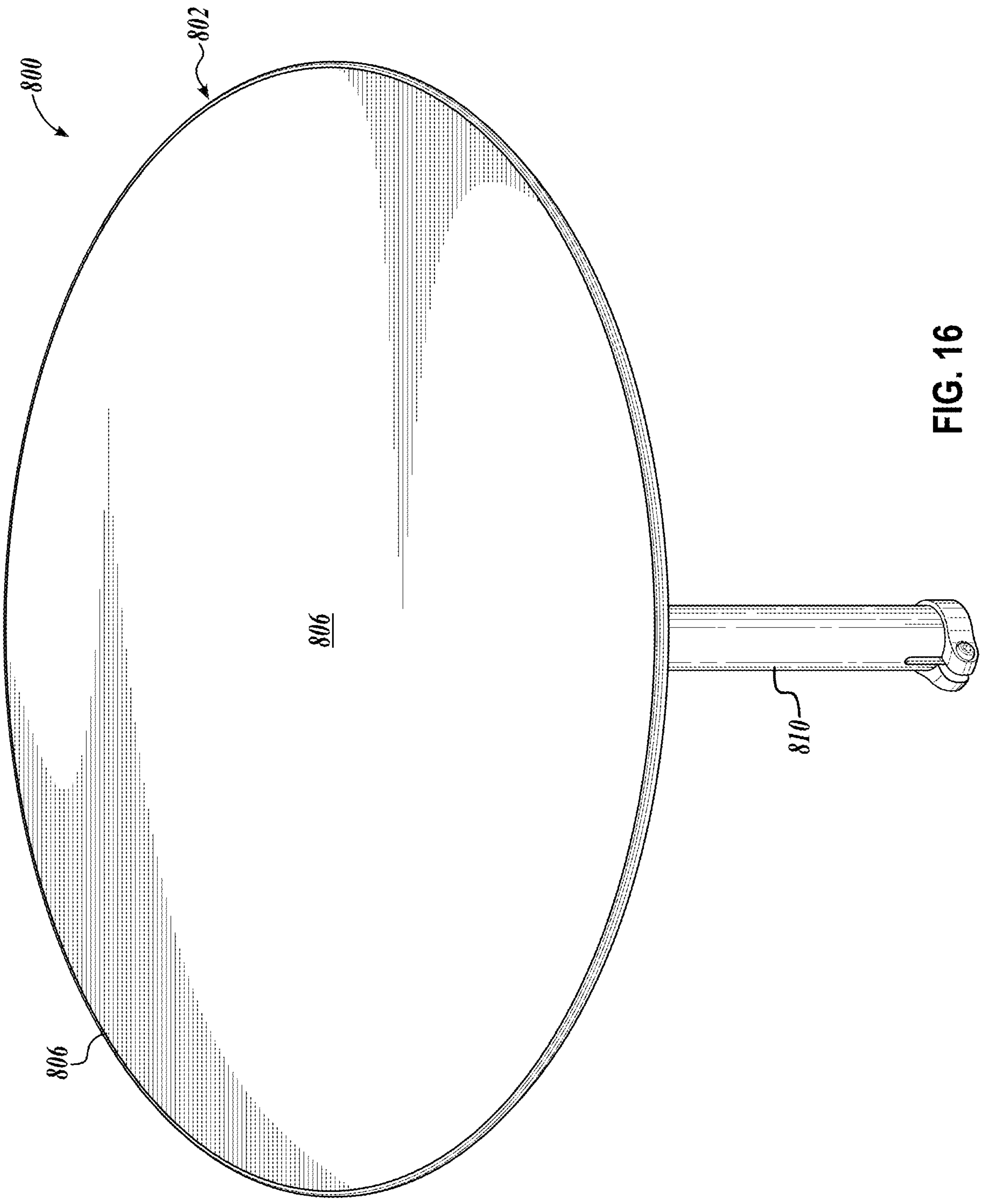
FIGS. 16 and 17 are isometric views of an antenna apparatus with a housing portion in different configurations relative to a mounting system in accordance with embodiments of the present disclosure.

FIG. 15 illustrates four heat maps of antenna assemblies designed in accordance with embodiments of the antenna apparatus of the present disclosure, each having different copper thicknesses in the conductive features of upper patch layer: no copper; 1.4 mil (0.0014 in); 4.2 mil (0.0042 in); and 19.7 mil (0.0197 in). As shown, in each of the assemblies with copper provided heat is dissipated to the perimeter edge of the assembly. Copper thickness appears to be optimized around 1.4 mil, with diminishing returns for thicker copper features. Hot spots are shown in place where certain hot components are located, such as the modem (not shown).

Alternative Embodiment of Antenna Apparatus

Referring to FIGS. 16-33C, an alternate embodiment of an antenna apparatus will now be described. The embodiment of FIGS. 16-33C is substantially similar to the embodiment of FIGS. 1-15, except for differences relating to the radome portion and the chassis. As seen in the embodiment of FIGS. 16-33C, the housing assembly 802 does not include a lower enclosure 804, with the chassis serving the function of the lower enclosure (see FIG. 18).

Figure 21:
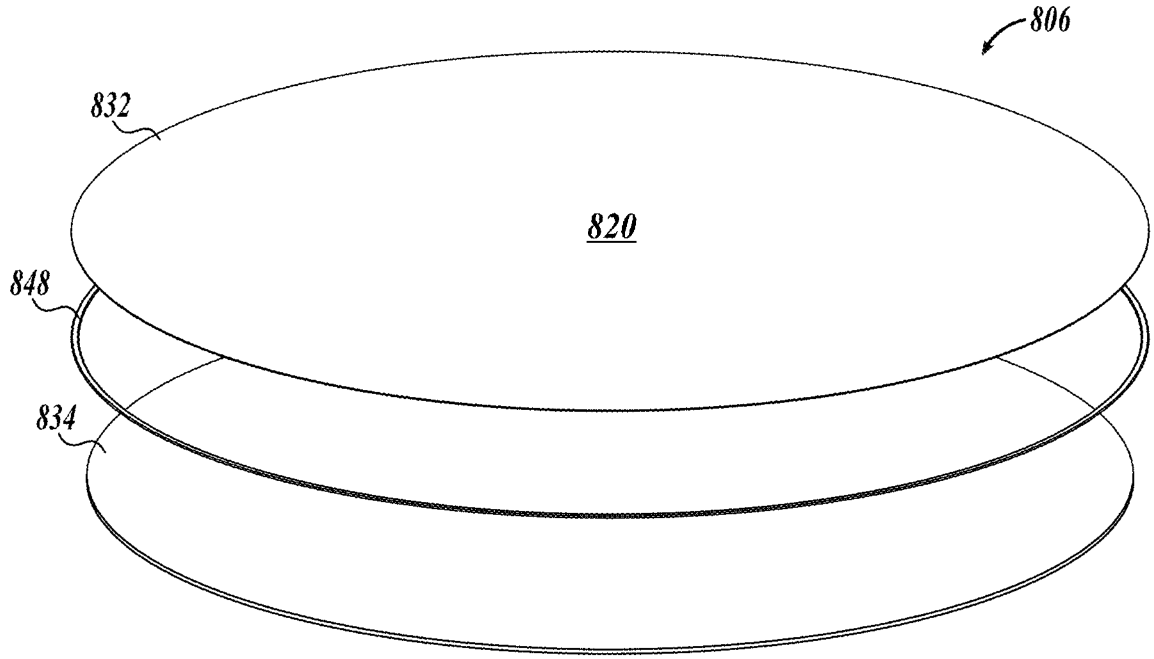
FIGS. 21 and 22 are respective exploded and partial cross-sectional views of a radome portion of the antenna apparatus of FIGS. 16 and 17.
Figure 22:
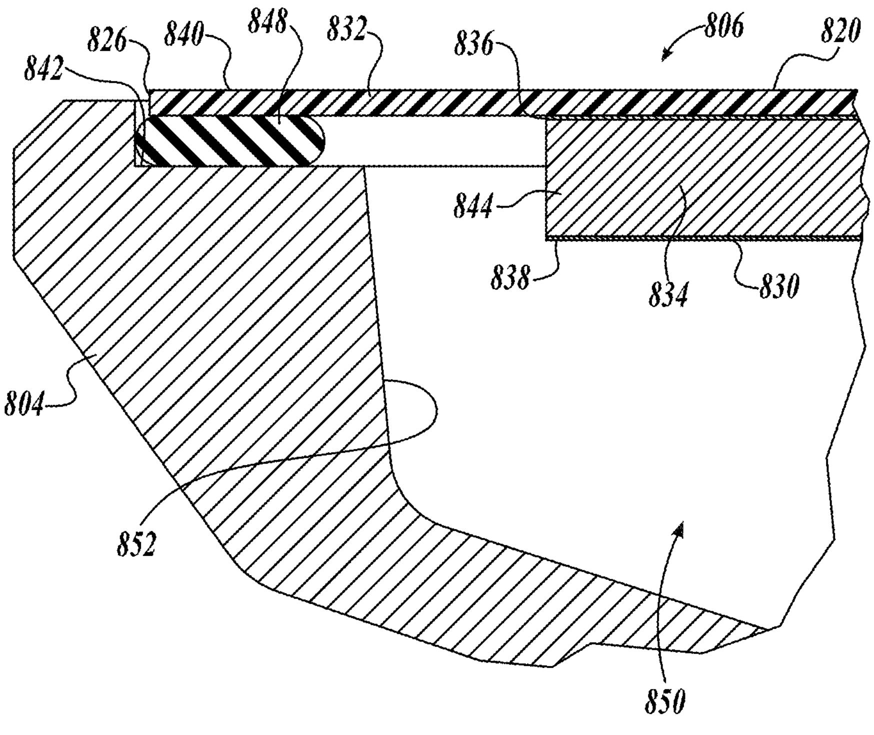

Referring to FIGS. 21 and 22, which show respective exploded and cross-sectional views of the radome portion 806, the radome portion 806 of the illustrated embodiment includes a plurality of layers 832 and 834. In one non-limiting example, the plurality of layers includes first and second radome layers 832 and 834 for providing mechanical and environmental protection to the antenna aperture 808 and other electrical components inside the housing 802 of the antenna apparatus 800.

In one embodiment of the present disclosure, the first radome layer 832 is designed to be an outer layer, which is exposed to the outdoor environment and has the properties of good strength to weight ratios and near zero water absorption. So as not to impede RF signals, the first radome layer 832 also has a low dielectric constant, a low loss tangent, and a low coefficient of thermal expansion (CTE). In addition, in some embodiments, the first radome layer 832 has bondability for bonding with adhesive. Without such bondability, the radome lay-up can buckle in extreme weather conditions.

The first radome layer 832 is designed to maintain high mechanical values and electrical insulating qualities in both dry and humid conditions over thermal cycles between −40° C. and 85° C. In some embodiments, the first radome layer 832 has high yield strength and a high enough modulus to spread load on the first radome layer 832 to the second radome layer 834. In some embodiments of the present disclosure, the first radome layer 832 has a dielectric constant of less than 4. In some embodiments of the present disclosure, first radome layer 832 has a loss tangent of less than 0.001.

As one non-limiting example, the first radome layer 832 is fiberglass-reinforced epoxy laminate material, such as FR-4 or NEMA grade FR-4. In other embodiments, the first radome layer may be another type of high-pressure thermoset plastic laminate grade, or a composite, such as fiberglass composite, quartz glass composite, Kevlar composite, or a panel material, such as polycarbonate.

In accordance with embodiments of the present disclosure, the first radome layer 832 has a thickness in the range of less than or equal to 60 mil (1.5 mm), less than or equal to 30 mil (0.76 mm), less than or equal to 20 mil (0.51 mm), less than or equal to 10 mil (0.25 mm). Thicker first radome layers 832 may be used in extreme weather conditions, such as hail conditions.

A second radome layer 834 supports the first radome layer 832 in providing mechanical and environmental protection to the antenna aperture 808 and other electrical components inside the housing 802 of the antenna apparatus 800. The second radome layer 834 also provides suitable spacing between the antenna elements of the antenna aperture 808 and the top surface 820 of the first radome layer 832.

As seen in the cross-section view of the illustrated embodiment in FIG. 22, the second radome layer 834 is thicker than the first radome layer 832. In one non-limiting example, the second radome layer 834 is a foam layer having properties of low RF decay, low loss tangent, good compression strength, and a low coefficient of thermal expansion (CTE). In addition, the second radome layer 834 has bondability for bonding with adhesive.

Like the first radome layer 832, the second radome layer 834 is also designed to maintain high mechanical values and electrical insulating qualities in both dry and humid conditions over thermal cycling between −40° C. and 85° C. In some embodiments of the present disclosure, the second radome layer 834 has a dielectric constant of less than 1. In some embodiments of the present disclosure, the second radome layer 834 has a loss tangent of less than 0.001.

As one non-limiting example, the second radome layer 834 is polymethacrylimide (PMI) foam. In other embodiments, the second radome layer 834 may be a honeycombed low-loss material (as described above) or another suitable foam material (such as urethane foam). In other embodiments, the second radome layer 834 may be air. For example, the second radome layer 834 may include a spacing configuration to space the first radome layer 832 from the antenna aperture 808 with air.

In accordance with embodiments of the present disclosure, the second radome layer 834 has a thickness in the range of greater than 3.0 mm, less than 4.5 mm, or in the range of 3.0 mm to 4.5 mm. The thickness of the second radome layer 834 is described in greater detail above with reference to EXAMPLE 3.

As seen in FIG. 22, a first layer of adhesive 836 may be provided between the first and second radome layers 832 and 834. In addition, between the second radome layer 834 and the antenna aperture 808, a second layer of adhesive 838 may be provided. The adhesive may be a sheet-formed pressure sensitive adhesive, such as an acrylic adhesive, or a hot melt adhesive.

As seen in the illustrated embodiment of FIG. 22 showing a cross-sectional view of the radome portion 806 coupled with the chassis portion 804, the outer edge 844 of the second radome layer 834 is set inward from the outer edge 826 of the first radome layer 832 to provide an outer radome lip 840. Such lip 840 provides an interface for mating with a bezel surface 842 on the outer perimeter of the chassis portion 804.

When mated with the chassis portion 804, a seal 848 may be formed around the outer radome lip 840 to prevent moisture and dirt ingress at the interface. In one embodiment of the present disclosure, the seal may be a silicone seal. The seal may be formed during manufacture of the antenna apparatus 800 from dispensed material. In the illustrated embodiment of FIG. 22, the seal 848 is shown as being contained between the bezel surface 842 and the bottom surface of the radome lip 840. However, in other embodiments, the seal 848 may extend outwardly or inwardly toward the other surfaces of the chassis 804 to eliminate any gaps between the radome and the chassis bezel.

Figure 23:
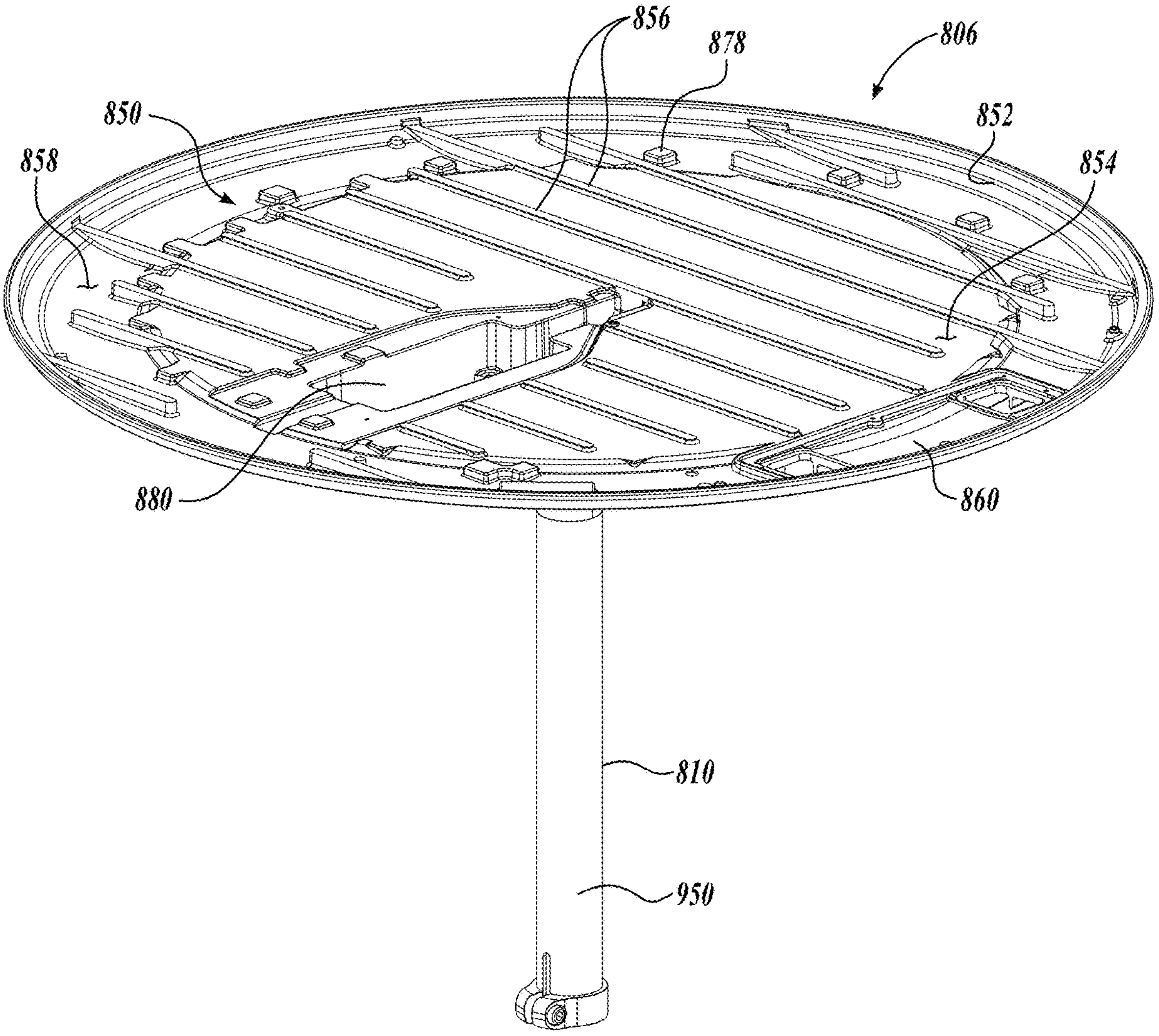
FIGS. 23 and 24 are respective isometric and top views of a chassis portion of the antenna apparatus of FIGS. 16 and 17.
Figure 24:
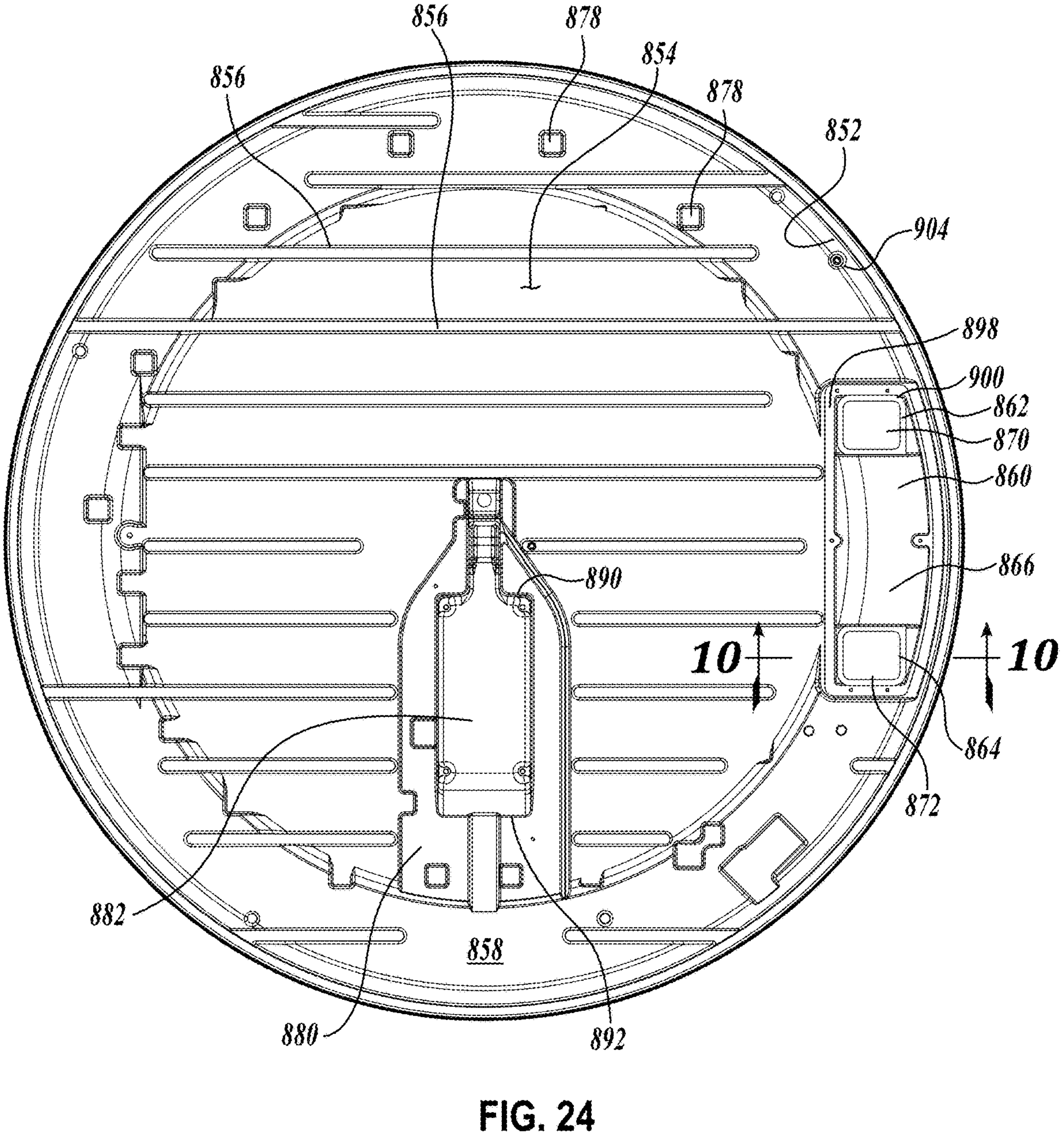

Referring to FIGS. 23 and 24, the chassis portion 804 of the housing 802 will now be described in greater detail. The chassis portion 804 supports the electronic features of the antenna apparatus 800, including the antenna array, the modem, GPS, Wi-Fi card, Wi-Fi antennas, and other electrical components. In accordance with embodiments of the present disclosure, the antenna lattice defining the antenna aperture 808 may include a plurality of antenna elements 812 arranged in a particular array or configuration on a carrier 814, such as a printed circuit board (PCB), ceramic, plastic, glass, or other suitable substrate, base, carrier, panel, or the like (described herein as a carrier).

As described above with reference to FIG. 22, the chassis portion 804 is designed to mate with the radome portion 806 at the bezel 842 of the chassis portion 806. When mated, the chassis portion 804 and the radome portion 806 define an inner chassis chamber 850 (see also FIG. 8) for supporting the antenna aperture 808 on the carrier 814 and the electronic features of the antenna apparatus 800.

In the illustrated embodiment of FIG. 23, the inner chassis chamber 850 includes an inner wall 852 and a support platform 854. The support platform 854 includes a bonding system shown as a plurality of bonding bars 856 extending therefrom to provide support to the electronic features of the antenna apparatus 800. In the illustrated embodiment, the bonding bars 856 extending laterally, parallel to one another.

The bonding bars 856 of the present disclosure provide multiple points of bonding between the antenna system and the chassis portion 804 to mitigate buckling (as a result of thermal cycling) of the carrier 814 (for example, a printed circuit board (PCB)). In previously designed systems, a printed circuit board (PCB) is generally screwed down to a chassis. Such screw configuration may not be designed to withstand such buckling.

The antenna apparatus 800 may be bonded to the bonding bars 856 using a low stiffness adhesive to further mitigate buckling. In some embodiments of the present disclosure, the adhesive is an acrylic foam adhesive. As a non-limiting example, the adhesive may be a VHB brand tape manufactured by 3M Corporation. In some embodiments, the shear modulus of a 0.5 mm bondline of adhesive is less than 0.34 MPa. In some embodiments, the shear strain capability of the bondline is greater than 150%.

Although shown as bonding bars 856, other configurations of chassis bonding systems designed to mitigate buckling of a PCB are within the scope of the present disclosure. As a non-limiting example, the bonding system may include a grid of bonding posts instead of bonding bars.

Extending around at least a portion of the outer perimeter of the support platform 854 is a moat section 858 of the inner chassis chamber 854. The moat section 858 provides spacing for components of the electronic features of the antenna apparatus 800, such as power inductors. Various city-scaping protrusions 878 extend from the moat section to provide additional support and thermal mitigation to the electronic components of the antenna system outside the regions of the bonding bars 856. In one embodiment of the present disclosure, the city-scaping protrusions 878 are made from a metal material, such as aluminum, and provide a thermal path to the heat sink 920.

The chassis portion 804 may be manufactured as a discrete part, for example, by process for integrally forming a part, such as a casting process. The bonding bars 856 and the moat section 858 both add to stiffness of the chassis portion 804. Such stiffness provides advantages in durability. In addition, the bonding bars 856 and the moat section 858 assist with mold flow during manufacturing.

Referring to the illustrated embodiment of FIGS. 23 and 24, in the moat section 858 of the inner chassis chamber 850, a first pocket section 860 is defined in the chassis inner chamber 850 for containing components of the antenna apparatus 800. In one embodiment of the present disclosure, the first pocket section 860 is configured to include one or more antenna pockets (illustrated as two pockets) 862 and 864 and a card pocket 866.

In one non-limiting example, the one or more antenna pockets 862 and 864 may be Wi-Fi antenna 868 pockets and the card pocket 866 may be a Wi-Fi card 886 pocket.

Figure 25:
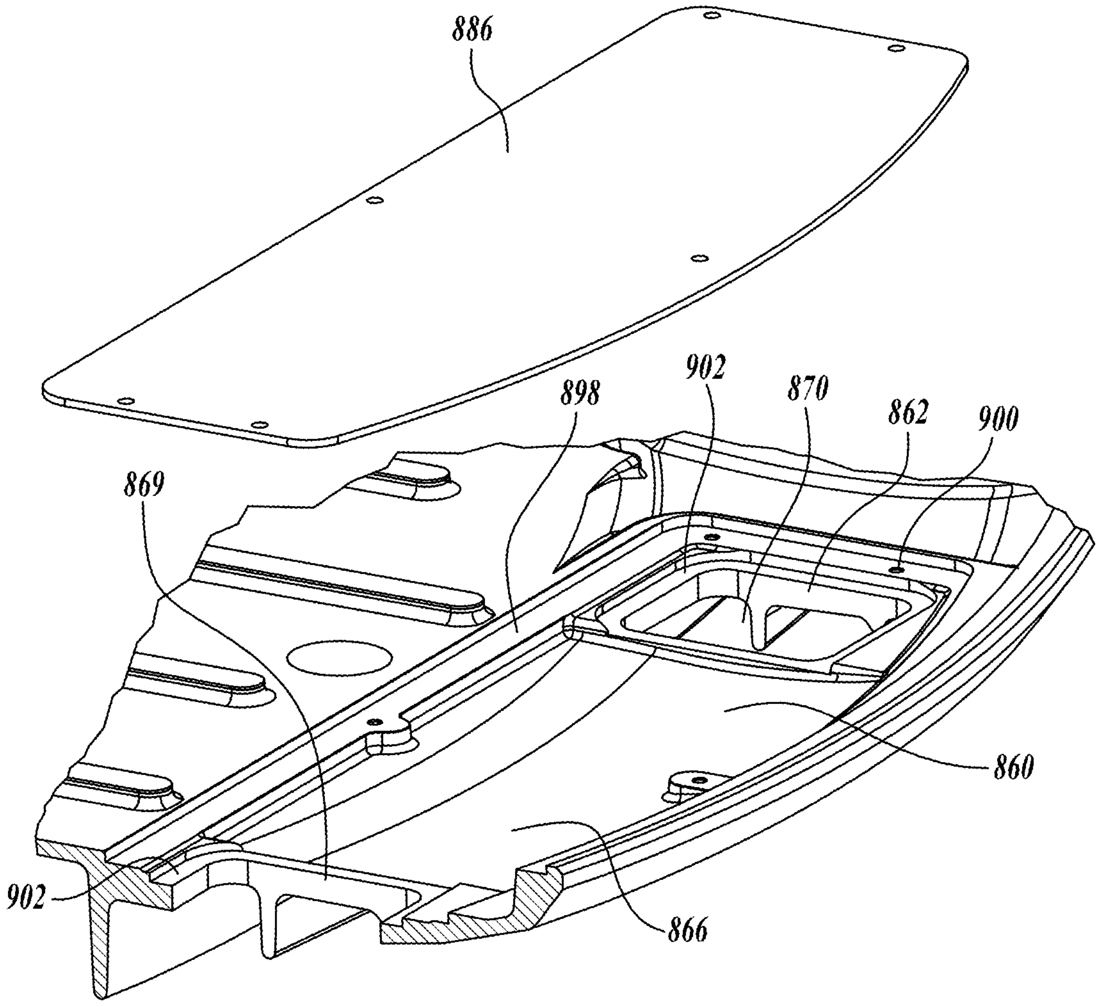
FIG. 25 is an up-close isometric view of a portion of the chassis portion of the antenna apparatus of FIGS. 16 and 17.
Figure 26:
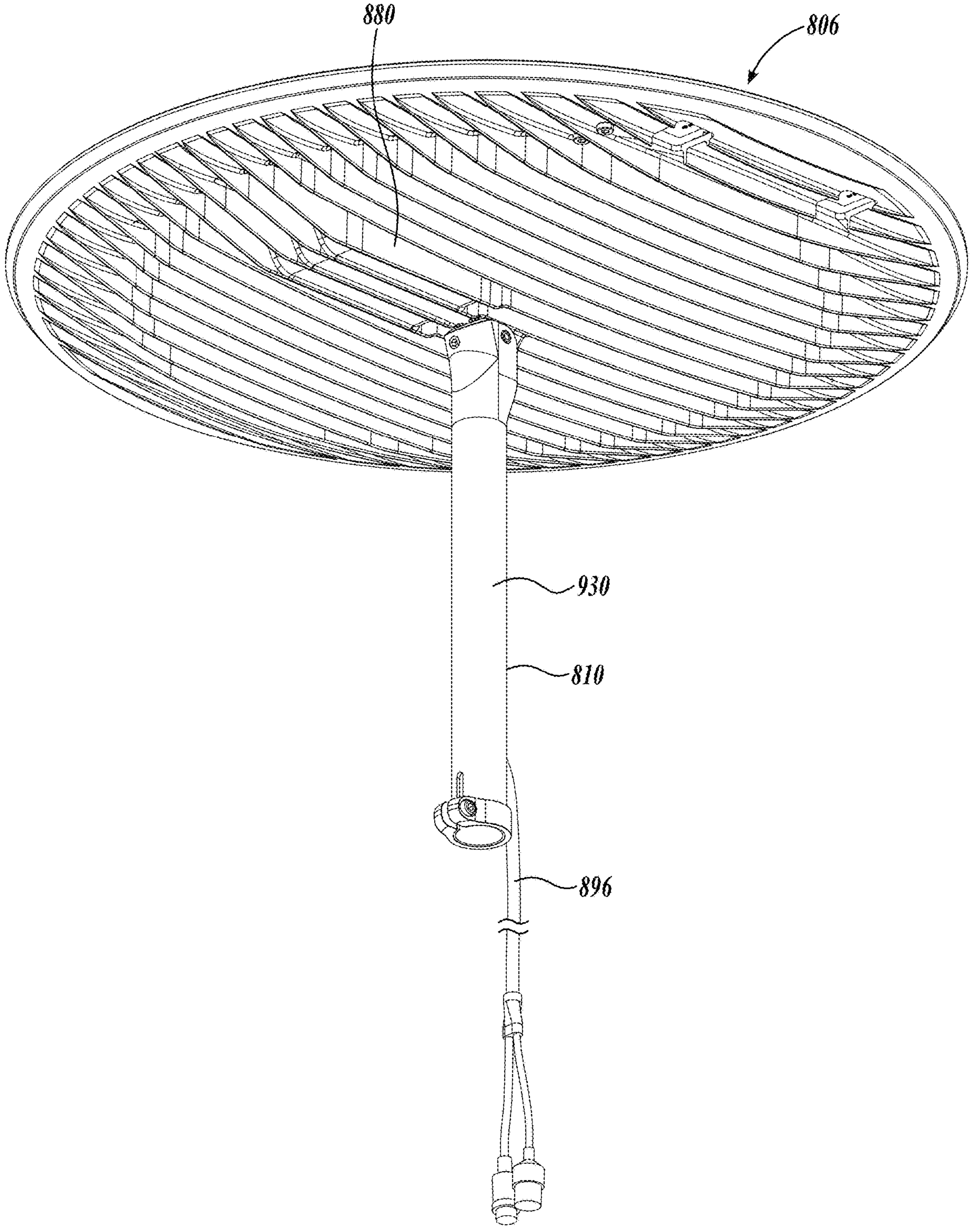
FIGS. 26 and 27 are respective isometric and bottom views of chassis portion of the antenna apparatus of FIGS. 16 and 17 showing a heat sink.

Referring to FIGS. 24 and 25, the antenna pockets 862 and 864 include holes 870 and 872 extending from the support platform 854 of the chassis portion 806. The holes 870 and 872 allow for the insertion of discrete antennas, such as Wi-Fi antennas. Because the antenna pockets 862 and 864 and holes 870 and 872 are oriented on the support platform 854 of the chassis portion 106, Wi-Fi antennas 868 (see FIGS. 17 and 19) can be positioned in the closest position to the mounting surface S (for example, the roof of a building to which Wi-Fi signal is being radiated). In addition, the Wi-Fi antennas radiate toward the building and away from the beams emanating to and from the antenna aperture 808 of the antenna apparatus 800. In addition, the positioning of the Wi-Fi card Wi-Fi antennas 868 in the moat section 858 of the chassis portion 804 is also designed for thermal benefits, such that heat emanating from the Wi-Fi antennas 868 and the Wi-Fi card 886 does not affect other electronic components in the system and vice versa.

In accordance with embodiments of the present disclosure, the Wi-Fi antennas may be plastic pieces printed with antenna electronics. As a non-limiting example, the antennas may be manufactured using a laser direct structuring (LDS) process. Therefore, the antennas may form a cover, the antenna itself, and a seal for the holes 870 and 872 into the inner chassis chamber 852.

The first pocket section 860 may include shielding such that the Wi-Fi signal emanating from the WI-Fi antennas 868 does not interfere with the beams emanating to and from the antenna aperture 808. In the illustrated embodiment, the shielding includes a flange 898 extending around the rim of the upper surface of the first pocket section 860. The flange 898 is designed to interface with the Wi-Fi card 886 to enclose the Wi-Fi antennas 868 within the shielded pocket. The Wi-Fi card 886 is secured to the flange 898 by a series of screws, with the location of the screws shown by the receiving holes 900 in FIG. 25. The screws (not shown) ground the Wi-Fi card 886 to the heat sink 920 and close the gap between the Wi-Fi card 886 and the heat sink 920 to prevent jamming components of the antenna array 808 with out-of-band Wi-Fi signals.

When the antennas 868 are inserted in the antenna pockets 862 and 864 extending through the holes 870 and 872, the antennas 868 are configured to form seals with a flange 902 in each of the antenna pockets 862 and 864. The seals prevent dirt or moisture ingress into the inner chassis chamber 850.

Referring to FIGS. 23 and 24, also in the inner chassis chamber 850, a second pocket section 880 is defined for supporting the power supply 882 to the antenna apparatus 800. The second pocket section 880 is offset from the mounting system 810 (see FIG. 27) to provide ingress of the power cabling 884 to the power supply 882 from the mounting system 810.

In the illustrated embodiment, the power supply 882 has a first end 890 connected to an external power source and a second end 892 coupled to the internal electronic circuitry of the antenna apparatus 800. In accordance with some embodiments of the present disclosure, the second pocket 880 is configured such that the first end 890 of the power supply 882 is positioned adjacent the mounting system 810. In the illustrated embodiment, the mounting system 810 is a center-mounted system (see FIG. 27). Therefore, the second pocket 880 is configured such that the first end 890 of the power supply 882 is positioned adjacent a center point of the chassis portion 804 (see FIG. 24). Such positioning of the second pocket 880 and the power supply 882 allows for a more compact design to reduce the profile of the chassis portion 804 and reduce power supply cable length.

The second pocket section 880 includes a cover 884 (see FIG. 30) for shielding the other electronic components in the antenna apparatus from heat generated by the power supply 882. In addition, the cover 884 or the second pocket section 880 itself may be made from metal and provide a thermal path to the heat sink 920 for heat dissipation.

Referring to FIG. 24, the chassis portion 804 also may include a vent hole 904 for venting air from the inner chassis chamber 850. The vent hole 904 may have a suitable air permeable/water non-permeable cover to prevent the ingress of moisture into the inner chassis chamber 850.

Figure 17:
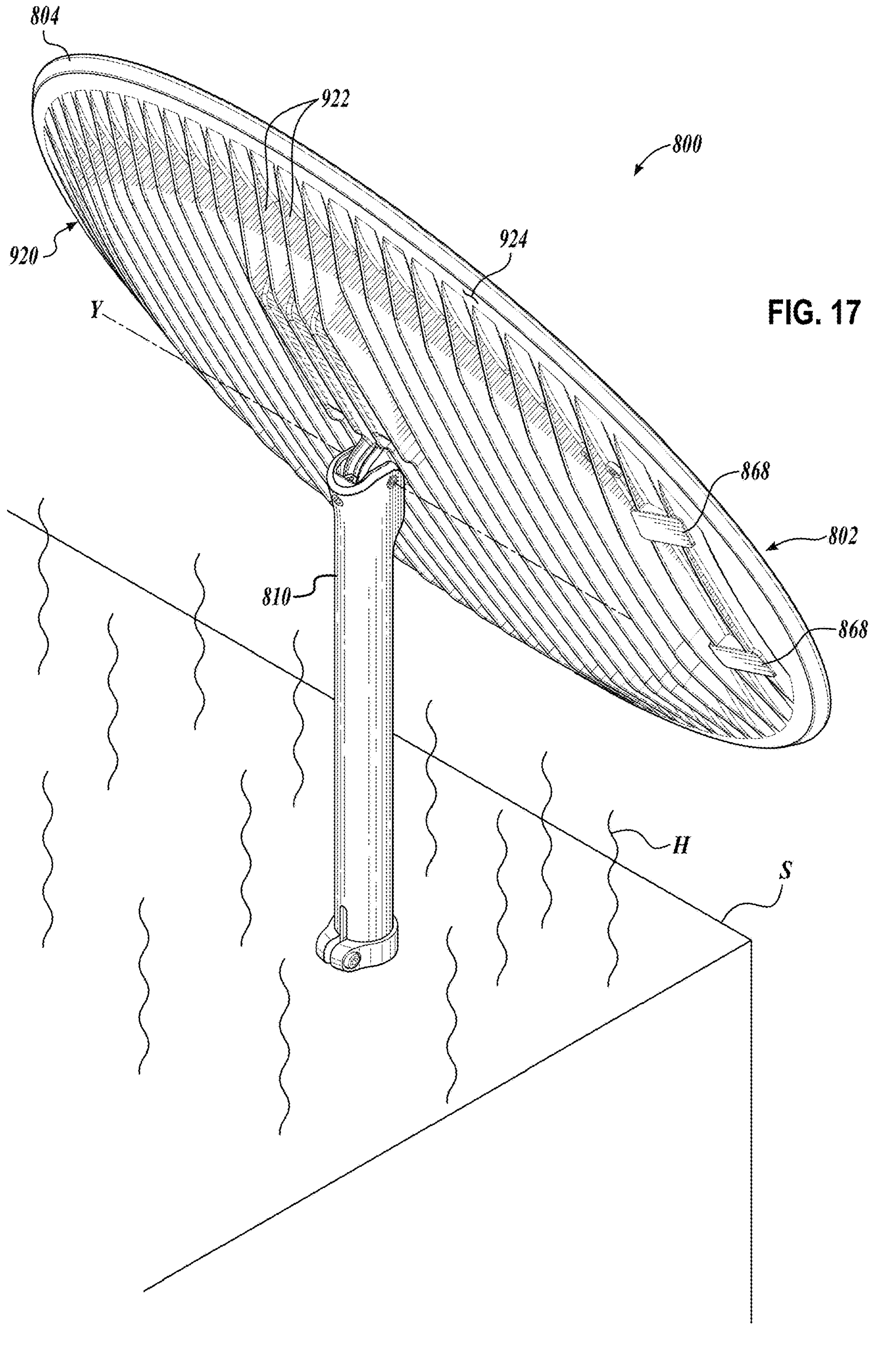
Figure 18:
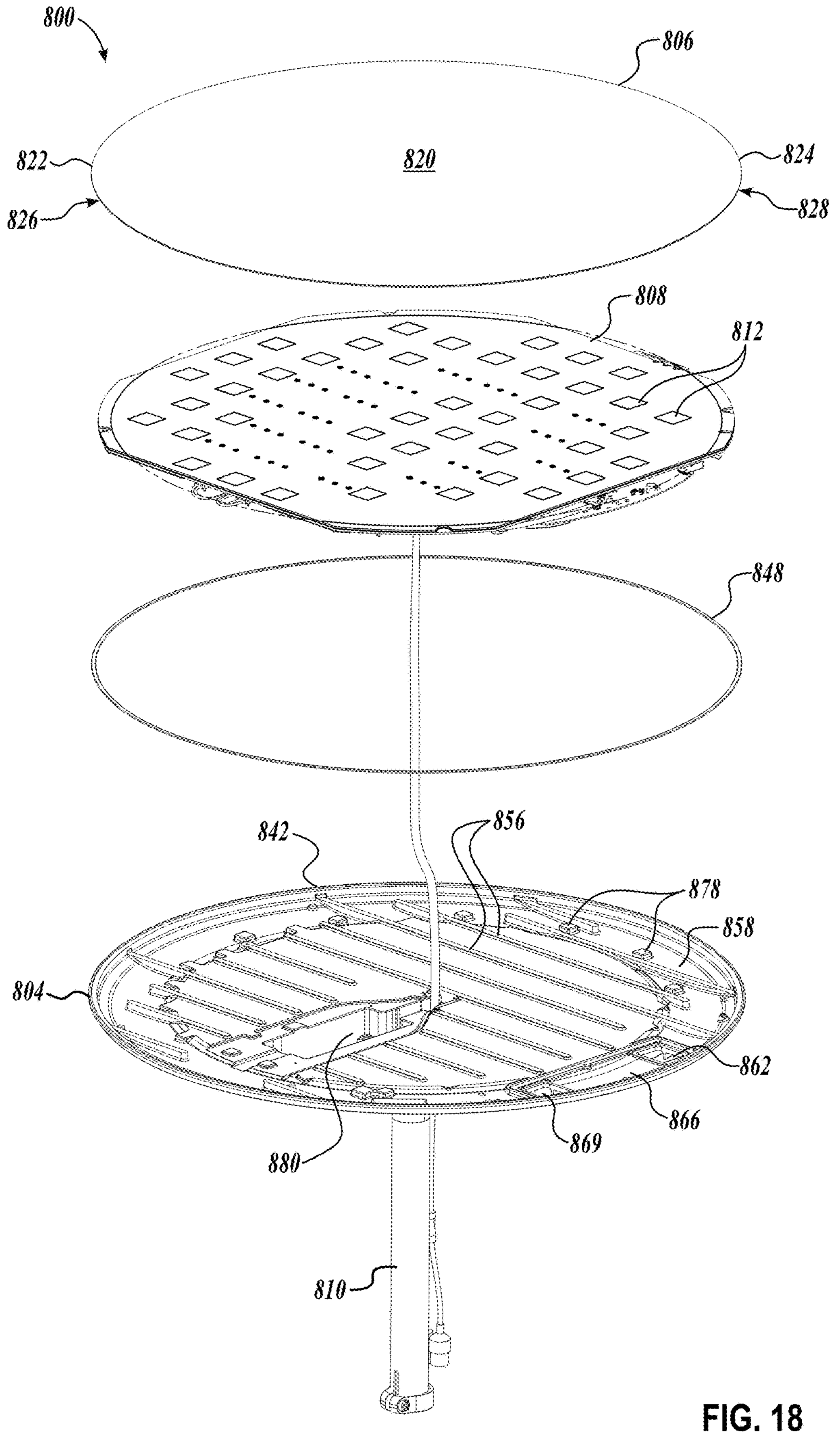
FIGS. 18 and 19 are exploded views of the antenna apparatus of FIGS. 16 and 17 from respective top and bottom perspectives.
Figure 19:
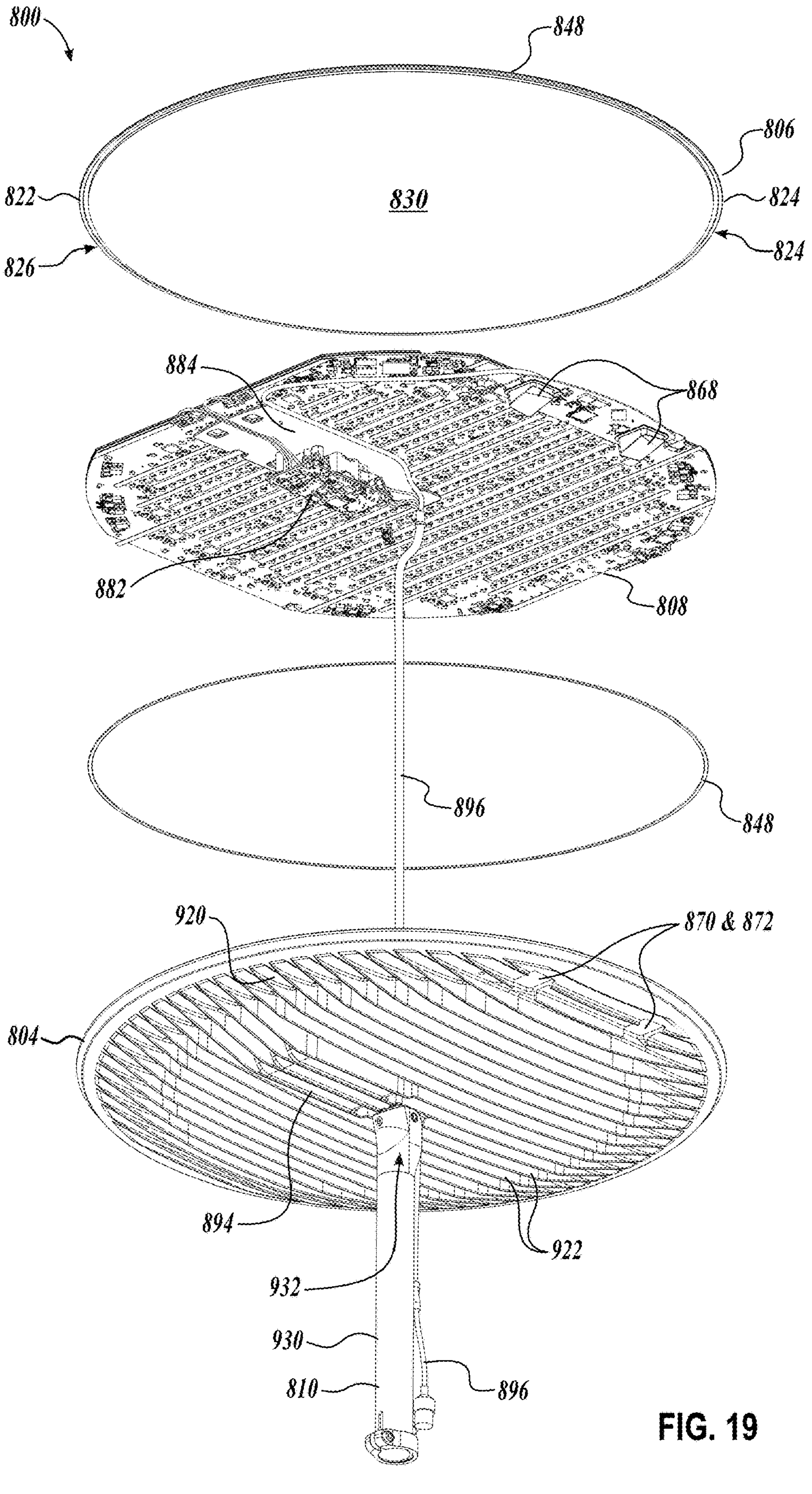

In the illustrated embodiment of FIG. 17, the chassis portion 804 includes a heat sink 920 extending downwardly from the bottom surface 924 of the chassis portion 804. The heat sink 920 includes a plurality of fins 922 extending downwardly from the bottom surface 924.

In the illustrated embodiment, the fins 922 are equally spaced and parallel to one another and run in a single direction. Comparing FIGS. 18 and 19, the bonding bars 856 in the inner chamber 850 of the chassis portion 804 run in a direction perpendicular to the direction of the fins 922. The cross-directional orientation of the fins 922 and the bonding bars 856 in the illustrated embodiment further adds to stiffness of the chassis portion 804 for durability during use and also helps with mold flow during manufacturing.

Figure 20:
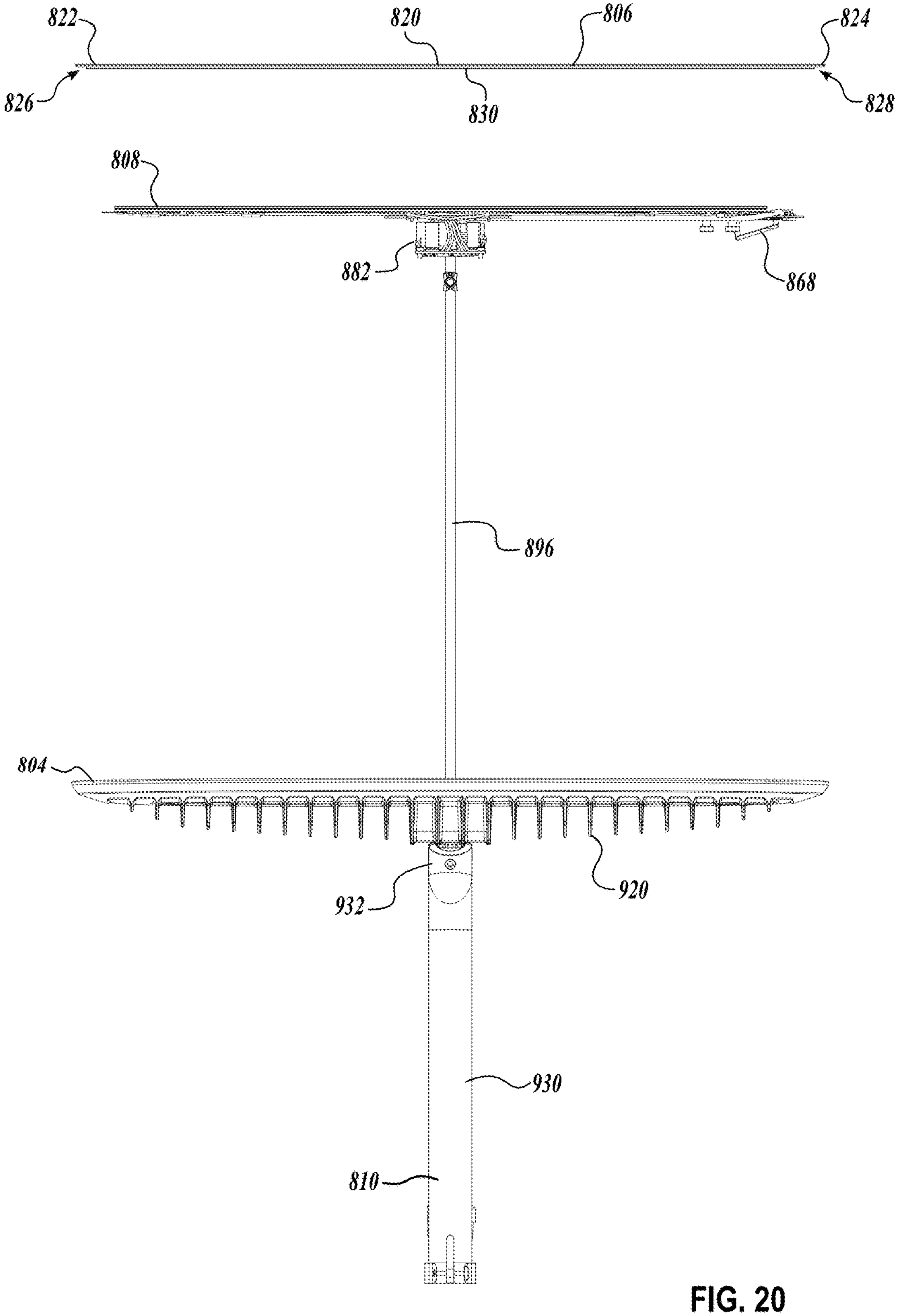
FIG. 20 is a side exploded view of the antenna apparatus of FIGS. 16 and 17.

Referring to FIG. 20, the fins 922 are designed to be coupled to or integrally manufactured with the chassis portion 804. In the illustrated embodiment of FIG. 5, the fins 922 are designed to have variable lengths to define a curved fin boundary profile. However, in other embodiments, the fins 922 may have the same lengths or may define another different fin boundary profile based on suitable heat dissipation effects.

The fins 922 of the heat sink are made from a metal material suitable to optimizing heat dissipation, such as aluminum. Likewise, if integrally formed, the chassis portion 804 may be made from the same material, such that the chassis portion 804 also enable thermal migration from the chassis portion to the heat sink 920 for further heat dissipation.

Referring to FIG. 17, the mounting system 808 of the antenna assembly 800 allows for the heat sink 920 to be spaced a predetermined distance from the surface S on which the antenna assembly 800 is mounted. Such spacing provides a suitable area for heat dissipation and air mixing.

Moreover, such spacing from the surface on which the antenna assembly 800 is mounted allows the antenna assembly 800 to be located outside the heat boundary layer of the surface S on which it is mounted. For example, if the antenna assembly 800 is mounted on a roof of a building. The external roof surface may be heated by radiating heat from the sun or by conducting heat from inside the building through the surface of the roof. By spacing the antenna assembly 800 a predetermined distance from the surface S on which it is mounted, the heat sink 922 can avoid being heated by the radiation or conduction heat H emanating from the surface S on which it is mounted (see FIG. 17). As one non-limiting example, the leg 930 of the mounting system is at least 14 cm.

Still referring to FIG. 17, as described in greater detail below, tilting the housing 802 of the antenna assembly 800 can help to enhance heat dissipation. In the illustrated embodiment, when tilted, the heat sink fins 922 are oriented perpendicular to the pivot axis Y. Such orientation allows for the fins 922 to provide enhanced natural convection as a result of the buoyancy of air (as it gets heated) for enhanced heat dissipation by the heat sink 920. Referring to FIGS. 33A-33C various tilting orientations for the antenna apparatus 800 are provided.

Figure 27:
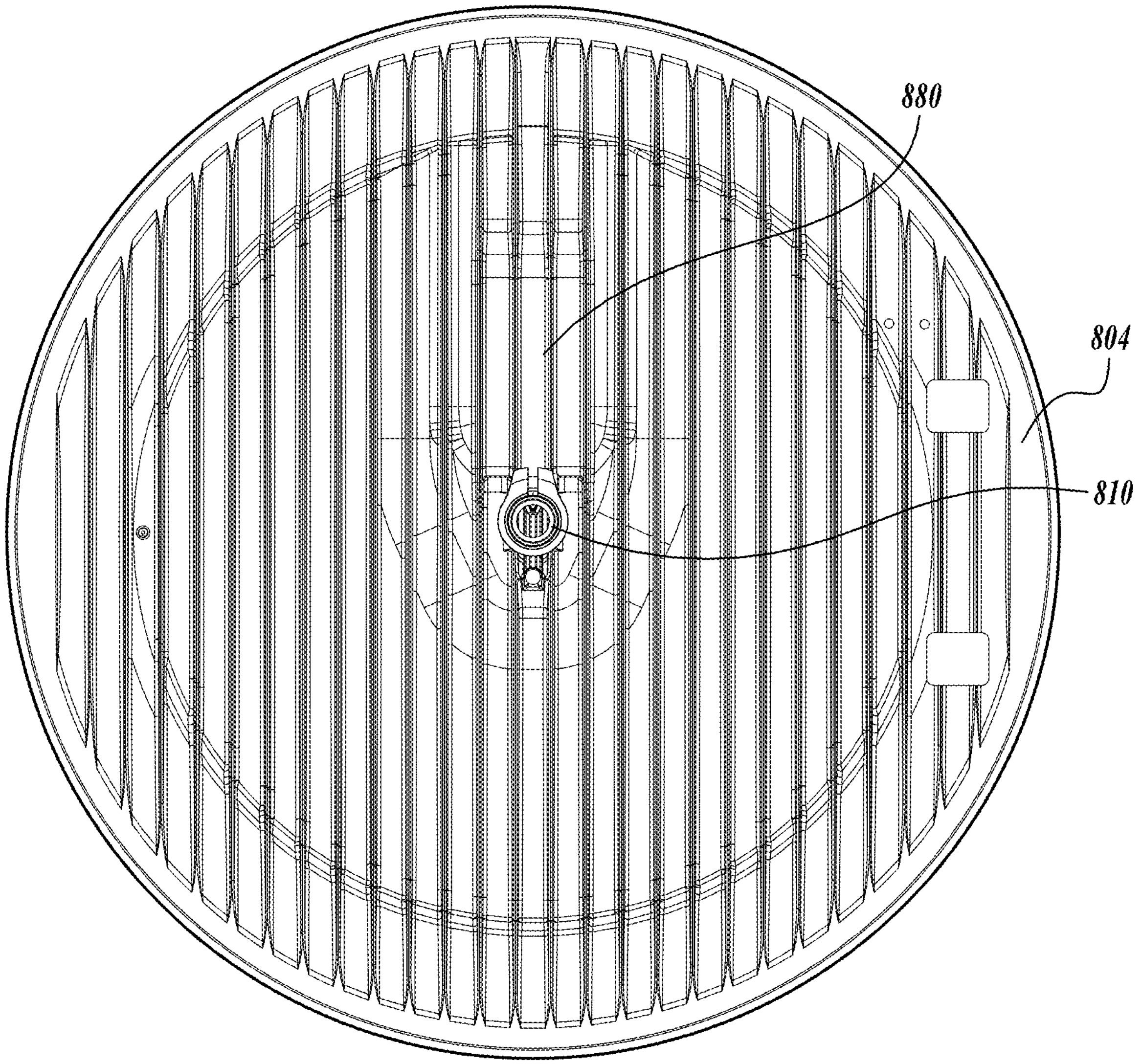

Referring to FIGS. 26-32, a mounting system 810 for the housing 802 will now be described in greater detail. In the illustrated embodiment of FIG. 26, the mounting system 810 includes a single leg 930 for mounting the housing 802. As can be seen in FIG. 27, the mounting system 810 of the illustrated embodiment is attached to the chassis portion 804 at a center point of the chassis portion 804. The center mount location allows for symmetry and balance in the mount. However, in other embodiments, the mounting system 810 may be attached to the chassis portion 804 at an offset location depending on the configuration and weighting of the antenna apparatus 800.

As described above with reference to FIG. 17, the mounting system 810 is configured to allow for tilt-ability of the housing 802 relative to the mounting leg 930. Such tilt-ability of the housing 802 allows for not only rain and snow removal and heat dissipation, but also for orientation of the antenna apparatus 800 with the sky for enhanced radio frequency communication with one or more satellites depending on the geolocation of the antenna apparatus 800 and the orbit of the satellite constellation.

Figure 28:
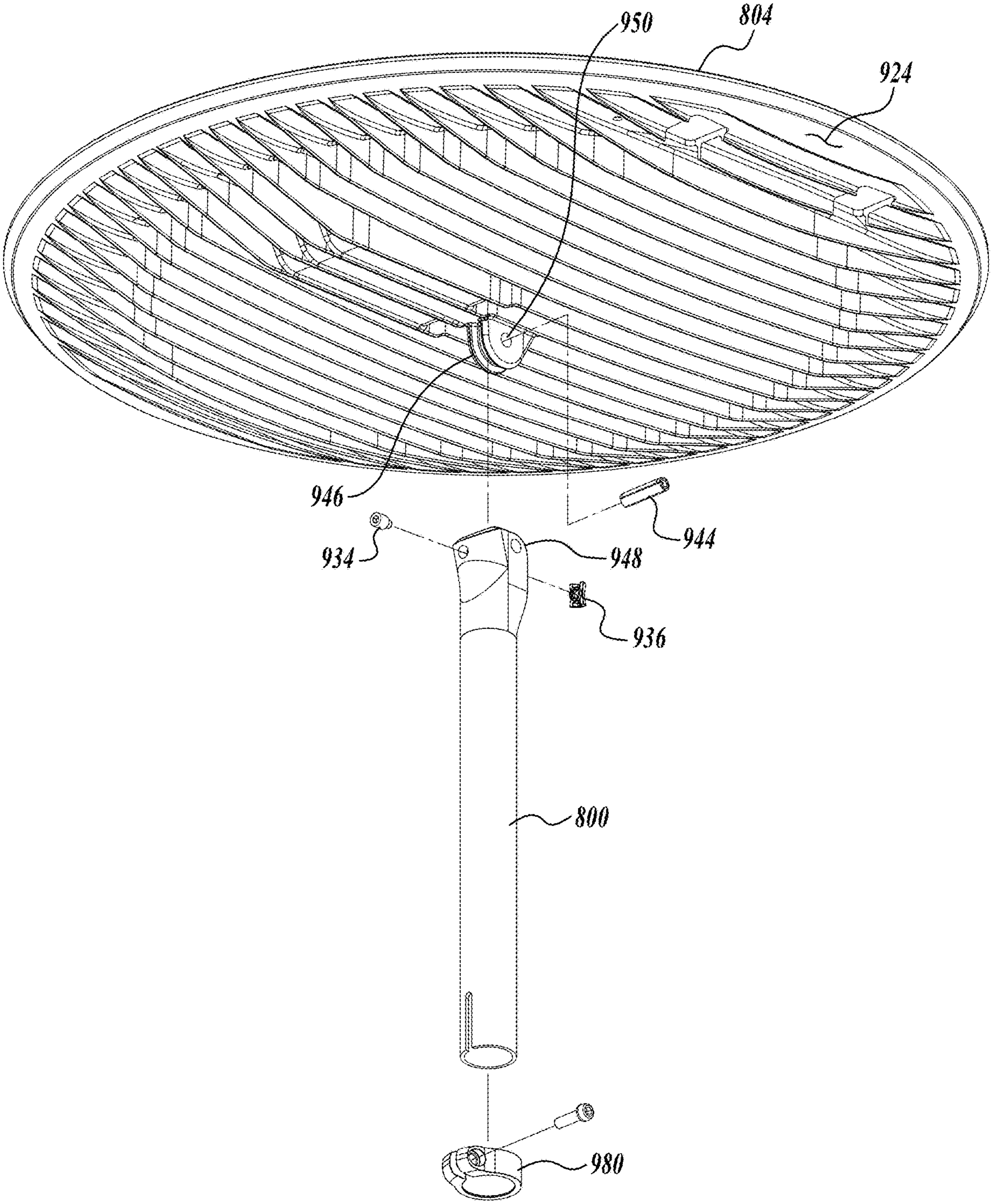
FIGS. 28, 29, and 30 are exploded views of the mounting system of the antenna apparatus of FIGS. 16 and 17.
Figure 29:
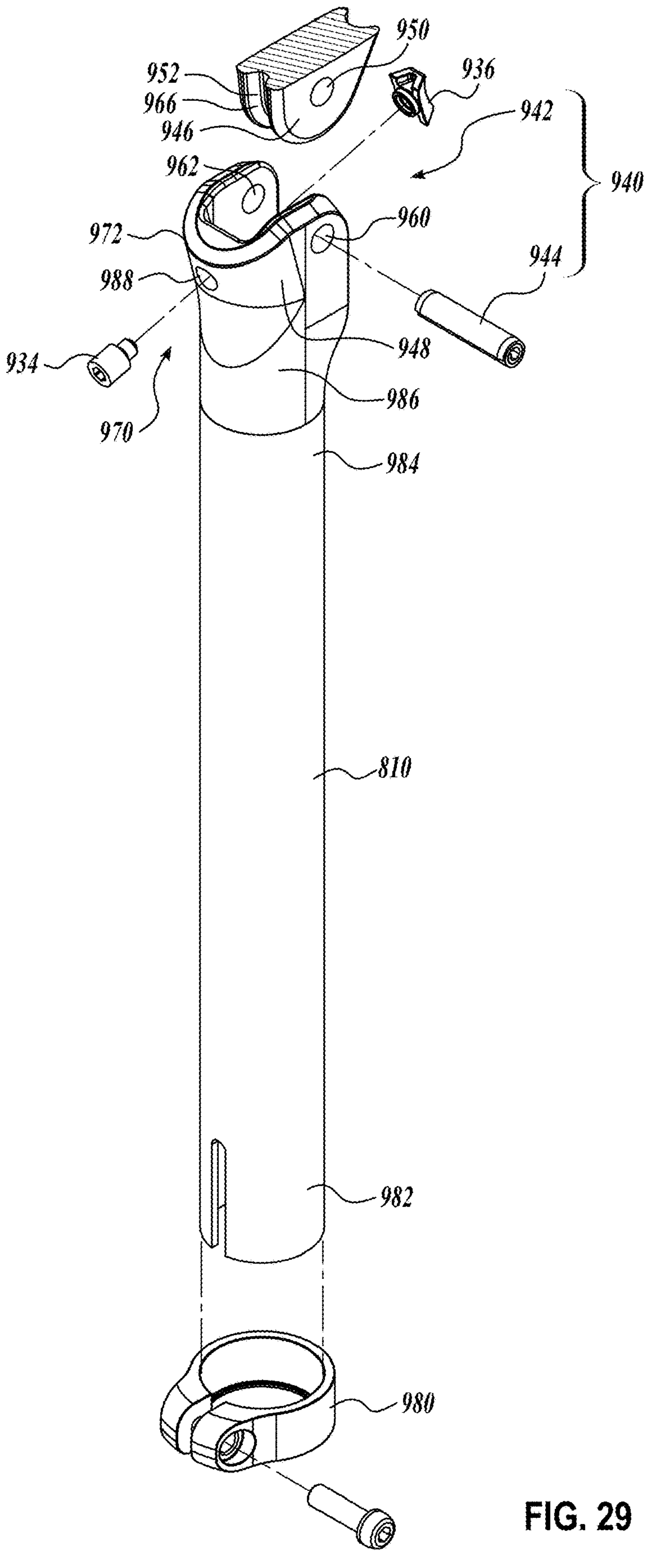
Figure 30:
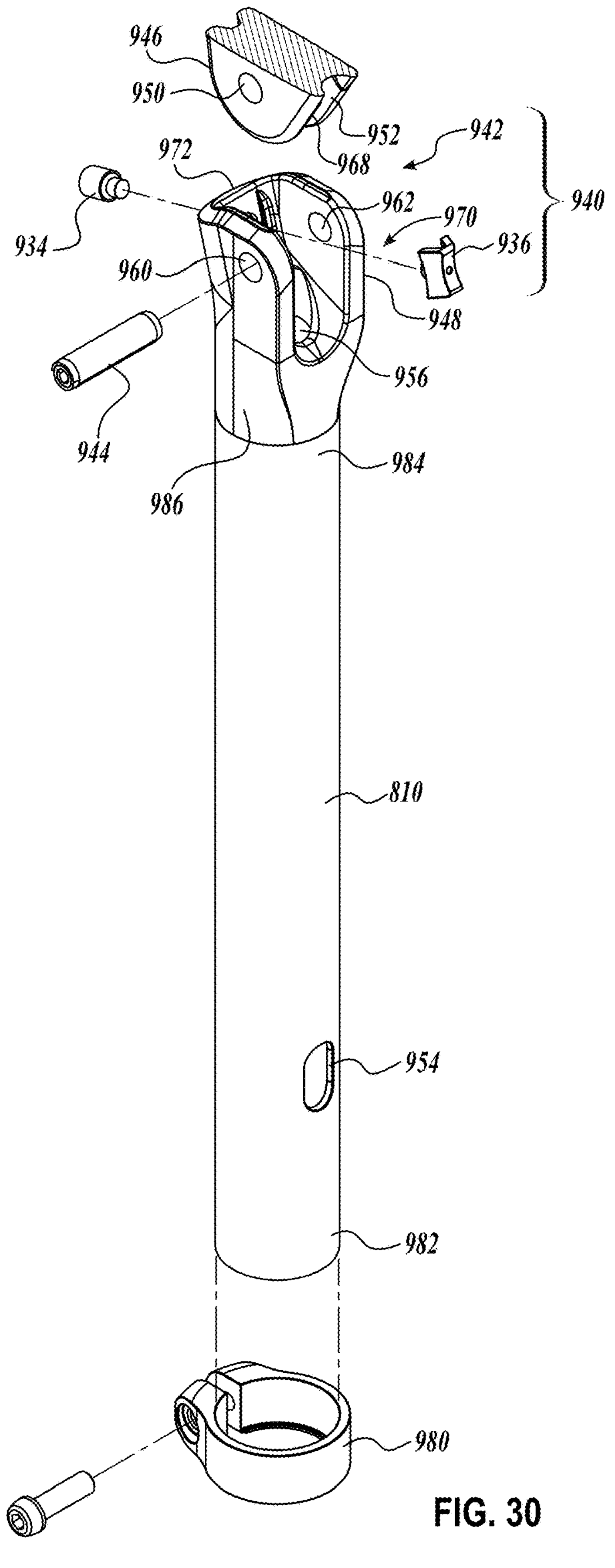

Referring to FIGS. 28, 29, 30, the tilting mechanism 932 of the mounting system 810 is designed and configured for achieving precision in the mounting angle and for a secure mount. In the illustrated embodiment, the tilting mechanism 932 includes a hinge assembly 940 defining a knuckle 942 and having a pin 944. The knuckle 942 includes a first knuckle portion 946 coupled to the chassis portion 806 and a second knuckle portion 948 coupled to the mounting leg 930. The pin 944 is received within the first and second knuckle portions 946 and 948 to form the hinge assembly 940.

Referring to FIG. 28, the first knuckle portion 946 includes a receiving hole 950 configured to receive the pin 944 of the hinge assembly 940. In the illustrated embodiment, the first knuckle portion 946 extends outwardly from the bottom surface 924 of the chassis portion 804. In the illustrated embodiment, the first knuckle portion 946 has a rounded configuration to allow for rotation of the chassis portion 804 and the housing 802 relative to the mounting system 810 over a pivot range (as illustrated in FIGS. 33A-33C).

Referring to FIGS. 29 and 30, the leg 930 is an elongate body extending from a first end 982 to a second end 984. The first end 982 is a base end, and the second end includes a head 986 defining the second knuckle portion 948. The head 986 further includes an interface for the tilt locking mechanism 970 and a stopping surface 972 defining the tilting range of the housing 802 relative to the mounting system 810, both described in greater detail below.

Still referring to FIGS. 29 and 30, the second knuckle portion 248 includes a clevis portion defining first and second receiving holes 960 and 962 for aligning with the receiving hole 950 of the first knuckle portion 946 to receive pin 944 of the hinge assembly 940. When coupled together, the first knuckle portion 946, the second knuckle portion 948, and the pin 944 form the hinge assembly 940 to allow for rotation of the chassis portion 804 and the housing 802 relative to the mounting system 810 over a pivot range (as illustrated in FIGS. 33A-33C).

As seen in the illustrated embodiment, the pin 944 may be a roll pin (or a spring pin) to add resistance to the hinge assembly 940, allowing for achieving precision in the mounting angle.

Figure 31:
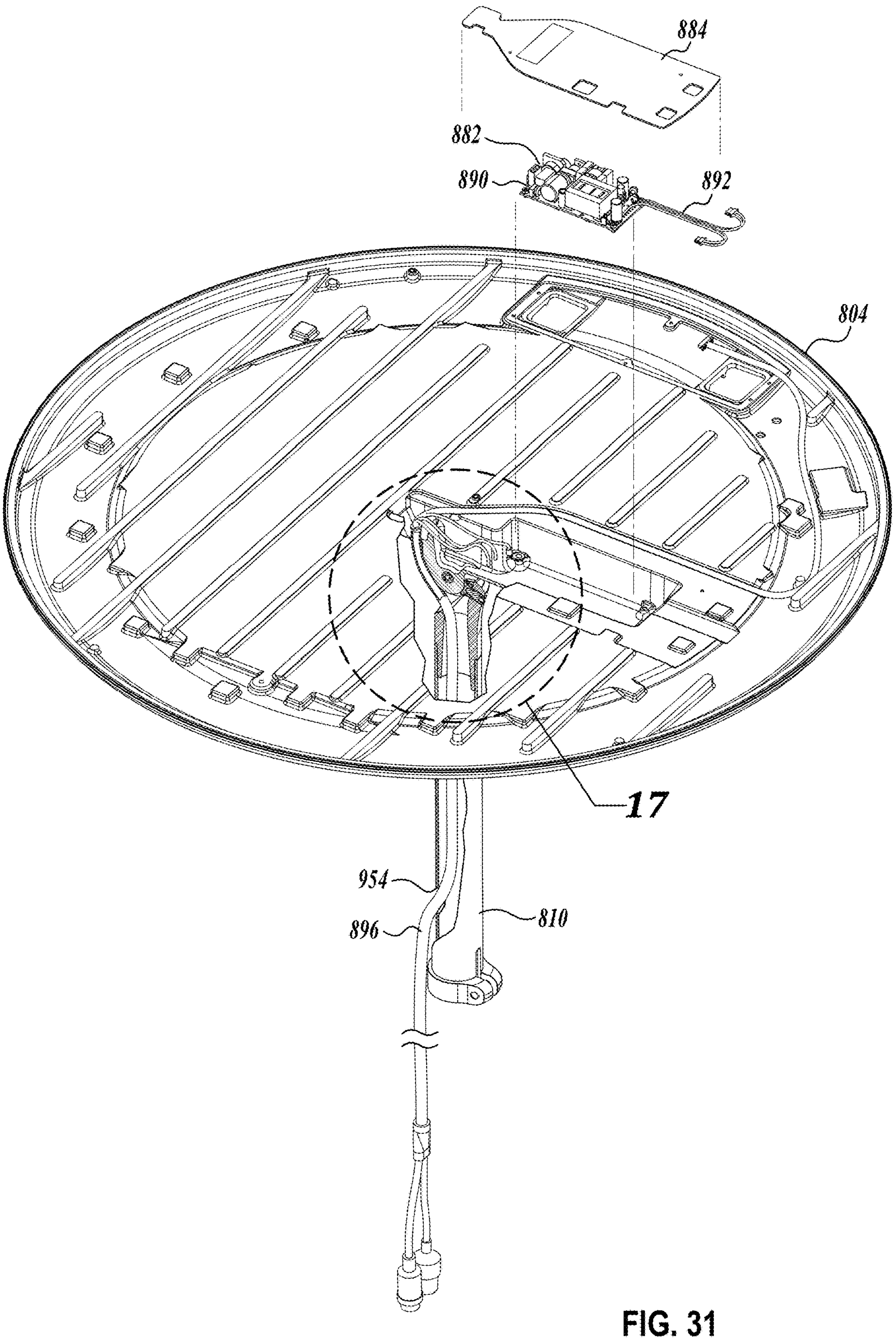
FIGS. 31 and 32 are partial cross-sectional views of a hinge assembly for a mounting system of the antenna apparatus of FIGS. 16 and 17.
Figure 32:
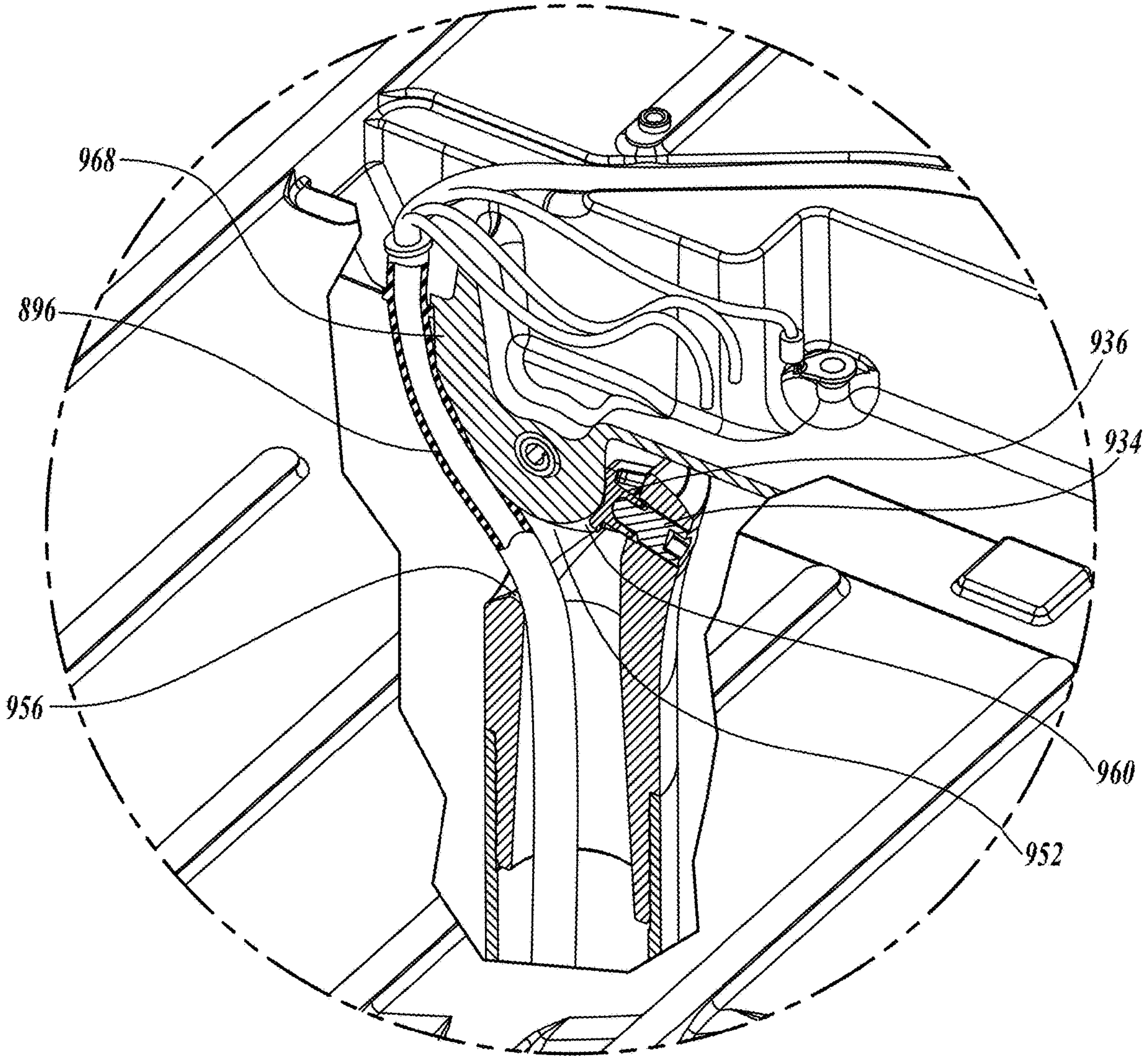

Referring to FIGS. 31 and 32, the body of the first knuckle portion 946 includes a channel 952 along the rounded surface of the first knuckle portion 946. The channel 952 includes a first portion 966 (see FIG. 29) for interfacing with a tilt locking mechanism 970 and a second portion 968 (see FIG. 30) which is designed and configured to receive the cabling 896 that extends to the first end 890 of the power supply 882 disposed in the second pocket 880. The cabling 896 may be configured to extend through first and second holes 954 and 956 in mounting leg 930 (see FIG. 30) so as to be concealed within the mounting leg 930, and then to run inside the second portion 968 of the channel 952. In other embodiments, the cabling 896 may extend external to the mounting leg 930.

As mentioned above, the first portion 966 of the channel 952 of the first knuckle portion 946 is designed to provide an interface for a tilt locking mechanism 970 for the tilt-able mounting system 810. The tilt locking mechanism 970 includes a set screw 934 which is received within a hole 988 defining the tilt locking mechanism 970 in the head 886 of the leg 930. The set screw 934, when tightened, is configured to press against a wedge 936, such that the wedge 936 interfaces with the channel 952 of the first knuckle portion 946 (see FIG. 32). In this manner, the tilt locking mechanism 970 is designed and configured for achieving a secure mount under considerable load.

At the base of the leg 930, a mounting device 980 similar to a bicycle seat mounting device provides for a secure mount to a roof receiver (not shown).

Now referring to FIGS. 33A-33C, the limits of the tilt-about mounting system 800 will be described in greater detail. Referring to FIG. 33A, the housing 802 is tilted to full vertical relative to the mounting system 810. Referring to FIG. 33C, the housing 802 is tilted such that the bottom surface of the heat sink 920 engages with stopping surface 972. FIG. 33B is a middle position. Other positions are within the scope of the present disclosure.

After the antenna apparatus 800 is mounted on an external surface of a building, the cabling can be connected to an outlet external to the building.

While illustrative embodiments have been illustrated and described, it will be appreciated that various changes can be made therein without departing from the spirit and scope of the disclosure.

The invention claimed is:

1. A housing for an antenna system having a plurality of antenna elements defining an antenna aperture for use as part of a user terminal to communicate with a satellite, the housing comprising:

a lower enclosure;

a radome portion configured for coupling to the lower enclosure to define an inner chamber, the radome portion having a planar top surface and an inner surface opposite the planar top surface, and a radome spacer, the radome spacer configured for spacing the planar top surface from the plurality of antenna elements defining the antenna aperture with equal spacing between the planar top surface and a top surface of each of the plurality of antenna elements defining the antenna aperture, wherein the radome spacer includes a plurality of apertures defined by cell walls, each aperture configured to align with an antenna element of the plurality of antenna elements, wherein the plurality of antenna element are disposed on a carrier surface having carrier surface spacing between adjacent antenna elements, wherein the radome spacer includes a first end coupled to the inner surface of the radome portion and a second end configured for coupling to the carrier surface spacing, and wherein the radome portion has a thickness between 3 mm and 4.5 mm such that the planar top surface of the radome portion is spaced apart from each of the plurality of antenna elements by a distance between 3 mm and 4.5 mm.

2. The housing of claim 1, wherein the planar top surface is a protective layer.

3. The housing of claim 2, wherein the planar top surface is made from a fiber-reinforced laminate material.

4. The housing of claim 3, wherein the fibers are selected from the group consisting of fiberglass or Kevlar fibers.

5. The housing of claim 2, wherein the planar top surface has a thickness selected from the group consisting of less than 1.5 mm, less than 0.76 mm, less than 0.51 mm, and less than 0.25 mm.

6. The housing of claim 2, wherein the planar top surface includes a hydrophobic outer surface.

7. The housing of claim 1, wherein the radome spacer is made from a polymethacrylimide foam.

8. The housing of claim 1, wherein the radome spacer is made from plastic.

9. The housing of claim 1, wherein the radome spacer is made from a thermally conductive material.

10. The housing of claim 1, wherein the radome spacer has a dielectric constant of less than 3.0.

11. The housing of claim 1, wherein the radome spacer has a thermal conductivity value of greater than 0.35 W/m-K.

12. The housing of claim 1, wherein the planar top surface and the radome spacer are joined by adhesive.

13. A housing for an antenna system having a plurality of antenna elements defining an antenna aperture for use as part of a user terminal to communicate with a satellite, the housing comprising:

a lower enclosure;

a radome portion configured for interfacing with the lower enclosure to define an inner chamber, the radome portion having a planar top surface and an inner surface opposite the planar top surface, and a radome spacer configured for spacing the planar top surface from the plurality of antenna elements defining the antenna aperture with equal spacing between the planar top surface and a top surface of each of the plurality of antenna elements defining the antenna aperture, wherein the radome spacer is made from conductive material and defines a plurality of apertures defined by cell walls, wherein each aperture aligns with an antenna element from the plurality of antenna elements defining the antenna aperture, wherein the plurality of antenna elements are disposed on a carrier surface having carrier surface spacing between adjacent antenna elements, wherein the radome spacer includes a first end coupled to the inner surface of the radome portion and a second end configured for coupling to the carrier surface spacing, and wherein the radome portion has a thickness between 3 mm and 4.5 mm such that the planar top surface of the radome portion is spaced apart from each of the plurality of antenna elements by a distance between 3 mm and 4.5 mm.

14. A system for use with an antenna system having a plurality of antenna elements defining an antenna aperture for use as part of a user terminal to communicate with a satellite, the system comprising:

a radome having a planar top surface and a bottom surface; and a radome spacer configured for spacing the planar top surface from the plurality of antenna elements defining the antenna aperture with equal spacing between the planar top surface and a top surface of each of the plurality of antenna elements defining the antenna aperture, wherein the radome spacer is made from a thermally conductive material including a plurality of apertures defined by cell walls, wherein each aperture aligns with an antenna element of the plurality of antenna elements, wherein the plurality of antenna elements are disposed on a carrier surface having carrier surface spacing between adjacent antenna elements, wherein the radome spacer includes a first end coupled to the bottom surface of the radome and a second end configured for coupling to the carrier surface spacing, and wherein the radome spacer has a thickness between 3 mm and 4.5 mm such that the planar top surface of the radome is spaced apart from each of the plurality of antenna elements by a distance between 3 mm and 4.5 mm.

15. The housing of claim 1, wherein the radome portion directly couples to the lower enclosure.

* * * * *